US012641337B2

(12) United States Patent
Masuda et al.

(10) Patent No.: US 12,641,337 B2
(45) Date of Patent: May 26, 2026

(54) INFORMATION PROCESSING DEVICE, IMAGING DEVICE, INFORMATION PROCESSING METHOD, AND PROGRAM

(71) Applicant: FUJIFILM Corporation, Tokyo (JP)

(72) Inventors: Tomonori Masuda, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 18/882,547

(22) Filed: Sep. 11, 2024

(65) Prior Publication Data

US 2025/0008216 A1 Jan. 2, 2025

Related U.S. Application Data

(63) Continuation of application No. 17/829,078, filed on May 31, 2022, now Pat. No. 12,120,425, which is a
(Continued)

(30) Foreign Application Priority Data

Dec. 17, 2019 (JP) ................................. 2019-227582

(51) Int. Cl.
*H04N 23/67* (2023.01)
*H04N 23/56* (2023.01)

(52) U.S. Cl.
CPC ........... *H04N 23/671* (2023.01); *H04N 23/56* (2023.01); *H04N 23/673* (2023.01)

(58) Field of Classification Search
CPC .... H04N 23/671; H04N 23/56; H04N 23/673; H04N 23/631; H04N 23/633;
(Continued)

(56) References Cited

U.S. PATENT DOCUMENTS

2001/0033246 A1 10/2001 Burchett et al.
2002/0135747 A1* 9/2002 Higashino .............. G02B 7/285
356/3.03
(Continued)

FOREIGN PATENT DOCUMENTS

CN 110398748 A 11/2019
EP 3540467 A2 9/2019
(Continued)

OTHER PUBLICATIONS

An Office Action; "Decision of Refusal," mailed by the Japanese Patent Office on Mar. 25, 2025, which corresponds to Japanese Patent Application No. 2024-017961 and is related to U.S. Appl. No. 18/882,547; with English language translation.
(Continued)

*Primary Examiner* — Shahbaz Nazrul
(74) *Attorney, Agent, or Firm* — Studebaker Brackett PLLC

(57) ABSTRACT

A processor measures a first distance to an object in a distance measurement target region on the basis of an irradiation timing when a light irradiator performs surface irradiation on the distance measurement target region with light and a light receiving timing when a light receiver receives reflected light of the light from distance measurement target region. In a case in which a specific pixel included in the light receiver generates a plurality of signals at different timings within a light receiving period corresponding to the surface irradiation by the light irradiator, the processor measures the first distance on the basis of a relationship between the plurality of signals.

21 Claims, 31 Drawing Sheets

Related U.S. Application Data continuation of application No. PCT/JP2020/041849, filed on Nov. 10, 2020.

(58) Field of Classification Search
CPC .. H04N 23/672; H04N 25/131; H04N 25/704; H04N 25/705; G01C 3/06; G01S 17/10; G01S 17/87; G01S 17/89; G02B 7/28; G02B 7/30; G02B 7/32; G02B 7/34; G02B 7/36; G03B 13/36
See application file for complete search history.

(56) References Cited

U.S. PATENT DOCUMENTS

| | | | |
|---|---|---|---|
| 2006/0197938 A1 | 9/2006 | Halmos et al. | |
| 2006/0221250 A1 | 10/2006 | Rossbach et al. | |
| 2013/0120759 A1 | 5/2013 | Van Der Lee et al. | |
| 2013/0321790 A1 | 12/2013 | Kirby | |
| 2015/0301177 A1 | 10/2015 | Tsukamoto et al. | |
| 2016/0103209 A1 | 4/2016 | Masuda et al. | |
| 2017/0273161 A1 | 9/2017 | Nakamura | |
| 2017/0320437 A1 | 11/2017 | Liebau et al. | |
| 2017/0366737 A1* | 12/2017 | Yang | G01S 17/10 |
| 2018/0089848 A1 | 3/2018 | Yang et al. | |
| 2018/0275278 A1 | 9/2018 | Yamada | |
| 2018/0278829 A1 | 9/2018 | Fukai et al. | |
| 2018/0328718 A1 | 11/2018 | Masuda | |
| 2019/0056498 A1 | 2/2019 | Sonn et al. | |
| 2019/0094342 A1 | 3/2019 | Hiramatsu et al. | |
| 2019/0280030 A1 | 9/2019 | Kuwahara et al. | |
| 2019/0289235 A1 | 9/2019 | Nakamura et al. | |
| 2019/0310371 A1 | 10/2019 | Kyselov | |
| 2019/0383939 A1 | 12/2019 | Mori et al. | |
| 2021/0144314 A1* | 5/2021 | Azuma | G06T 5/20 |
| 2022/0210311 A1* | 6/2022 | Hayashi | H04N 23/631 |
| 2022/0256092 A1* | 8/2022 | Masuda | H04N 23/632 |
| 2025/0008216 A1 | 1/2025 | Masuda et al. | |

FOREIGN PATENT DOCUMENTS

| | | | |
|---|---|---|---|
| JP | H09-238062 A | 9/1997 | |
| JP | H10-232339 A | 9/1998 | |
| JP | 2003-057343 A | 2/2003 | |
| JP | 2003-107159 A | 4/2003 | |
| JP | 2006-349694 A | 12/2006 | |
| JP | 2007-114831 A | 5/2007 | |
| JP | 2011-013135 A | 1/2011 | |
| JP | 2012-154719 A | 8/2012 | |
| JP | 2012-245066 A | 12/2012 | |
| JP | 2013-535676 A | 9/2013 | |
| JP | 2015-162562 A | 9/2015 | |
| JP | 2015-194356 A | 11/2015 | |
| JP | 2017-173298 A | 9/2017 | |
| JP | 2018-163300 A | 10/2018 | |
| JP | 2019-047486 A | 3/2019 | |
| JP | 2019-060652 A | 4/2019 | |
| JP | 2019-158616 A | 9/2019 | |
| JP | 7436509 B2 | 2/2024 | |
| WO | 2013/008213 A2 | 1/2013 | |
| WO | 2014/119241 A1 | 8/2014 | |
| WO | 2015/008587 A1 | 1/2015 | |
| WO | 2017/134880 A1 | 8/2017 | |
| WO | 2017/212909 A1 | 12/2017 | |
| WO | 2018/042801 A1 | 3/2018 | |
| WO | 2018/101049 A1 | 6/2018 | |
| WO | 2018/150998 A1 | 8/2018 | |
| WO | 2019/057897 A1 | 3/2019 | |
| WO | 2019/112733 A1 | 6/2019 | |

OTHER PUBLICATIONS

International Search Report issued in PCT/JP2020/041849; mailed Feb. 2, 2021.
International Preliminary Report on Patentability and Written Opinion issued in PCT/JP2020/041849; issued May 17, 2022.
An Office Action; "Notice of Reasons for Refusal," mailed by the Japanese Patent Office on Jun. 13, 2023, which corresponds to Japanese Patent Application No. 2021-565366 and is related to U.S. Appl. No. 17/829,078; with English language translation.
An Office Action; "Notice of Reasons for Refusal," mailed by the Japanese Patent Office on Oct. 10, 2023, which corresponds to Japanese Patent Application No. 2021-565366 and is related to U.S. Appl. No. 17/829,078; with English language translation.
An Office Action; mailed by The State Intellectual Property Office of People's Republic of China on Sep. 11,. 2024, which corresponds to Chinese Patent Application No. 202080087482.2 and is related to U.S. Appl. No. 18/882,547.
An Office Action; "Notice of Reasons for Refusal," mailed by the Japanese Patent Office on Oct. 15, 2024, which corresponds to Japanese Patent Application No. 2024-017961 and is related to U.S. Appl. No. 18/882,547; with English language translation.
An Office Action mailed by the Japanese Patent Office on Sep. 24, 2025, which corresponds to Japanese Patent Application No. 2024-017961 and is related to U.S. Appl. No. 18/882,547; with English language translation.
An Office Action, "Notice of Reasons for Refusal," mailed by the Japanese Patent Office on Feb. 3, 2026, which corresponds to Japanese Patent Application No. 2025-105845 and is related to U.S. Appl. No. 18/882,547; with English language translation.

* cited by examiner

Figure 18:
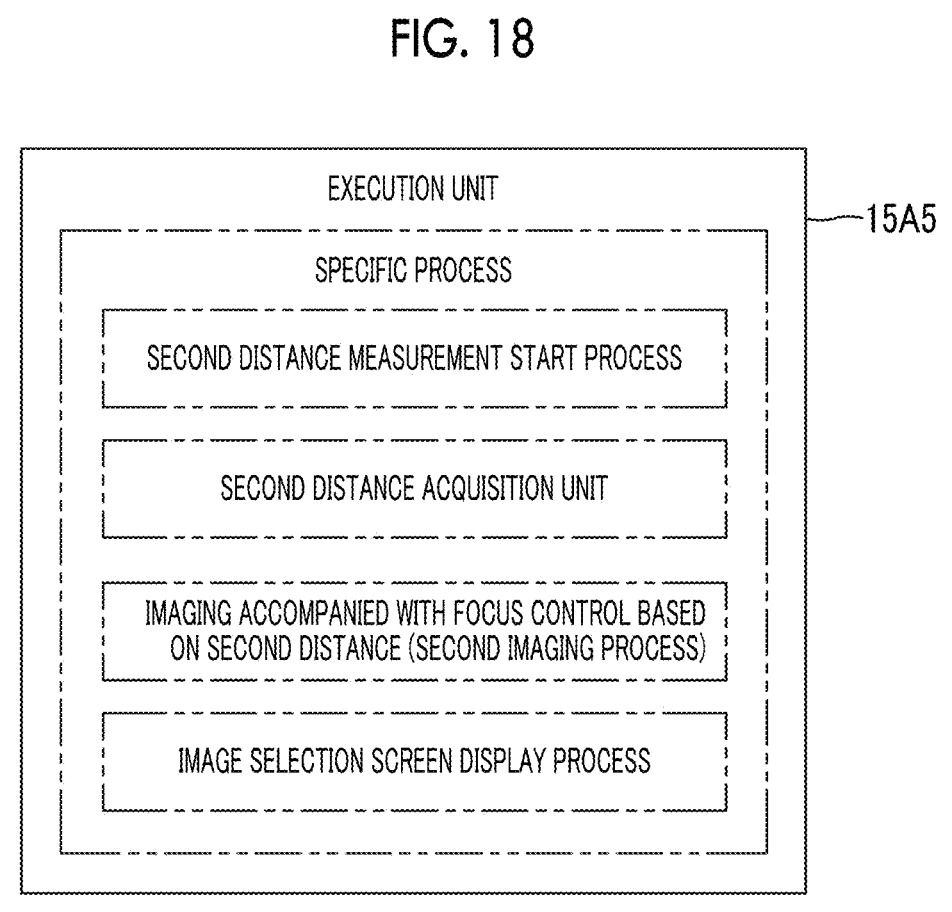

EXECUTION UNIT    —15A5

SPECIFIC PROCESS

SECOND DISTANCE MEASUREMENT START PROCESS

SECOND DISTANCE ACQUISITION UNIT

IMAGING ACCOMPANIED WITH FOCUS CONTROL BASED ON SECOND DISTANCE (SECOND IMAGING PROCESS)

IMAGE SELECTION SCREEN DISPLAY PROCESS

INFORMATION PROCESSING DEVICE, IMAGING DEVICE, INFORMATION PROCESSING METHOD, AND PROGRAM

CROSS-REFERENCE TO RELATED APPLICATIONS

This application is a Continuation of U.S. patent application Ser. No. 17/829,078 filed May 31, 2022, which is a Continuation of PCT International Application No. PCT/JP2020/041849 filed on Nov. 10, 2020, which claims priority under 35 U.S.C. § 119(a) to Japanese Patent Application No. 2019-227582 filed on Dec. 17, 2019. Each of the above application(s) is hereby expressly incorporated by reference, in its entirety, into the present application.

BACKGROUND OF THE INVENTION

1. Field of the Invention

The technology of the present disclosure relates to an information processing device, an imaging device, an information processing method, and a non-transitory computer readable recording medium storing a program.

2. Description of the Related Art

JP2003-057343A discloses a laser distance measurement device comprising a laser light emitting device and an optical system that transmits laser light emitted from the laser light emitting device to an object to be measured and collects reflected light from the object to be measured. The laser distance measurement device disclosed in JP2003-057343A comprises a visual field limiting mechanism that can change the transmission position and size of an optical system receiving visual field to any values and measures the distance to a measurement target in the object to be measured at a position through the visual field limiting mechanism in the receiving visual field.

JP2006-349694A discloses an object detection device that emits an electromagnetic wave in a traveling direction of a vehicle and detects an object on the basis of a reflected wave of the electromagnetic wave. The object detection device disclosed in JP2006-349694A comprises: an emission unit that emits an electromagnetic wave in a horizontal direction and a vertical direction while performing scanning in a scanning range; a receiving unit that receives a reflected wave of the electromagnetic wave; an acquisition unit that acquires a level of the reflected wave received by the receiving unit; a calculation unit that calculates a first deviation correction amount on the basis of a position of a region in which the level of the reflected wave is maximum in the vertical direction and a position of a center of the scanning range in the vertical direction; and a correction unit that corrects the position of the center of the scanning range in the vertical direction on the basis of the first deviation correction amount calculated by the calculation unit and measures a distance to the object using the reflected wave. Further, the emission unit of the object detection device disclosed in JP2006-349694A performs a first scanning process that emits the electromagnetic wave while performing scanning in a first direction which is a predetermined direction in the horizontal direction in a center region having, as its center, the position of the center of the scanning range in the vertical direction and performing scanning in a second direction opposite to the first direction in a region above the center region and a second process that emits the electromagnetic wave while performing scanning in the first direction in the center region and performing scanning in the second direction in a region below the center region.

SUMMARY OF THE INVENTION

One embodiment according to the technology of the present disclosure provides an information processing device, an imaging device, an information processing method, and a non-transitory computer readable recording medium storing a program that can avoid erroneous distance measurement caused by reflected light from a glossy object which is not intended as a distance measurement target.

According to a first aspect of the technology of the present, there is provided an information processing device comprising a processor and a memory that is connected to or provided in the processor. The processor measures a first distance to an object in a distance measurement target region on the basis of an irradiation timing when a light irradiator performs surface irradiation on the distance measurement target region with light and a light receiving timing when a light receiver receives reflected light of the light from the distance measurement target region. In a case in which a specific pixel included in the light receiver generates a plurality of signals at different timings within a light receiving period corresponding to the surface irradiation, the processor measures the first distance on the basis of a relationship between the plurality of signals generated by the specific pixel.

According to a second aspect of the technology of the present disclosure, in the information processing device according to the first aspect, the light receiving timing used to measure the first distance may be a timing when the light receiver receives the reflected light related to a signal having a second highest intensity among the plurality of signals.

According to a third aspect of the technology of the present disclosure, in the information processing device according to the first aspect or the second aspect, in a case in which the intensities of the plurality of signals include an intensity equal to or greater than a first threshold value and a second intensity that is less than the first threshold value and is equal to or greater a second threshold value less than the first threshold value, the processor may perform a specific process.

According to a fourth aspect of the technology of the present disclosure, in the information processing device according to the third aspect, the first threshold value and the second threshold value may be determined on the basis of a noise component caused by ambient light.

According to a fifth aspect of the technology of the present disclosure, in the information processing device according to the third aspect or the fourth aspect, the first threshold value may be a value that decreases as the light receiving timing is delayed.

According to a sixth aspect of the technology of the present disclosure, in the information processing device according to any one of the third to fifth aspects, the specific process may include a process of notifying that the first intensity is included in the intensities of the plurality of signals.

According to a seventh aspect of the technology of the present disclosure, in the information processing device according to any one of the third to sixth aspects, the specific process may include image-based distance measurement that measures a second distance to the object on the basis of an image obtained by imaging the distance measurement target region.

According to an eighth aspect of the technology of the present disclosure, in the information processing device according to any one of the third to sixth aspects, the processor may perform image-based distance measurement that measures a second distance to the object on the basis of an image obtained by imaging the distance measurement target region, in parallel to an operation of measuring the first distance on the basis of the irradiation timing and the light receiving timing, and the specific process may include a process based on a distance measurement result of the image-based distance measurement.

According to a ninth aspect of the technology of the present disclosure, in the information processing device according to the seventh aspect or the eighth aspect, the image-based distance measurement may be at least one of phase-difference-image-based distance measurement that measures the second distance according to a phase difference image obtained as the image from a phase difference pixel, stereo-image-based distance measurement that measures the second distance according to a stereo image obtained as the image by a stereo imaging method, or object-image-based distance measurement that measures the second distance according to an object image which is detected from the image and indicates an object whose size is known.

According to a tenth aspect of the technology of the present disclosure, in the information processing device according to any one of the third to ninth aspects, the specific process may include focus control for an imager based on a contrast of a subject image obtained by imaging a subject included in the distance measurement target region with the imager.

According to an eleventh aspect of the technology of the present disclosure, in the information processing device according to any one of the first to tenth aspects, the distance measurement target region may be a specific real space region that is limited in response to a given instruction.

According to a twelfth aspect of the technology of the present disclosure, in the information processing device according to any one of the first to eleventh aspects, the distance measurement target region may be a specific real space region corresponding to a target subject image detected by the processor from a captured image obtained by imaging.

According to a thirteenth aspect of the technology of the present disclosure, in the information processing device according to any one of the first to twelfth aspects, the processor may perform the focus control for the imager, using the first distance measured on the basis of the irradiation timing and the light receiving timing.

According to a fourteenth aspect of the technology of the present disclosure, in the information processing device according to any one of the first to thirteenth aspects, the intensities of the plurality of signals may be adjusted according to the light receiving timing.

According to a fifteenth aspect of the technology of the present disclosure, in the information processing device according to any one of the first to fourteenth aspects, the light receiver may have a plurality of photoelectric conversion elements which are two-dimensionally disposed, and the processor may measure the first distance for the plurality of photoelectric conversion elements on the basis of the irradiation timing and the light receiving timing.

According to a sixteenth aspect of the technology of the present disclosure, there is provided an imaging device comprising: the information processing device according to any one of the first to fifteenth aspects; and a focus lens. The processor performs focus control to move the focus lens to a focus position determined according to the first distance.

According to a seventeenth aspect of the technology of the present disclosure, there is provided an information processing method comprising: causing a light irradiator to perform surface irradiation on a distance measurement target region with light; causing a light receiver to receive reflected light of the light from the distance measurement target region; and measuring a first distance to an object in the distance measurement target region on the basis of an irradiation timing when the light irradiator performs the surface irradiation on the distance measurement target region with the light and a light receiving timing when the light receiver receives the reflected light. The first distance is measured on the basis of the light receiving timing and the irradiation timing corresponding a signal, which is selected on the basis of a relationship between a plurality of signals generated by the light receiver at a plurality of timings within a light receiving period corresponding to the surface irradiation by the light irradiator and intensities of the plurality of signals, among the plurality of signals.

According to an eighteenth aspect of the technology of the present disclosure, there is provided a non-transitory computer readable recording medium storing a program that causes a computer to execute a process comprising: causing a light irradiator to perform surface irradiation on a distance measurement target region with light; causing a light receiver to receive reflected light of the light from the distance measurement target region; and measuring a first distance to an object in the distance measurement target region on the basis of an irradiation timing when the light irradiator performs the surface irradiation on the distance measurement target region with the light and a light receiving timing when the light receiver receives the reflected light. The first distance is measured on the basis of the light receiving timing and the irradiation timing corresponding a signal, which is selected on the basis of a relationship between a plurality of signals generated by the light receiver at a plurality of timings within a light receiving period corresponding to the surface irradiation by the light irradiator and intensities of the plurality of signals, among the plurality of signals.

BRIEF DESCRIPTION OF THE DRAWINGS

FIG. 3 is a conceptual diagram illustrating an example of an aspect in which an imaging region is imaged by a distance measurement imaging device included in the smart device according to the first embodiment and a visible light image is displayed on a display.

FIG. 5 is a schematic perspective view illustrating an example of the disposition of each pixel included in a photoelectric conversion element of the smart device according to the first embodiment.

FIG. 11 is a conceptual diagram illustrating an example of the processing content of a first distance measurement control unit illustrated in FIG. 10.

FIG. 14 is a conceptual diagram illustrating an example of a time-series distribution generated by a time-series distribution generation unit of the first distance measurement system processing circuit included in the smart device according to the first embodiment.

FIG. 17 is a block diagram illustrating an example of the content of a first imaging process executed by the execution unit illustrated in FIG. 15.

FIG. 18 is a block diagram illustrating an example of the content of a specific process executed by the execution unit illustrated in FIG. 15.

FIG. 26 is a conceptual diagram illustrating an example of processing content related to contrast AF imaging performed by the smart device according to the second embodiment.

FIG. 28 is a conceptual diagram illustrating an example of a time-series distribution of a pattern different from that illustrated in FIG. 14.

FIG. 29 is a conceptual diagram illustrating an example of an aspect in which a filter is applied to the time-series distribution.

DESCRIPTION OF THE PREFERRED EMBODIMENTS

Hereinafter, an example of an embodiment of an imaging device according to the technology of the present disclosure will be described with reference to the accompanying drawings.

First, terms used in the following description will be described.

CPU is an abbreviation of "Central Processing Unit". RAM is an abbreviation of "Random Access Memory". ASIC is an abbreviation of "Application Specific Integrated Circuit". PLD is an abbreviation of "Programmable Logic Device". FPGA is an abbreviation of "Field-Programmable Gate Array". SoC is an abbreviation of "System-on-a-chip". SSD is an abbreviation of "Solid State Drive". USB is an abbreviation of "Universal Serial Bus". HDD is an abbreviation of "Hard Disk Drive". EEPROM is an abbreviation of "Electrically Erasable and Programmable Read Only Memory". EL is an abbreviation of "Electro-Luminescence". A/D is an abbreviation of "Analog/Digital". I/F is an abbreviation of "Interface". UI is an abbreviation of "User Interface". LTE is an abbreviation of "Long Term Evolution". 5G is an abbreviation of "5th Generation". LD is an abbreviation of "Laser Diode". IR is an abbreviation of "Infrared". APD is an abbreviation of "Avalanche Photodiode". TOF is an abbreviation of "Time of Flight". fps is an abbreviation of "frame per second". LED is an abbreviation of "Light Emitting Diode". ROI is an abbreviation of "Region of Interest". LAN is an abbreviation of "Local Area Network". AF is an abbreviation of "Auto Focus". IC is an abbreviation of "Integrated Circuit".

In the description of the specification, "horizontality" means horizontality including an error that is generally allowed in the technical field to which the technology of the present disclosure belongs, in addition to perfect horizontality. In the description of the specification, "parallelism" means parallelism including an error that is generally allowed in the technical field to which the technology of the present disclosure belongs, in addition to perfect parallelism. In the description of the specification, "verticality" means verticality including an error that is generally allowed in the technical field to which the technology of the present disclosure belongs, in addition to perfect verticality. In the description of the specification, "match" means match including an error that is generally allowed in the technical field to which the technology of the present disclosure belongs, in addition to exact match.

First Embodiment

Figure 1:
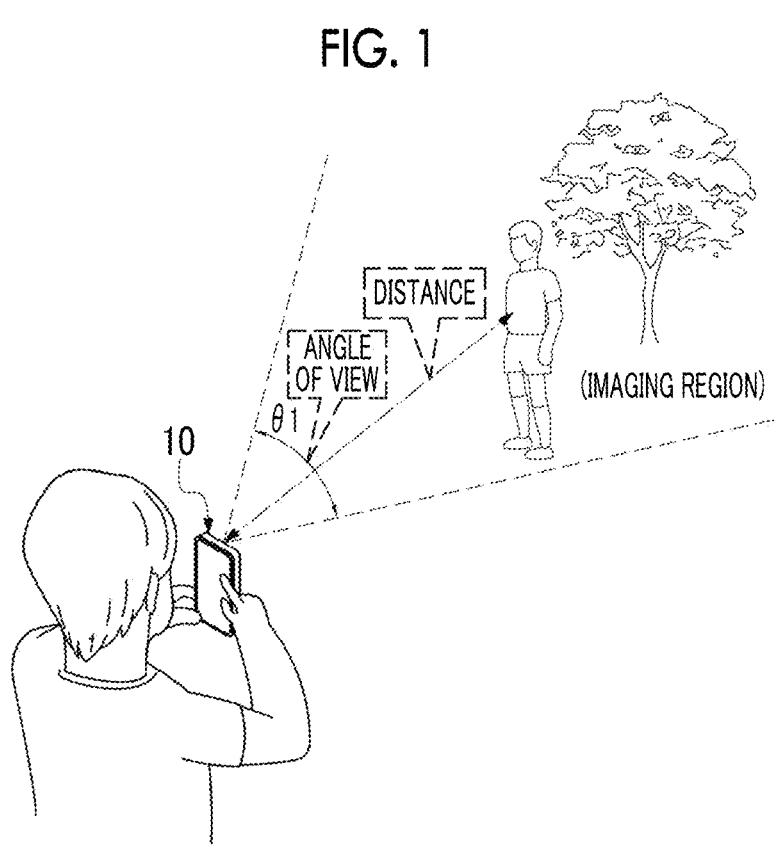
FIG. 1 is a schematic perspective view illustrating an example of a usage aspect of a smart device according to a first embodiment.

For example, as illustrated in FIG. 1, a smart device 10 performs an imaging operation of imaging an imaging region defined by an angle of view θ1 (hereinafter, also simply referred to as an "imaging operation") and a distance measurement operation. In the first embodiment, "distance measurement" means a process of measuring a distance from the smart device 10 to the imaging region. Here, the imaging region is an example of a "distance measurement target region" according to the technology of the present disclosure. In addition, the smart device 10 is an example of an "information processing device" and an "imaging device" according to the technology of the present disclosure. An example of the smart device 10 is a smartphone or a tablet terminal which is an electronic device having an imaging function.

The smart device 10 performs first distance measurement and second distance measurement that are different in distance measurement method. The first distance measurement is a distance measurement method (hereinafter, also referred to as an "active method") that measures the distance to an object in the imaging region on the basis of the time when the smart device 10 irradiates the imaging region with laser light and the time when the smart device 10 receives reflected light of the laser light from the imaging region. Here, the laser light is an example of "light" according to the technology of the present disclosure. In addition, here, the surface irradiation of the imaging region with the laser light is performed. Further, the surface irradiation means irradiation in which a beam diameter of the laser light emitted to the imaging region is larger than that in spot irradiation. In the surface irradiation, the beam diameter of the laser light gradually increases in the irradiation direction of the laser light. In the surface irradiation, the degree of increase in the beam diameter per unit time is larger than that in the spot irradiation. That is, while the laser light is emitted in a point shape to a certain surface in the imaging region in the spot irradiation, the laser light is emitted in a surface shape to a certain surface in the imaging region in the surface irradiation. Further, the laser light may be emitted with one shot or may be periodically emitted at intervals (for example, at an interval of 0.1 seconds). In this case, the first distance measurement may be performed whenever the laser light is emitted, and a process based on a distance measurement result may be performed.

The second distance measurement is a distance measurement method (hereinafter, also referred to as a "passive method") that measures the distance to the object in the imaging region on basis of an image obtained by imaging the imaging region with the smart device 10. In addition, the second distance measurement is an example of "image-based distance measurement" according to the technology of the present disclosure.

The smart device 10 measures the distance using a hybrid distance measurement method which a combination of active distance measurement and passive distance measurement. Then, the smart device 10 performs imaging associated with active focus control and imaging associated with passive focus control. The active focus control means focus control based on the distance measurement result obtained by performing the active distance measurement. The passive focus control means focus control based on the distance measurement result obtained by performing the passive distance measurement.

Figure 2:
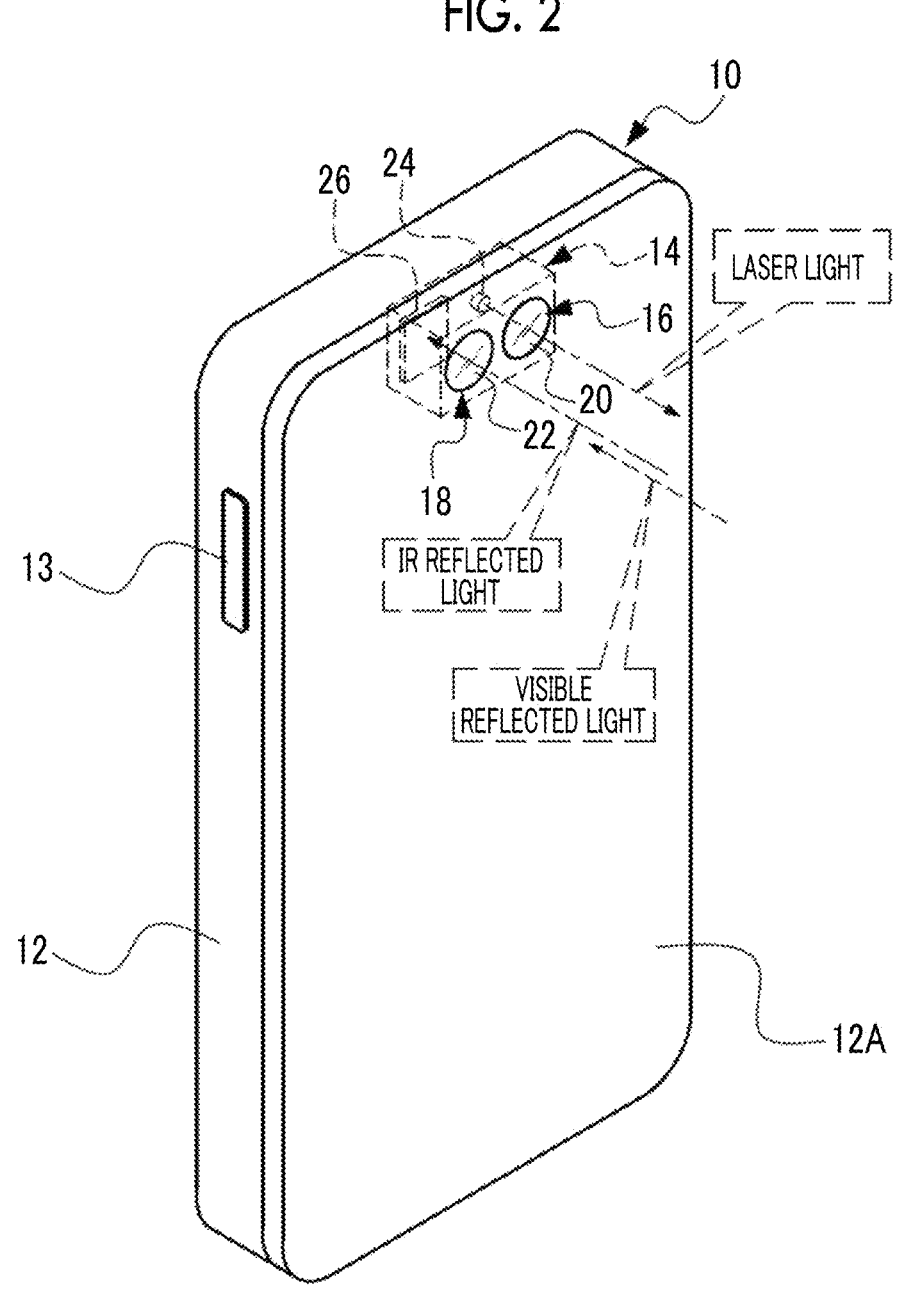
FIG. 2 is a rear perspective view illustrating an example of the outward appearance of a rear side of the smart device according to the first embodiment.

For example, as illustrated in FIG. 2, the smart device 10 comprises a housing 12. A distance measurement imaging device 14 is accommodated in the housing 12. The distance measurement imaging device 14 comprises a light irradiator 16 and a light receiver 18. The light irradiator 16 comprises an LD 24. The smart device 10 performs the imaging operation and the distance measurement operation with the distance measurement imaging device 14.

An instruction key 13 is disposed on a side surface of the smart device 10. The instruction key 13 receives various instructions. The "various instructions" described here are, for example, an instruction to display a menu screen on which various menus can be selected, an instruction to select one or more menus, an instruction to confirm the selected content, and an instruction to delete the selected content.

Translucent windows 20 and 22 are provided in an upper left portion of a rear surface 12A of the housing 12 in a state in which the smart device 10 is placed vertically (an upper left portion in a rear view of the smart device 10 in a vertically placed state). The translucent windows 20 and 22 are optical elements having translucency (for example, lenses), are disposed at a predetermined interval (for example, an interval of several millimeters) along the horizontal direction, and are exposed from the rear surface 12A. The light irradiator 16 irradiates the imaging region through the translucent window 20 with the laser light emitted from the LD 24. In the first embodiment, the light irradiator 16 irradiates the imaging region with the laser light in an infrared wavelength range. In addition, the wavelength range of the laser light is not limited thereto, and laser light in other wavelength ranges may be used.

The light receiver 18 acquires IR reflected light through the translucent window 22. The IR reflected light means reflected light of the laser light, which has been emitted to the distance measurement target by the light irradiator 16, from the distance measurement target. Further, the light receiver 18 acquires visible reflected light through the translucent window 22. The visible reflected light means reflected light of visible light (for example, visible light included in sunlight), which has been emitted to the imaging region, from the imaging region. In addition, in the following description, for convenience of explanation, in a case in which the IR reflected light and the visible reflected light do not need to be distinguished from each other, they are simply referred to as "reflected light".

The light receiver 18 is an example of an "imager" according to the technology of the present disclosure and comprises a photoelectric conversion element 26. The photoelectric conversion element 26 receives the reflected light acquired by the light receiver 18 through the translucent window 22 and outputs an electric signal corresponding to the amount of reflected light received.

Figure 3:
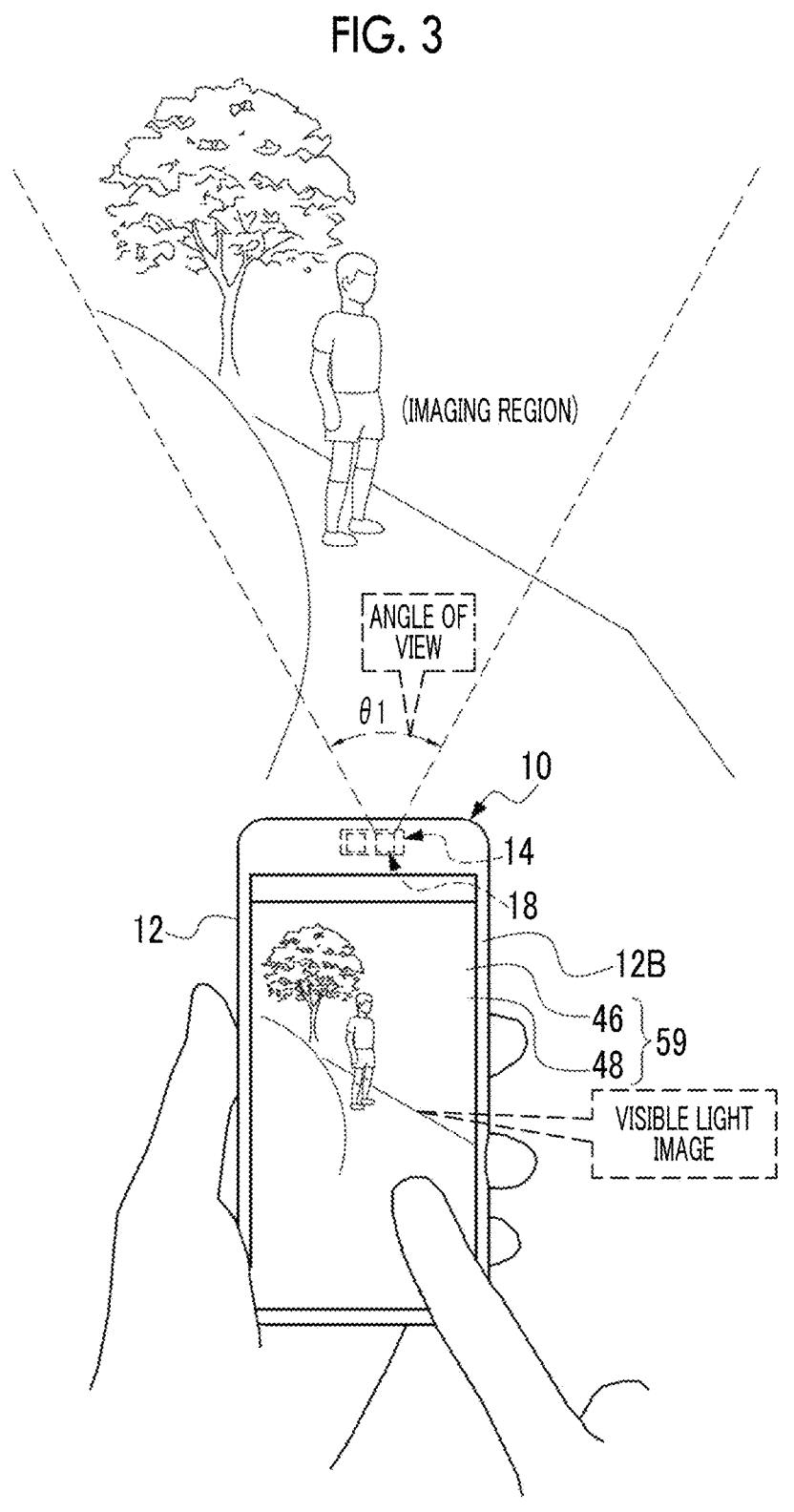

For example, as illustrated in FIG. 3, a touch panel display 59 is provided on a front surface 12B of the housing 12. The touch panel display 59 comprises a display 46 and a touch panel 48. An example of the display 46 is an organic EL display. The display 46 may be another type of display, such as a liquid crystal display, instead of the organic EL display.

The display 46 displays, for example, images (for example, a live view image and a playback image) and text information. The touch panel 48 is a transmissive touch panel and is superimposed on a surface of a display region of the display 46. The touch panel 48 detects contact with an indicator, such as a finger or a stylus pen, to receive an instruction from the user. In addition, here, an out-cell touch panel display in which the touch panel 48 is superimposed on the surface of the display region of the display 46 is given as an example of the touch panel display 59. However, this is just an example. For example, an on-cell or in-cell touch panel display may be applied as the touch panel display 59.

In the smart device 10, in a case in which an instruction to start imaging is received by the touch panel 48, the imaging region is imaged by the light receiver 18. That is, the light receiver 18 receives the visible reflected light and generates a visible light image showing the imaging region as an image corresponding to the received visible reflected light. The visible light image is an example of an "image", a "subject image", and a "captured image" according to the technology of the present disclosure.

The visible light image is displayed as a live view image or a still image on the display 46 in response to the instruction received by the touch panel 48. In the example illustrated in FIG. 3, the imaging region is defined by the angle of view θ1. The angle of view θ1 is changed in response to the instruction received by the touch panel 48.

Figure 4:
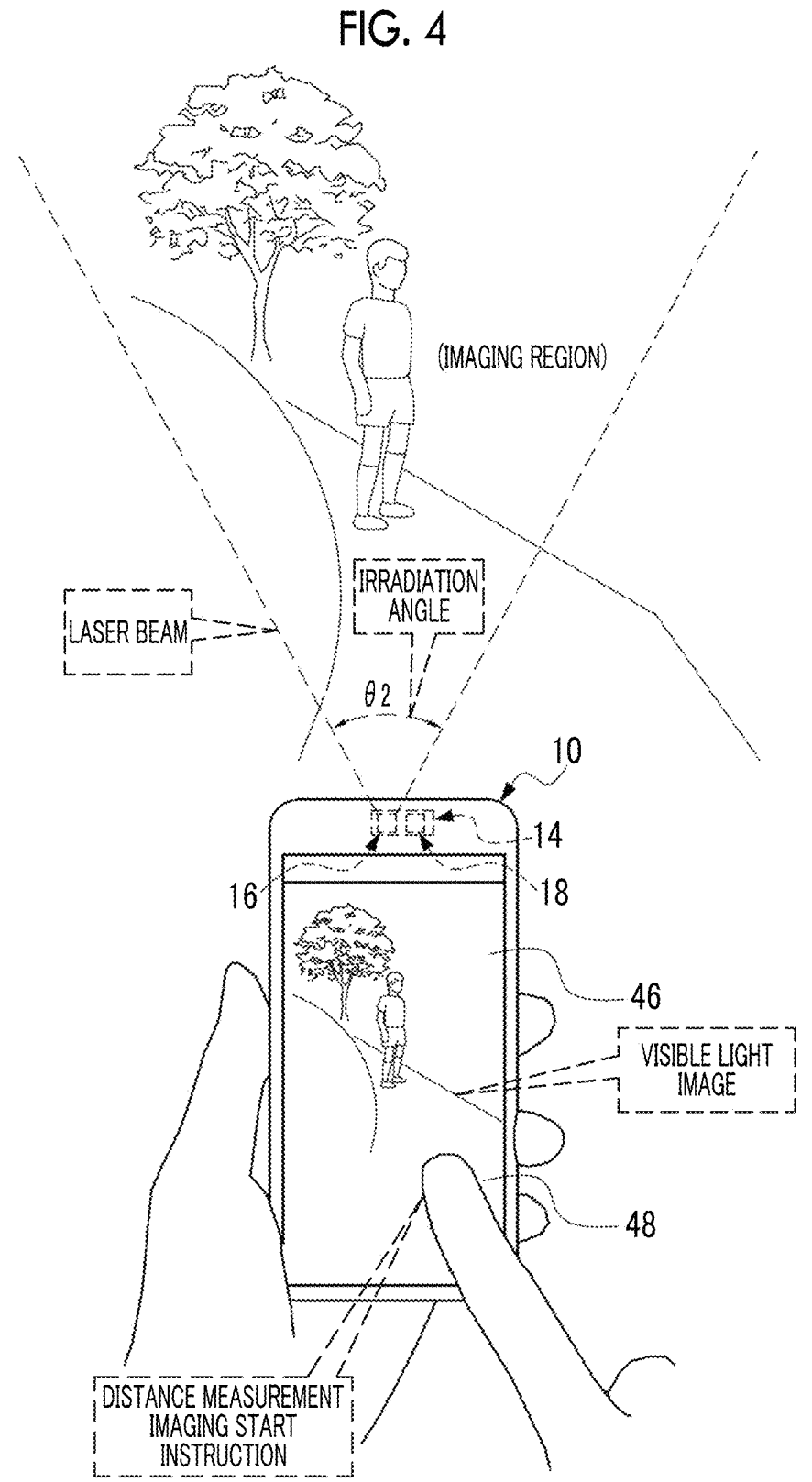
FIG. 4 is a conceptual diagram illustrating an example of an aspect in which the distance measurement imaging device included in the smart device according to the first embodiment irradiates the imaging region with laser light.

For example, as illustrated in FIG. 4, in the smart device 10, in a case in which an instruction to start distance measurement and imaging (hereinafter, also referred to as a "distance measurement imaging start instruction") is received by the touch panel 48, the light irradiator 16 emits laser light. The angle at which the laser light is emitted (hereinafter, also referred to as an "irradiation angle") is θ2, and the irradiation angle θ2 is changed in response to the instruction received by the touch panel 48. In addition, in the example illustrated in FIG. 4, an aspect is described in which distance measurement is started in response to the distance measurement imaging start instruction received by the touch panel 48 in a state in which a visible light image is displayed as a live view image on the display 46. However, the technology of the present disclosure is not limited thereto. For example, the distance measurement may be started in a state in which the touch panel 48 receives the distance measurement image start instruction in a state in which the visible light image is not displayed on the display 46.

In the smart device 10, the distance from the smart device 10 to the distance measurement target is measured on the basis of the time required from the emission of the laser light by the light irradiator 16 to the reception of the IR reflected light by the light receiver 18 and the speed of light. For example, assuming that the distance to the distance measurement target is "$L_0$", the speed of light is "c", and the flight time of the laser light, that is, the time required from the emission of the laser light by the light irradiator 16 to the reception of the IR reflected light by the light receiver 18 (hereinafter, also simply referred to as a "flight time") is "t", the distance $L_0$ is calculated by an expression of "$L_0 = c \times t \times 0.5$".

Figure 5:
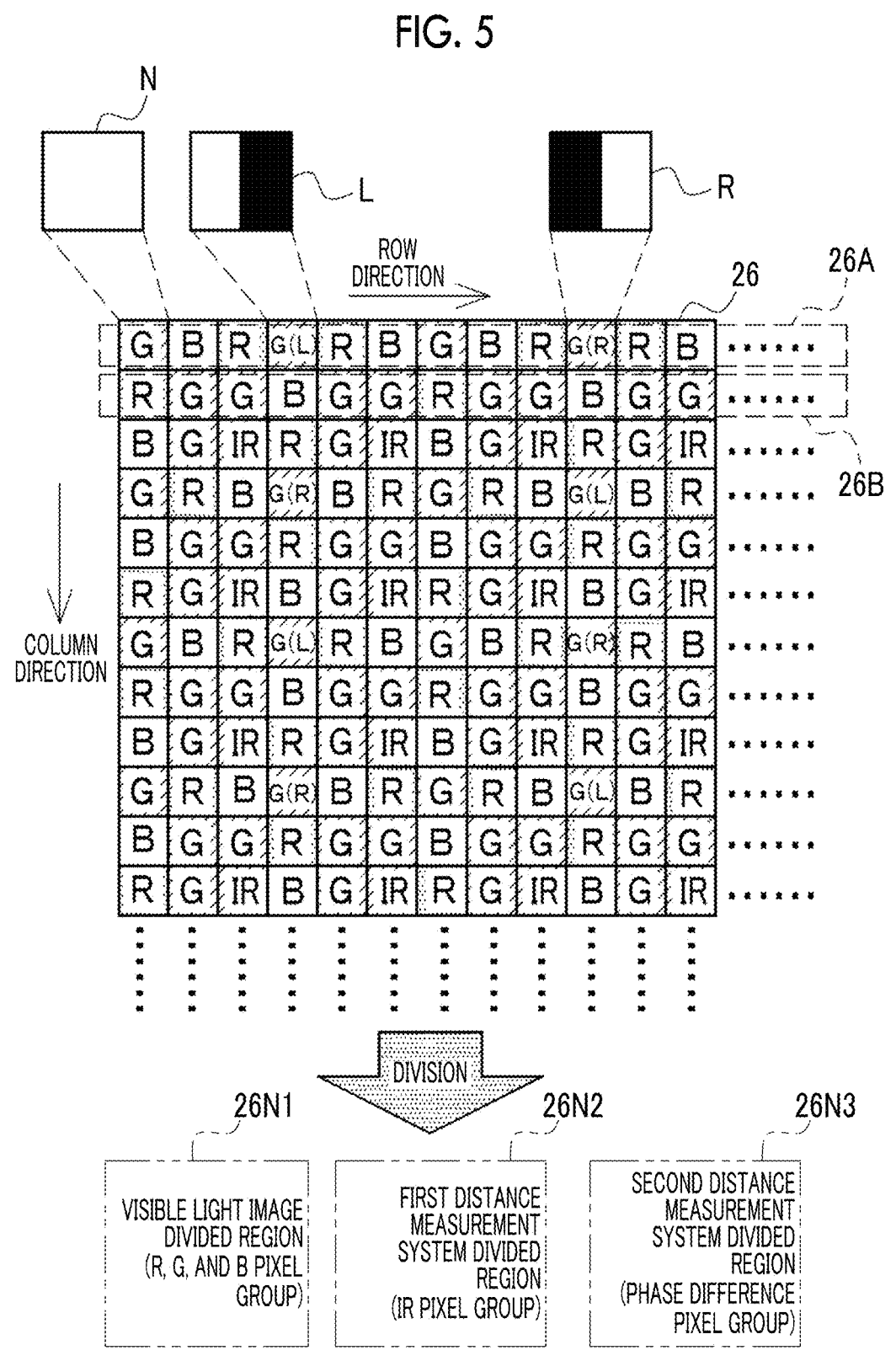

For example, as illustrated in FIG. 5, the photoelectric conversion element 26 includes a plurality of photodiodes that are arranged in a matrix. Photodiodes corresponding to "4896×3265" pixels are given as an example of the plurality of photodiodes.

A color filter is disposed in each photodiode included in the photoelectric conversion element 26. The color filters include a green (G) filter corresponding to a G wavelength range, a red (R) filter corresponding to an R wavelength range, a blue (B) filter corresponding to a B wavelength range, and an infrared (IR) filter corresponding to an IR wavelength range which contribute most to obtaining a brightness signal. Further, in the first embodiment, the G filter, the R filter, and the B filter also have the function of an infrared cut filter that cuts infrared light.

The photoelectric conversion element 26 includes two types of photosensitive pixels of a phase difference pixel and a non-phase difference pixel N which is a pixel different from the phase difference pixel. In general, the non-phase difference pixel N is also referred to as a normal pixel. The photoelectric conversion element 26 has four types of photosensitive pixels of an R pixel, a G pixel, a B pixel, and an IR pixel as the non-phase difference pixels. The R pixel, the G pixel, the B pixel, the IR pixel, and the phase difference pixel are regularly arranged in each of a row direction (horizontal direction) and a column direction (vertical direction) with a predetermined periodicity. The R pixel is a pixel corresponding to the photodiode in which the R filter is disposed, the G pixel and the phase difference pixel are pixels corresponding to the photodiodes in which the G filter is disposed, the B pixel is a pixel corresponding to the photodiode in which the B filter is disposed, and the IR pixel is a pixel corresponding to the photodiode in which the IR filter is disposed. An example of the IR pixel is an InGaAs APD.

In addition, in the following description, for convenience of explanation, in a case in which the G filter, the R filter, and the B filter do not need to be distinguished from each other, they are also referred to as "visible light filters". Further, in the following description, for convenience of explanation, in a case in which the R pixel, the G pixel, and the B pixel do not need to be distinguished from each other, they are referred to as "visible light pixels".

A plurality of phase difference pixel lines 26A and a plurality of non-phase difference pixel lines 26B are arranged on a light receiving surface of the photoelectric conversion element 26. The phase difference pixel line 26A is a horizontal line including the phase difference pixels. Specifically, the phase difference pixel line 26A is a horizontal line in which the phase difference pixels and the non-phase difference pixels N are mixed. The non-phase difference pixel line 26B is a horizontal line including only a plurality of non-phase difference pixels N.

The phase difference pixel lines 26A and the non-phase difference pixel lines 26B corresponding to a predetermined number of lines are alternately arranged along the column direction on the light receiving surface of the photoelectric conversion element 26. Here, the "predetermined number of lines" is, for example, two lines. In addition, here, two lines are given as an example of the predetermined number of lines. However, the technology of the present disclosure is not limited thereto. For example, the predetermined number of lines may be three or more lines, a dozen or more lines, dozens of lines, or hundreds of lines.

Every third row from the first row to the last row in the column direction is the phase difference pixel line 26A. Some pixels in the phase difference pixel line 26A are the phase difference pixels. Specifically, the phase difference pixel line 26A is a horizontal line in which the phase difference pixels and the non-phase difference pixels N are periodically arranged. The phase difference pixels are roughly classified into a first phase difference pixel L and a second phase difference pixel R. In the phase difference pixel line 26A, the first phase difference pixel L and the second phase difference pixel R are alternately arranged as the G pixels at intervals of several pixels in a line direction.

The first phase difference pixel L and the second phase difference pixel R are disposed so as to appear alternately in the column direction. In the example illustrated in FIG. 5, in a fourth column, the first phase difference pixel L, the second phase difference pixel R, the first phase difference pixel L, and the second phase difference pixel R are disposed in this order from the first row along the column direction. That is, the first phase difference pixel L and the second phase difference pixel R are alternately disposed from the first row along the column direction. Further, in the example illustrated in FIG. 5, in a tenth column, the second phase difference pixel R, the first phase difference pixel L, the second phase difference pixel R, and the first phase difference pixel L are disposed in this order from the first row along the column direction. That is, the second phase difference pixel R and the first phase difference pixel L are alternately disposed from the first row along the column direction.

The photoelectric conversion element 26 is divided into three regions. That is, the photoelectric conversion element 26 has a visible light image divided region 26N1, a first distance measurement system divided region 26N2, and a second distance measurement system divided region 26N3. The visible light image divided region 26N1 is a visible light pixel group that is composed of a plurality of visible light pixels and is used to generate a visible light image. The first distance measurement system divided region 26N2 is an IR pixel group that is composed of a plurality of IR pixels arranged two-dimensionally and is used for the first distance measurement. Here, the IR pixel is an example of a "specific pixel" according to the technology of the present disclosure. The second distance measurement system divided region 26N3 is a phase difference pixel group that is composed of a plurality of phase difference pixels and is used for the second distance measurement. The visible light image divided region 26N1 and the second distance measurement system divided region 26N3 receive visible reflected light and output an electric signal corresponding to the amount of light received. The first distance measurement system divided region 26N2 receives IR reflected light and outputs an electric signal corresponding to the amount of light received.

Figure 6:
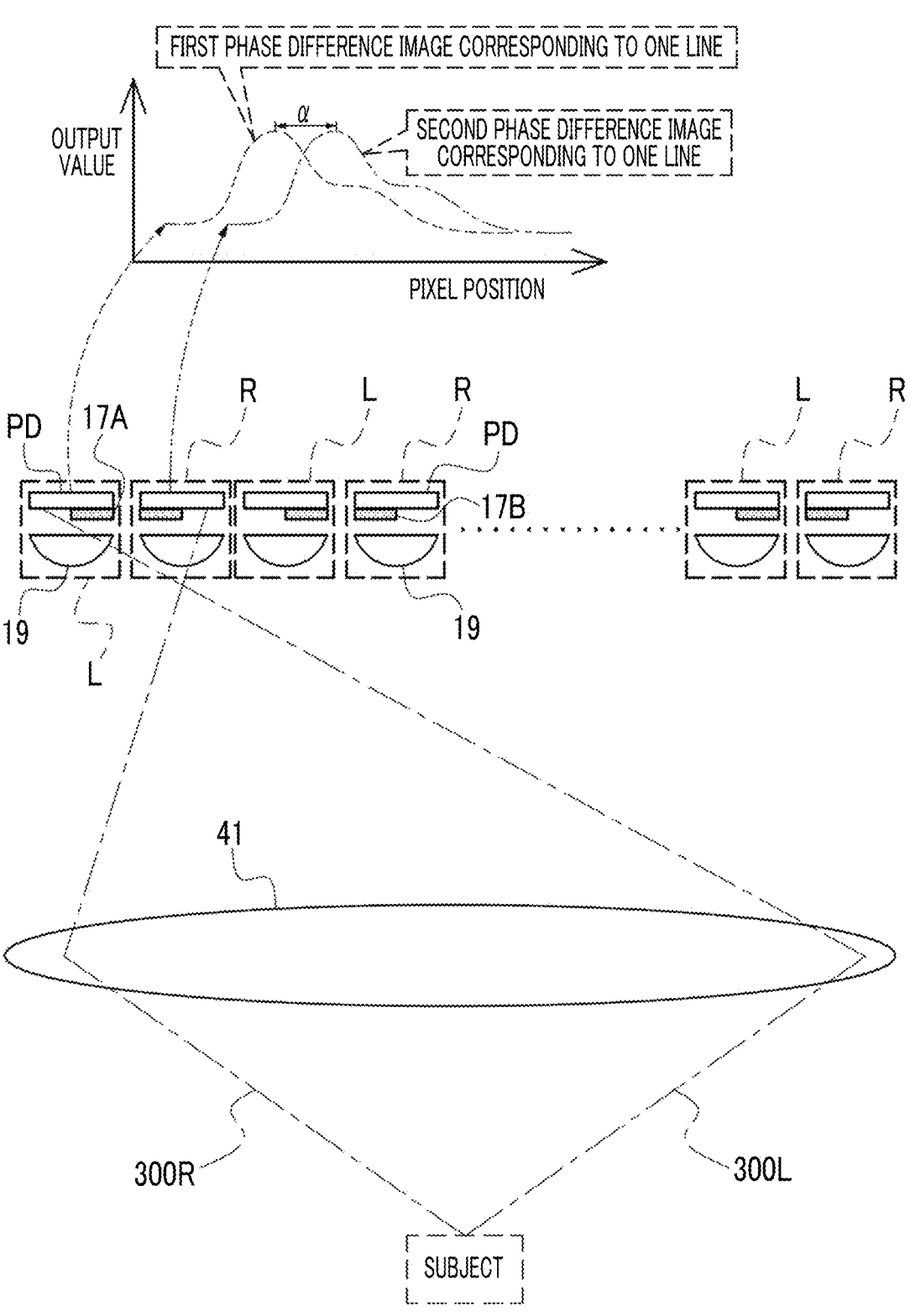
FIG. 6 is a conceptual diagram illustrating an example of the incident characteristics of subject light on a first phase difference pixel and a second phase difference pixel included in the photoelectric conversion element illustrated in FIG. 5.

For example, as illustrated in FIG. 6, the first phase difference pixel L comprises a microlens 19, a light shielding member 17A, and a photodiode PD. In the first phase difference pixel L, the light shielding member 17A is disposed between the microlens 19 and a light receiving surface of the photodiode PD. The left half of the light receiving surface of the photodiode PD in the row direction (the left side in a case in which a subject is viewed from the light receiving surface (in other words, the right side in a case in which the light receiving surface is viewed from the subject)) is shielded by the light shielding member 17A.

The second phase difference pixel R comprises the microlens 19, a light shielding member 17B, and the photodiode PD. In the second phase difference pixel R, the light shielding member 17B is disposed between the microlens 19 and the light receiving surface of the photodiode PD. The right half of the light receiving surface of the photodiode PD in the row direction (the right side in a case in which the subject is viewed from the light receiving surface (in other words, the left side in a case in which the light receiving surface is viewed from the subject)) is shielded by the light shielding member 17B. In the following description, for convenience of explanation, in a case in which the light shielding members 17A and 17B do not need to be distinguished from each other, they are referred to as "light shielding members" without reference numerals.

Luminous flux passing through an exit pupil of an imaging lens 41 is roughly classified into left region passing light 300L and right region passing light 300R. The left region passing light 300L means left half luminous flux in a case in which the subject is viewed from the phase difference pixel in the luminous flux passing through the exit pupil of the imaging lens 41. The right region passing light 300R means right half luminous flux in a case in which the subject is viewed from the phase difference pixel in the luminous flux passing through the exit pupil of the imaging lens 41. The luminous flux passing through the exit pupil of the imaging lens 41 is divided into left luminous flux and right luminous flux by the microlens 19, the light shielding member 17A, and the light shielding member 17B that function as a pupil dividing portion. The first phase difference pixel L receives the left region passing light 300L as subject light, and the second phase difference pixel R receives the right region passing light 300R as subject light. As a result, the photoelectric conversion element 26 generates a first phase difference image which corresponds to the subject image corresponding to the left region passing light 300L and a second phase difference image which corresponds to the subject image corresponding to the right region passing light 300R.

In the smart device 10, for example, in the same phase difference pixel line 26A, the distance to the imaging region is measured on the basis of the amount of deviation $\alpha$ between the first phase difference image corresponding to one line and the second phase difference image corresponding to one line.

Figure 7:
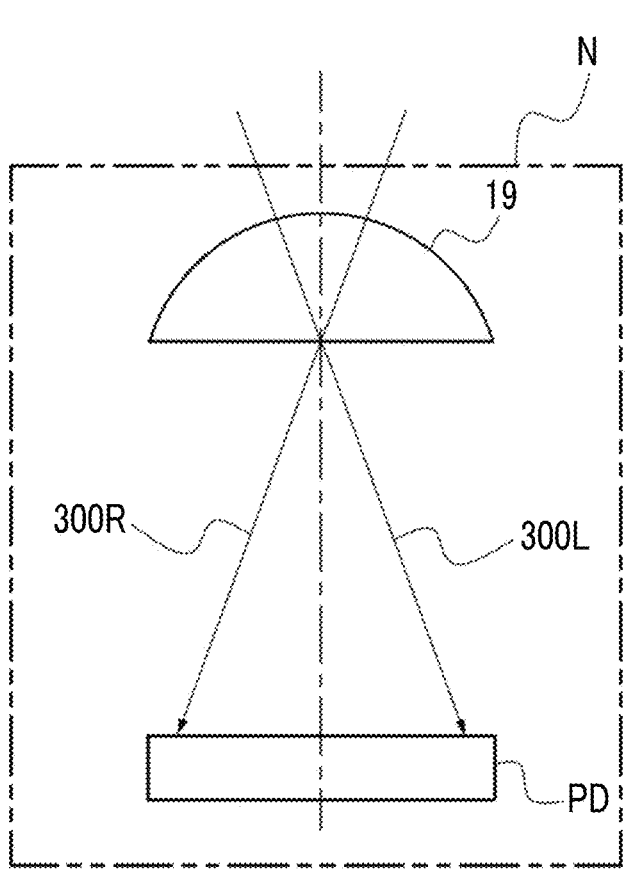
FIG. 7 is a schematic diagram illustrating an example of a configuration of a non-phase difference pixel included in the photoelectric conversion element illustrated in FIG. 5.

For example, as illustrated in FIG. 7, the non-phase difference pixel N is different from the phase difference pixel in that it does not have the light shielding member. The photodiode PD of the non-phase difference pixel N receives the left region passing light 300L and the right region passing light 300R as the subject light.

Figure 8:
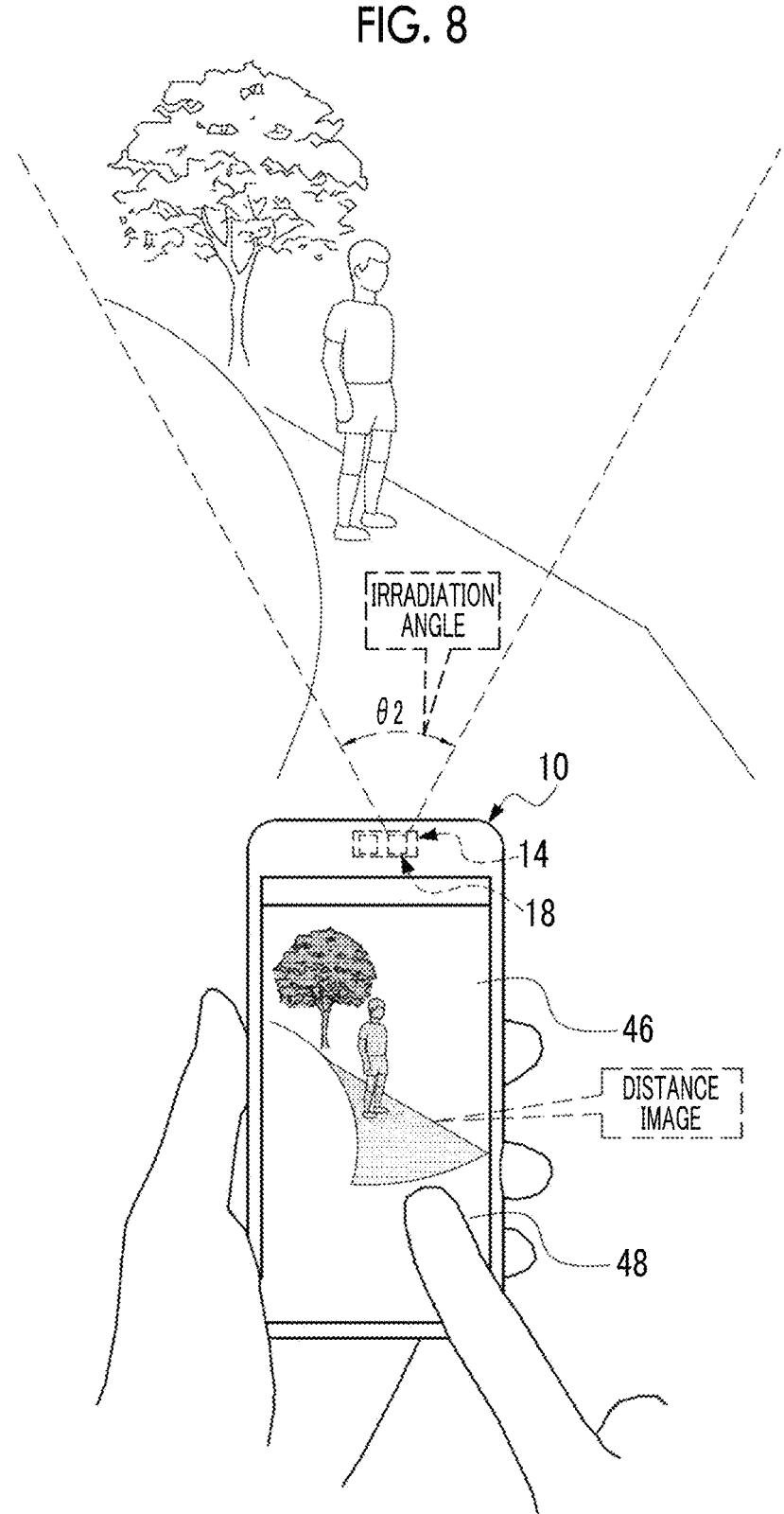
FIG. 8 is a conceptual diagram illustrating an example of an aspect in which a distance image based on a distance measurement result obtained by performing first distance measurement for the imaging region with the distance measurement imaging device included in the smart device according to the first embodiment is displayed on the display.

Further, in the smart device 10, each of a plurality of IR pixels included in the second distance measurement system divided region 26N3 (see FIG. 5) receives the IR reflected light to perform distance measurement for each IR pixel. Then, in the smart device 10, for example, as illustrated in FIG. 8, the distance measurement result for each IR pixel is displayed as a distance image on the display 46 in response to the instruction received by the touch panel 48. Here, the distance image means an image in which the distance to the distance measurement target measured for each IR pixel is expressed by colors and/or shades.

Further, in the smart device 10, the distance measurement result is displayed as the distance image or a distance superimposed image (not illustrated) on the display 46 in response to the instruction received by the touch panel 48. The distance superimposed image displayed on the display 46 is, for example, an image in which a numerical value indicating the distance measurement result is superimposed on a visible light image (for example, a live view image). For example, the distance from the smart device 10 to each of a plurality of typical positions (for example, three positions) in the imaging region is displayed on the display 46 in a state in which it is displayed in the visible light image.

An example of the plurality of typical positions is a plurality of positions having a contrast difference equal to or greater than a predetermined value among specific subjects (for example, a subject included in a center region of a screen and/or a person).

Figure 9:
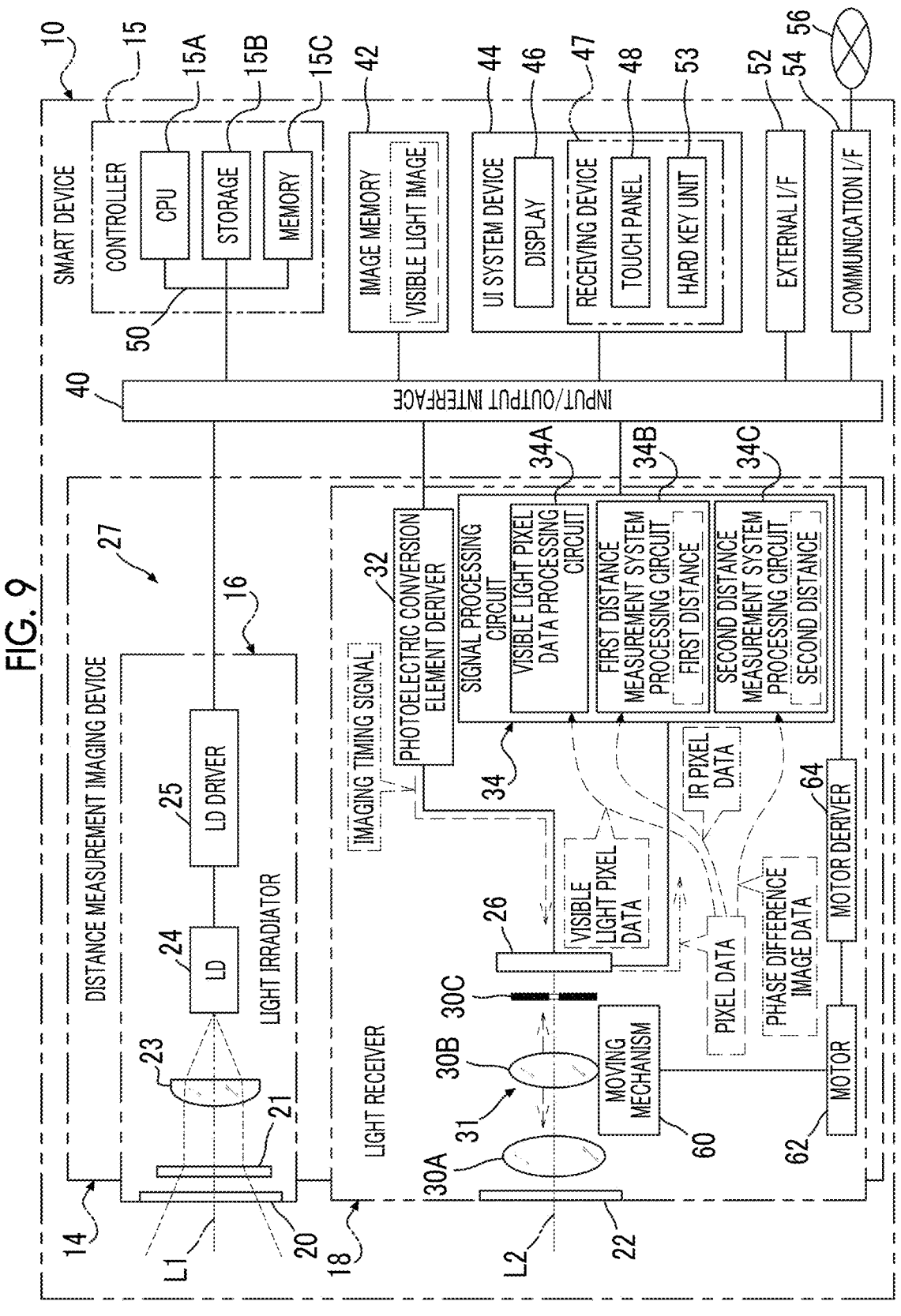
FIG. 9 is a block diagram illustrating an example of an electrical hardware configuration of the smart device according to the first embodiment.

For example, as illustrated in FIG. 9, the smart device 10 comprises a controller 15, an input/output interface 40, an image memory 42, a UI system device 44, an external I/F 52, and a communication I/F 54 in addition to the light irradiator 16 and the light receiver 18.

The controller 15 comprises a CPU 15A, a storage 15B, and a memory 15C. The CPU 15A, the storage 15B, and the memory 15C are connected through a bus 50, and the bus 50 is connected to the input/output interface 40. In the example illustrated in FIG. 9, one bus is illustrated as the bus 50 for convenience of illustration. However, a plurality of buses may be used. The bus 50 may be a serial bus or may be a parallel bus including, for example, a data bus, an address bus, and a control bus.

The storage 15B stores various parameters and various programs. The storage 15B is a non-volatile storage device. Here, a flash memory is adopted as an example of the storage 15B. The flash memory is just an example. Examples of the storage 15B include various non-volatile memories, such as a magnetoresistive memory and/or a ferroelectric memory, instead of the flash memory or in addition to the flash memory. Further, the non-volatile storage device may be, for example, an EEPROM, an HDD, and/or an SSD. Furthermore, the memory 15C temporarily stores various kinds of information and is used as a work memory. An example of the memory 15C is a RAM. However, the memory is not limited to the RAM and may be other types of storage devices.

Various programs are stored in the storage 15B. The CPU 15A reads out a necessary program from the storage 15B and executes the read-out program on the memory 15C. The CPU 15A controls the entire smart device 10 according to the program executed on the memory 15C. In addition, the storage 15B and the memory 15C are an example of a "memory" according to the technology of the present disclosure.

A plurality of devices are connected to the input/output interface 40, and the input/output interface 40 controls the exchange of various kinds of information between the plurality of devices. In the example illustrated in FIG. 9, the controller 15, the light irradiator 16, the light receiver 18, the image memory 42, the UI system device 44, the external I/F 52, and the communication I/F 54 are illustrated as the plurality of devices connected to the input/output interface 40.

The external I/F 52 transmits and receives various kinds of information to and from a device (hereinafter, also referred to as an "external device") outside the smart device 10. An example of the external I/F 52 is a USB interface. External devices (not illustrated), such as a smart device, a personal computer, a server, a USB memory, a memory card, and/or a printer, can be directly or indirectly connected to the USB interface.

The communication I/F 54 has communication functions of, for example, LTE, 5G, wireless LAN, and/or Bluetooth (registered trademark) and transmits and receives various kinds of information between the external device and the CPU 15A. For example, the communication I/F 54 is connected to a network 56 (for example, the Internet) through a base station (not illustrated) so as to communicate with the network 56 and transmits and receives various kinds of information between the external device on the network 56 and the CPU 15A.

The UI system device 44 comprises a display 46, and the CPU 15A displays various kinds of information on the display 46. Further, the UI system device 44 comprises a receiving device 47. The receiving device 47 comprises a touch panel 48 and a hard key unit 53. The hard key unit 53 is at least one hard key including the instruction key 13 (see FIG. 2). The CPU 15A operates in response to various instructions received by the touch panel 48. In addition, here, the hard key unit 53 is included in the UI system device 44. However, the technology of the present disclosure is not limited thereto. For example, the hard key unit 53 may be connected to the external I/F 52.

The light irradiator 16 comprises the translucent window 20, a beam expander 21, a collimating lens 23, the LD 24, and an LD driver 25. The translucent window 20, the beam expander 21, and the collimating lens 23 are disposed in this order from the imaging region side (object side) to the LD 24 along an optical axis L1. The LD driver 25 is connected to the LD 24 and the input/output interface 40 and drives the LD 24 such that laser light is emitted from the LD 24 in response to the instruction of the CPU 15A.

The laser light emitted from the LD 24 is converted into parallel light by the collimating lens 23, and the beam diameter of the laser light is expanded by the beam expander 21. Then, the laser light is emitted from the translucent window 20 to the distance measurement target.

The light receiver 18 comprises the translucent window 22, an objective lens 30A, a focus lens 30B, a stop 30C, the photoelectric conversion element 26, a photoelectric conversion element driver 32, and a signal processing circuit 34. In addition, the CPU 15A and the signal processing circuit 34 are an example of a "processor" according to the technology of the present disclosure.

In the light receiver 18, the translucent window 22, the objective lens 30A, the focus lens 30B, and the stop 30C are disposed in this order from the imaging region side (object side) to the photoelectric conversion element 26 along an optical axis L2. The photoelectric conversion element driver 32 is connected to the photoelectric conversion element 26 and the input/output interface 40 and drives the photoelectric conversion element 26 in response to the instruction of the CPU 15A. For example, the photoelectric conversion element driver 32 supplies an imaging timing signal defining the timing of the imaging performed by the photoelectric conversion element 26 to the photoelectric conversion element 26 under the control of the CPU 15A. The photoelectric conversion element 26 performs resetting, exposure, and the output of an electric signal according to the imaging timing signal supplied from the photoelectric conversion element driver 32. Examples of the imaging timing signal include a vertical synchronization signal and a horizontal synchronization signal.

The light receiver 18 comprises a focus control mechanism 31. The focus control mechanism 31 comprises the focus lens 30B, a moving mechanism 60, a motor 62, and a motor driver 64. The focus lens 30B is supported such that it can be slid along the optical axis L2 by the moving mechanism 60. The motor 62 is connected to the moving mechanism 60 and the motor driver 64. The motor driver 64 is connected to the input/output interface 40 and drives the motor 62 in response to an instruction from the CPU 15A. The moving mechanism 60 is connected to a drive shaft (not illustrated) of the motor 62 and receives power from the motor 62 to selectively move the focus lens 30B between the object side and the image side along the optical axis L2. That is, the CPU 15A controls the driving of the motor 62 through the motor driver 64 to adjust a focus position. Here, the "focus position" is the position of the focus lens 30B on the optical axis L2 in an in-focus state (for example, a state in which the contrast of the visible light image is maximized or a state in which a predetermined depth of field is achieved). Further, in the first embodiment, control to locate the focus lens 30B at the focus position is referred to as "focus control".

The stop 30C is a fixed stop having a fixed aperture. In the case of the fixed stop, exposure adjustment is performed by an electronic shutter of the photoelectric conversion element 26. The stop 30C may be a variable stop instead of the fixed stop. In addition, the objective lens 30A, the focus lens 30B, and the stop 30C included in the light receiver 18 are just examples, and the technology of the present disclosure is established even in a case in which the configuration of the lens and/or the position of the stop 30C changes.

The reflected light is incident on the light receiver 18 from the translucent window 22. The reflected light incident on the translucent window 22 is focused on the photoelectric conversion element 26 through the objective lens 30A, the focus lens 30B, and the stop 30C.

The photoelectric conversion element 26 is connected to the signal processing circuit 34 and outputs pixel data indicating a pixel value for each of the visible light pixel and the IR pixel to the signal processing circuit 34. The signal processing circuit 34 performs A/D conversion on the pixel data input from the photoelectric conversion element 26 to digitize the pixel data and performs various kinds of signal processing on the digitized pixel data.

The signal processing circuit 34 comprises a visible light pixel data processing circuit 34A, a first distance measurement system processing circuit 34B, and a second distance measurement system processing circuit 34C. The visible light pixel data processing circuit 34A performs known signal processing, such as white balance adjustment, sharpness adjustment, gamma correction, a color space conversion process, and color difference correction, on visible light pixel data which is pixel data for the visible light pixel to generate a visible light image. Then, the visible light pixel data processing circuit 34A stores the visible light image in the image memory 42. In addition, the visible light image corresponding to one frame is overwritten in the image memory 42 such that the visible light image in the image memory 42 is updated.

The distance measurement imaging device 14 comprises a TOF camera 27. The TOF camera 27 comprises the light irradiator 16, the first distance measurement system divided region 26N2 (see FIG. 5) of the photoelectric conversion element 26, and the first distance measurement system processing circuit 34B. The first distance measurement system processing circuit 34B acquires an irradiation timing signal indicating an irradiation timing (hereinafter, also simply referred to as an "irradiation timing") when the light irradiator 16 irradiates the imaging region with the laser light from the CPU 15A.

The first distance measurement system processing circuit 34B measures the distance from the smart device 10 to the object in the imaging region for each IR pixel on the basis of the irradiation timing indicated by the irradiation timing signal and the timing (hereinafter, also referred to as "light receiving timing") when the IR reflected light is received by each IR pixel. Here, the timing when the first distance measurement system processing circuit 34B receives the IR pixel data having an output value greater than a reference threshold value (see FIG. 14), which will be described below, is adopted as the light receiving timing. In addition, an example of a noise component is a noise component (for example, IR light included in ambient light) that is generated regardless of the IR reflected light.

The first distance measurement system processing circuit 34B measures the distance from the smart device 10 to the object in the imaging region for each IR pixel on the basis of the irradiation timing and the light receiving timing. Further, the first distance measurement system processing circuit 34B generates a distance image on the basis of the distance measurement result for each IR pixel and stores the generated distance image in the image memory 42. Furthermore, the distance image corresponding one frame is overwritten in the image memory 42 such that the distance image in the image memory 42 is updated.

The second distance measurement system processing circuit 34C acquires phase difference pixel data indicating the pixel value of the phase difference pixel from each of a plurality of phase difference pixels in the second distance measurement system divided region 26N3 (see FIG. 5) included in a region (so-called ROI) designated by the user or the like in the photoelectric conversion element 26. The second distance measurement system processing circuit 34C generates the first phase difference image and the second phase difference image (see FIG. 5) from the phase difference pixel data and calculates the amount of deviation α (see FIG. 5) between the generated first and second phase difference images. Then, the second distance measurement system processing circuit 34C calculates the distance from the smart device 10 to the imaging region on the basis of the calculated amount of deviation α. Specifically, the second distance measurement system processing circuit 34C calculates the distance from the smart device 10 to the object in the imaging region, using an arithmetic expression that has the amount of deviation α as an independent variable and has the distance as a dependent variable.

In addition, here, the arithmetic expression is given as an example. However, the technology of the present disclosure is not limited thereto. For example, the second distance measurement system processing circuit 34C may derive the distance from the smart device 10 to the imaging region, using a table in which the amount of deviation α and the distance are associated with each other.

The CPU 15A acquires the distance (hereinafter, referred to as a "first distance") measured by the first distance measurement system processing circuit 34B from the first distance measurement system processing circuit 34B and acquires the distance (hereinafter, referred to as a "second distance") measured by the second distance measurement system processing circuit 34C from the second distance measurement system processing circuit 34C.

Figure 10:
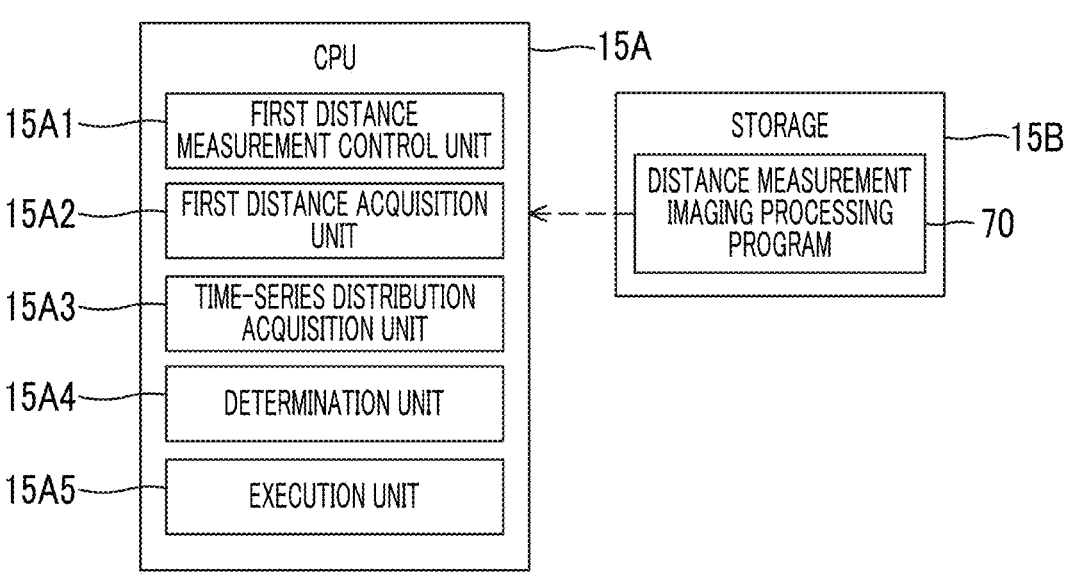
FIG. 10 is a block diagram illustrating an example of functions of a CPU included in the smart device according to the first embodiment.

For example, as illustrated in FIG. 10, a distance measurement imaging processing program 70 is stored in the storage 15B. The CPU 15A reads out the distance measurement imaging processing program 70 from the storage 15B and executes the read-out distance measurement imaging processing program 70 to operate as a first distance measurement control unit 15A1, a first distance acquisition unit 15A2, a time-series distribution acquisition unit 15A3, a determination unit 15A4, and an execution unit 15A5.

Figure 11:
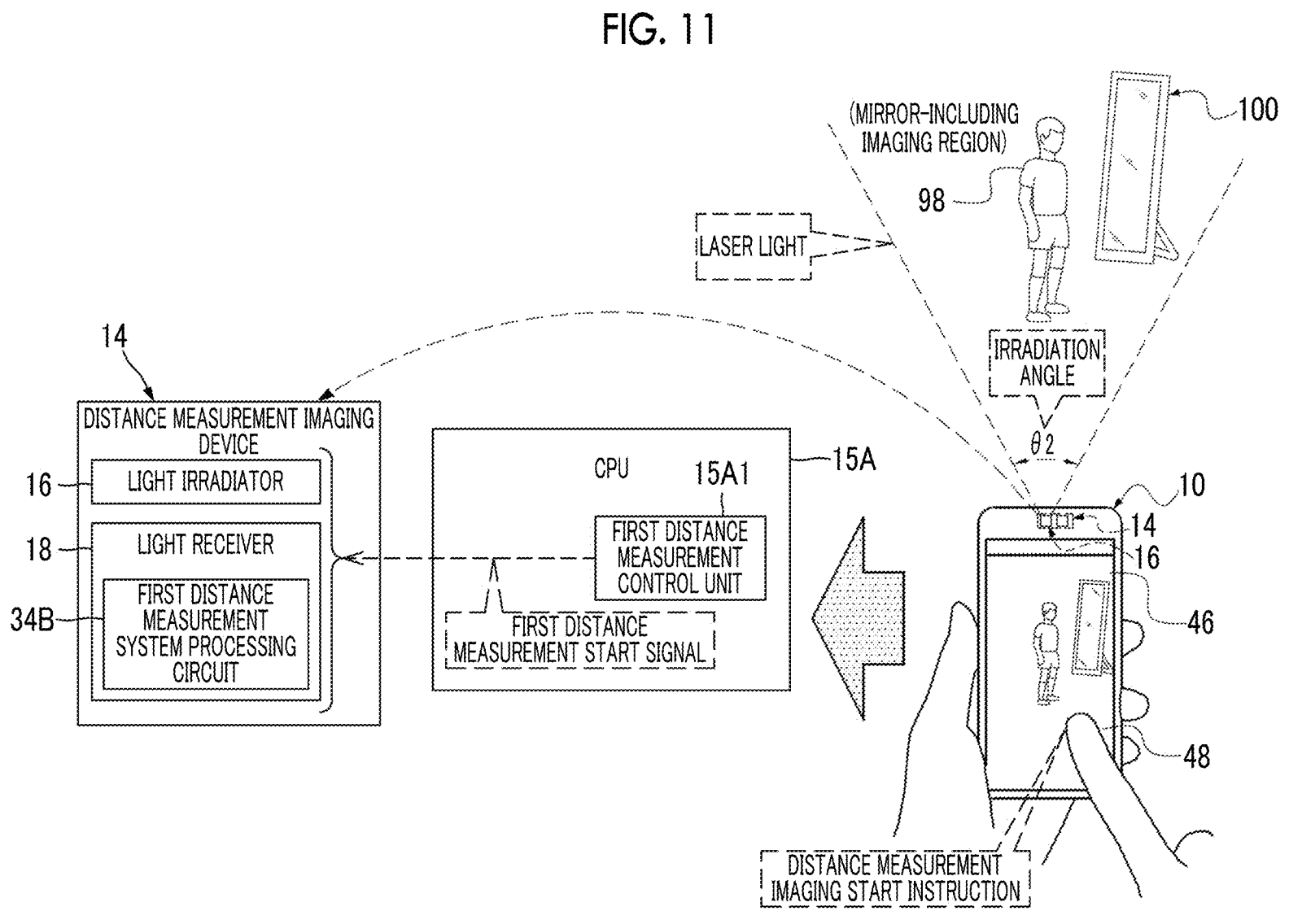

Here, a case in which the smart device 10 performs the first distance measurement for an imaging region (hereinafter, also referred to as a "mirror-including imaging region") including a target subject (a person in an example illustrated in FIG. 11) 98 and a full-length mirror 100 will be described with reference to FIG. 11. In a case in which the touch panel 48 receives a distance measurement imaging start instruction in a state in which the mirror-including imaging region is included in the irradiation angle θ2, the first distance measurement control unit 15A1 outputs a first distance measurement start signal to the light irradiator 16 and the light receiver 18. The light irradiator 16 emits laser light in a case in which the first distance measurement start signal is input from the first distance measurement control unit 15A1. In the light receiver 18, in a case in which the first distance measurement start signal is input from the first distance measurement control unit 15A1, the first distance measurement system processing circuit 34B calculates the first distance on the basis of the irradiation timing and the light receiving timing indicated by the irradiation timing signal acquired from the CPU 15A.

In addition, here, a timing that is a predetermined time after the timing when the first distance measurement start signal was input to the light receiver 18 from the first distance measurement control unit 15A1 is adopted as the irradiation timing. Here, the predetermined time is, for example, the time required from the time when the first distance measurement start signal is output to the emission of the laser light from the light irradiator 16. The time derived in advance by, for example, a test using an actual machine and/or a computer simulation is adopted as the predetermined time.

Figure 12:
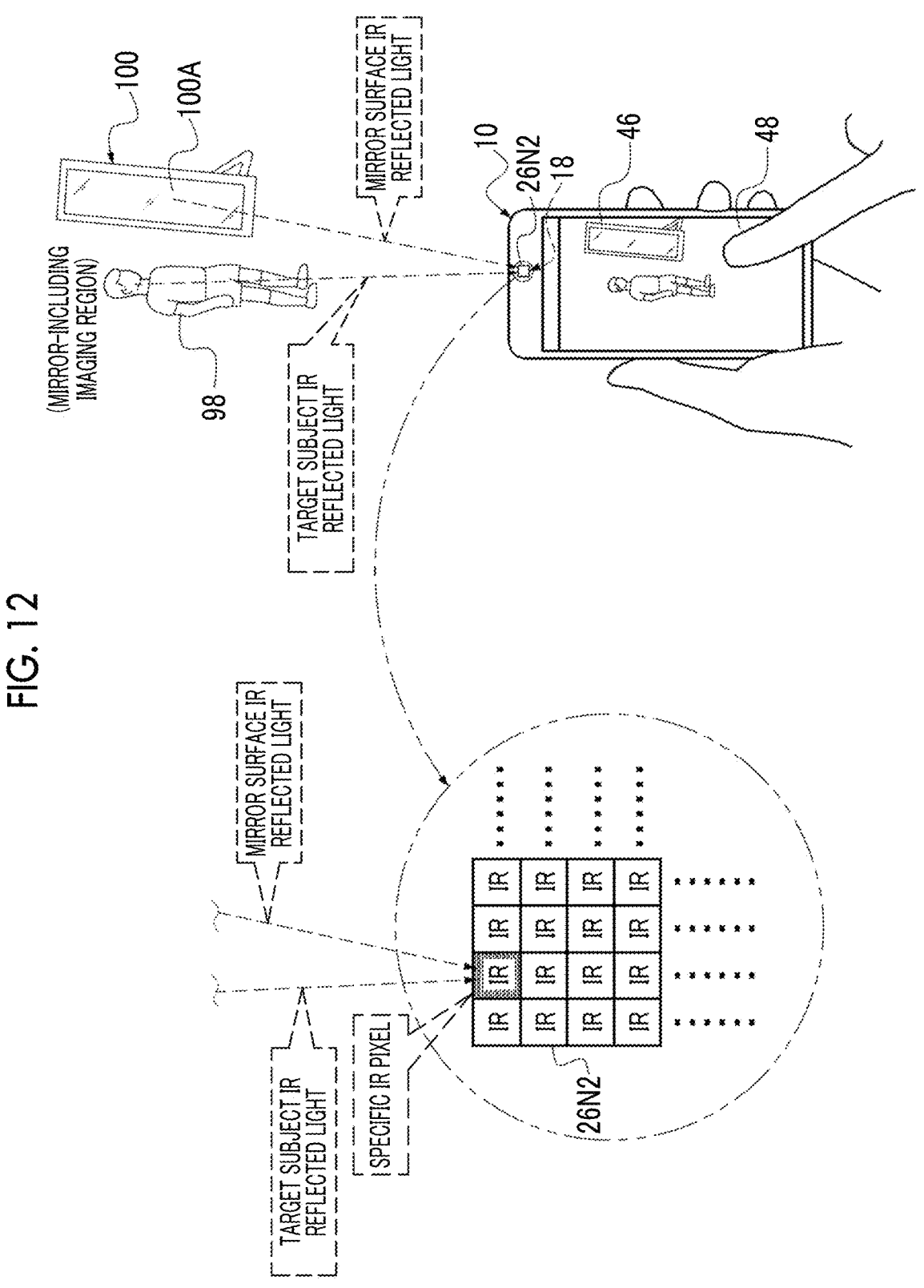
FIG. 12 is a conceptual diagram illustrating an example of a scene in which the first distance measurement is performed by the smart device according to the first embodiment.

However, in a case in which the light irradiator 16 irradiates the mirror-including imaging region with the laser light, the first distance measurement system divided region 26N2 of the light receiver 18 receives IR reflected light (hereinafter, also referred to as "target subject IR reflected light") from the target subject 98 and IR reflected light (hereinafter, also referred to as "mirror surface IR reflected light") from the full-length mirror 100 as illustrated in FIG. 12 as an example. The target subject IR reflected light is received by some IR pixels (hereinafter, also referred to as "specific IR pixels") in the first distance measurement system divided region 26N2. In a case in which only the target subject IR reflected light is received by the specific IR pixel, the first distance measurement system processing circuit 34B can calculate the distance from the smart device 10 to the target subject 98 as the first distance, using the timing when the target subject IR reflected light is received by the specific IR pixel as the light receiving timing.

However, the specific IR pixel also receives the totally reflected light of the laser light from a mirror surface 100A as the mirror surface IR reflected light, depending on the installation conditions of the full-length mirror 100, that is, the position where the full-length mirror 100 is installed, the shape of the mirror surface 100A of the full-length mirror 100, the angle of the mirror surface 100A, and the like. In a case in which the intensity of the laser light emitted from the light irradiator 16 is "100", the intensity of the target subject IR reflected light is about 10 to 20, and the intensity of the totally reflected light of the laser light from the mirror surface 100A is about 40 to 50.

Here, the following is considered: in a case in which distance measurement is performed on the basis of the timing in a case in which the specific IR pixel receives an IR reflected light component with the maximum intensity among a plurality of IR reflected light components received at different timings by the specific IR pixel within a light receiving period predetermined as a period for which the IR reflected light is received corresponding to the emission of the laser light by the light irradiator 16 (hereinafter, also simply referred to as a "light receiving period"). This means that, in a case in which an object that is intended by the user as the distance measurement target is the target subject, distance measurement that is not intended by the user, that is, erroneous distance measurement is performed. That is, not the distance from the smart device 10 to the target subject 98 but the distance from the smart device 10 to the object (the mirror surface 100A in the example illustrated in FIG. 12) that is not intended by the user as the distance measurement target is measured.

Figure 13:
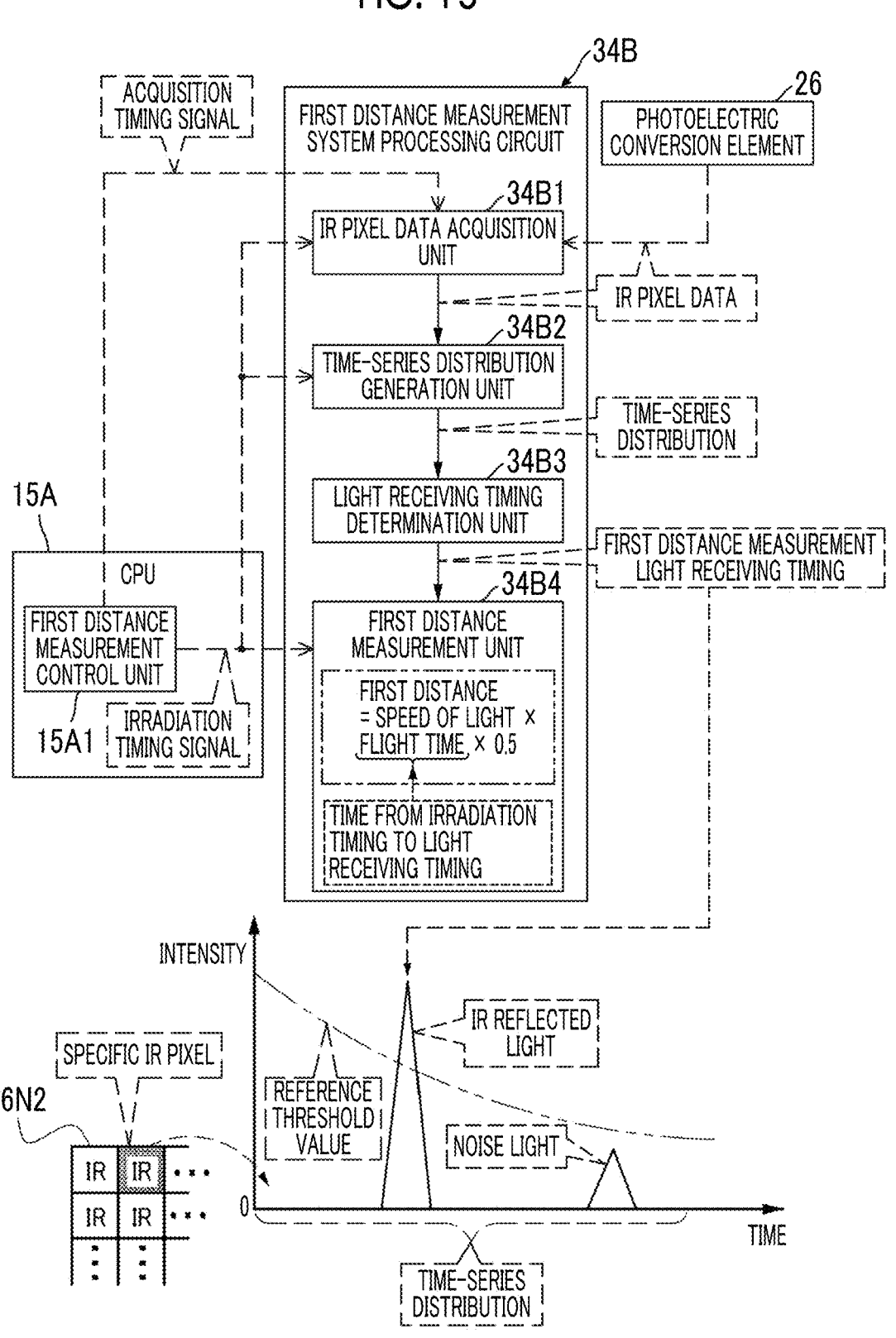
FIG. 13 is a conceptual diagram illustrating an example of the processing content of a first distance measurement system processing circuit included in the smart device according to the first embodiment.

Therefore, in order to avoid this erroneous distance measurement, for example, as illustrated in FIG. 13, the first distance measurement system processing circuit 34B comprises an IR pixel data acquisition unit 34B1, a time-series distribution generation unit 34B2, a light receiving timing determination unit 34B3, and a first distance measurement unit 34B4. In addition, the IR pixel data acquisition unit 34B1, the time-series distribution generation unit 34B2, the light receiving timing determination unit 34B3, and the first distance measurement unit 34B4 are provided for each IR pixel. Hereinafter, for convenience of explanation, the first distance measurement will be described with a focus on the specific IR pixel (see FIGS. 12 to 14).

The first distance measurement control unit 15A1 outputs the irradiation timing signal to the IR pixel data acquisition unit 34B1, the time-series distribution generation unit 34B2, and the first distance measurement unit 34B4. Further, the first distance measurement control unit 15A1 outputs an acquisition timing signal defining the timing when the IR pixel data acquisition unit 34B1 acquires the IR pixel data from the photoelectric conversion element 26 to the IR pixel data acquisition unit 34B1. For example, the acquisition timing signal is output to the IR pixel data acquisition unit 34B1 at a predetermined time interval (for example, a time interval that is about one tenth or one hundredth of the light receiving period).

The IR pixel data acquisition unit 34B1 acquires the IR pixel data from the photoelectric conversion element 26 in a case in which the irradiation timing signal and the acquisition timing signal are input from the first distance measurement control unit 15A1. In a case in which the irradiation timing is input from the first distance measurement control unit 15A1, the time-series distribution generation unit 34B2 generates a time-series distribution in which the intensity of the IR reflected light indicated by a plurality of IR pixel data items acquired by the IR pixel data acquisition unit 34B1 within the light receiving period from the time when the irradiation timing is input from the first distance measurement control unit 15A1 is defined in time series. In the time-series distribution, the horizontal axis indicates time and the vertical axis indicates intensity. In addition, here, the plurality of IR pixel data items are an example of a "plurality of signals" according to the technology of the present disclosure. The time-series distribution will be described in detail below.

There is a one-to-one relationship between the intensity of the IR reflected light and the signal level (intensity) of the IR pixel data, and the intensity of the IR reflected light is specified from the signal level of the IR pixel data. Therefore, the time-series distribution in which the intensity of the IR reflected light is defined in time series is equivalent to a time-series distribution of the signal level of the IR pixel data. Further, in the first embodiment, the intensity of the IR reflected light is specified by the absolute amount of IR reflected light. However, the technology of the present disclosure is not limited thereto. For example, the intensity of the IR reflected light may be offset by the intensity of a noise component (for example, IR light included in ambient light) caused by the ambient light. In this case, for example, the entire time-series distribution may be offset by the intensity of the noise component caused by the ambient light.

In the time-series distribution generated by the time-series distribution generation unit 34B2, the intensity of the IR reflected light indicated by the IR pixel data obtained from the specific IR pixels is expressed in time series. The light receiving timing determination unit 34B3 determines the light receiving timing (hereinafter, also referred to as "first distance measurement light receiving timing") used for the first distance measurement on the basis of the time-series distribution generated by the time-series distribution generation unit 34B2. In the light receiving timing determination unit 34B3, a reference threshold value is applied to the time-series distribution. The reference threshold value is a value that has been derived in advance as a lower limit value of the intensity of IR reflected light from a standard subject (for example, a specific object other than a mirror surface and a glossy surface) by, for example, an actual machine and/or a computer simulation. The reference threshold value is a value that decreases as the light receiving timing is delayed. In the example illustrated in FIG. 13, the reference threshold value decreases gradually (for example, exponentially) with the passage of time. In a case in which there is only one IR reflected light component having an intensity greater than the reference threshold value in the time-series distribution, the light receiving timing determination unit 34B3 determines the receiving timing of the IR reflected light component having the intensity greater than the reference threshold value as a first distance measurement light receiving timing.

Further, in a case in which there are a plurality of IR reflected light components having an intensity greater than the reference threshold value in the time-series distribution, the light receiving timing determination unit 34B3 determines, as the first distance measurement light receiving timing, a light receiving timing corresponding to an IR pixel data item, which is selected on the basis of the relationship between a plurality of IR pixel data items acquired by the IR pixel data acquisition unit 34B1 within the light receiving period and the intensities of the plurality of IR reflected light components indicated by the plurality of IR pixel data items, among the plurality of IR pixel data items. The light receiving timing determination unit 34B3 specifies the relationship between the plurality of IR pixel data items and the intensities of the plurality of IR reflected light components from the time-series distribution generated by the time-series distribution generation unit 34B2. In addition, a method for determining the first distance measurement light receiving timing in a case in which there are a plurality of IR reflected light components having an intensity greater than the reference threshold value in the time-series distribution will be described in detail below.

The first distance measurement unit 34B4 measures the first distance on the basis of the irradiation timing indicated by the irradiation timing signal input from the first distance measurement control unit 15A1 and the first distance measurement light receiving timing determined by the light receiving timing determination unit 34B3. The first distance is half of the product of the speed of light and the flight time of the laser light. The flight time of the laser light is the time from the irradiation timing to the first distance measurement light receiving timing.

Figure 14:
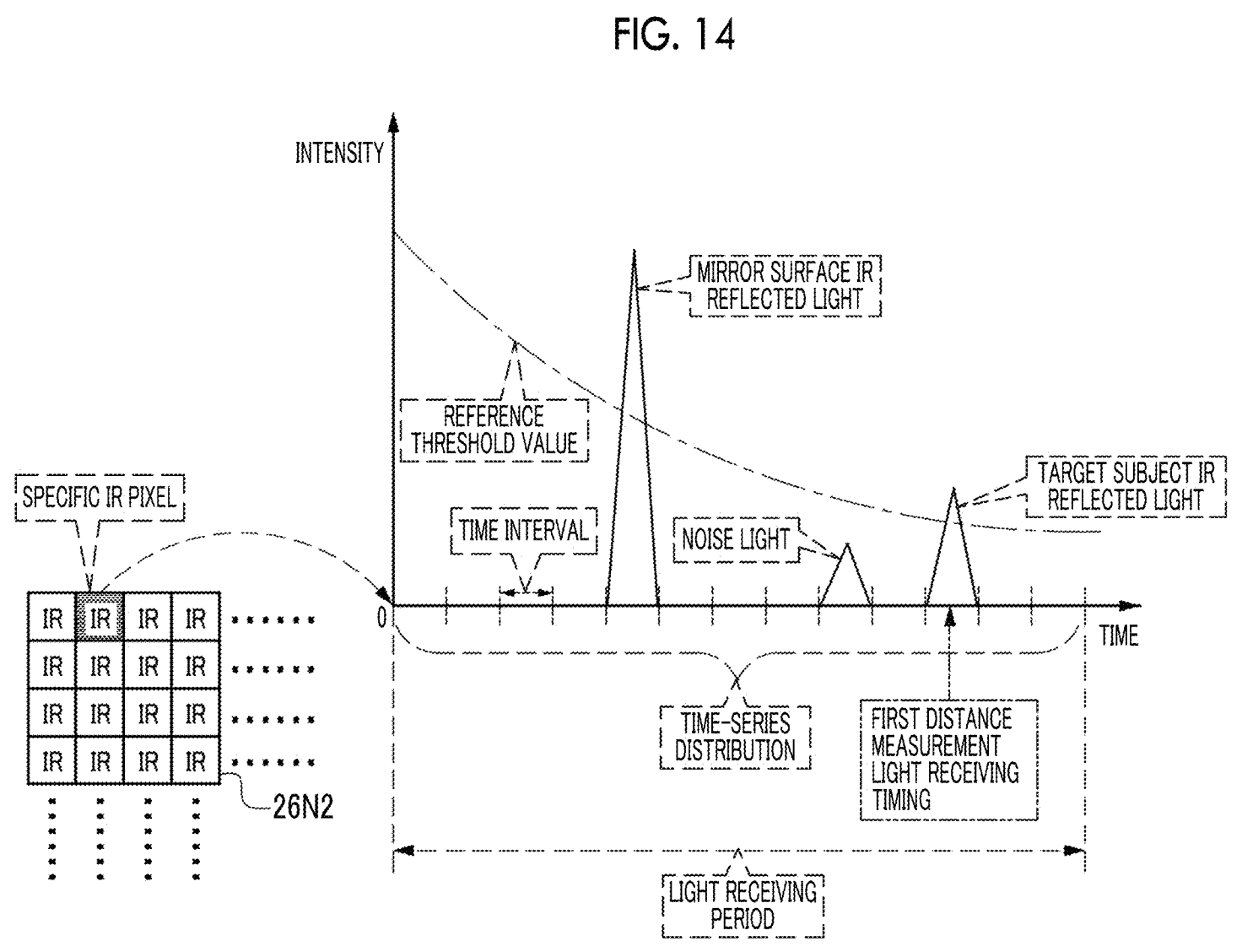

In the example illustrated in FIG. 14, the time-series distribution includes the intensities of the mirror surface IR reflected light, the target subject IR reflected light, and the noise light (for example, a noise component such as IR light included in the ambient light). The specific IR pixel receives the mirror surface IR reflected light first, receives the noise light second, and receives the target subject IR reflected light third on the time axis of the light receiving period. Then, the intensity of the mirror surface IR reflected light and the intensity of the target subject IR reflected light are greater than the reference threshold value.

In this case, the light receiving timing determination unit 34B3 determines the timing when the IR reflected light having the second highest intensity in the time-series distribution is received by the specific IR pixel as the first distance measurement light receiving timing. That is, in the example illustrated in FIG. 14, since the IR reflected light having the second highest intensity is the target subject IR reflected light in the time-series distribution, the timing when the target subject IR reflected light is received is determined as the first distance measurement light receiving timing. This configuration makes it possible to avoid the execution of the first distance measurement on the basis of the timing when the mirror surface IR reflected light is received and the execution of the first distance measurement on the basis of the noise light.

Figure 15:
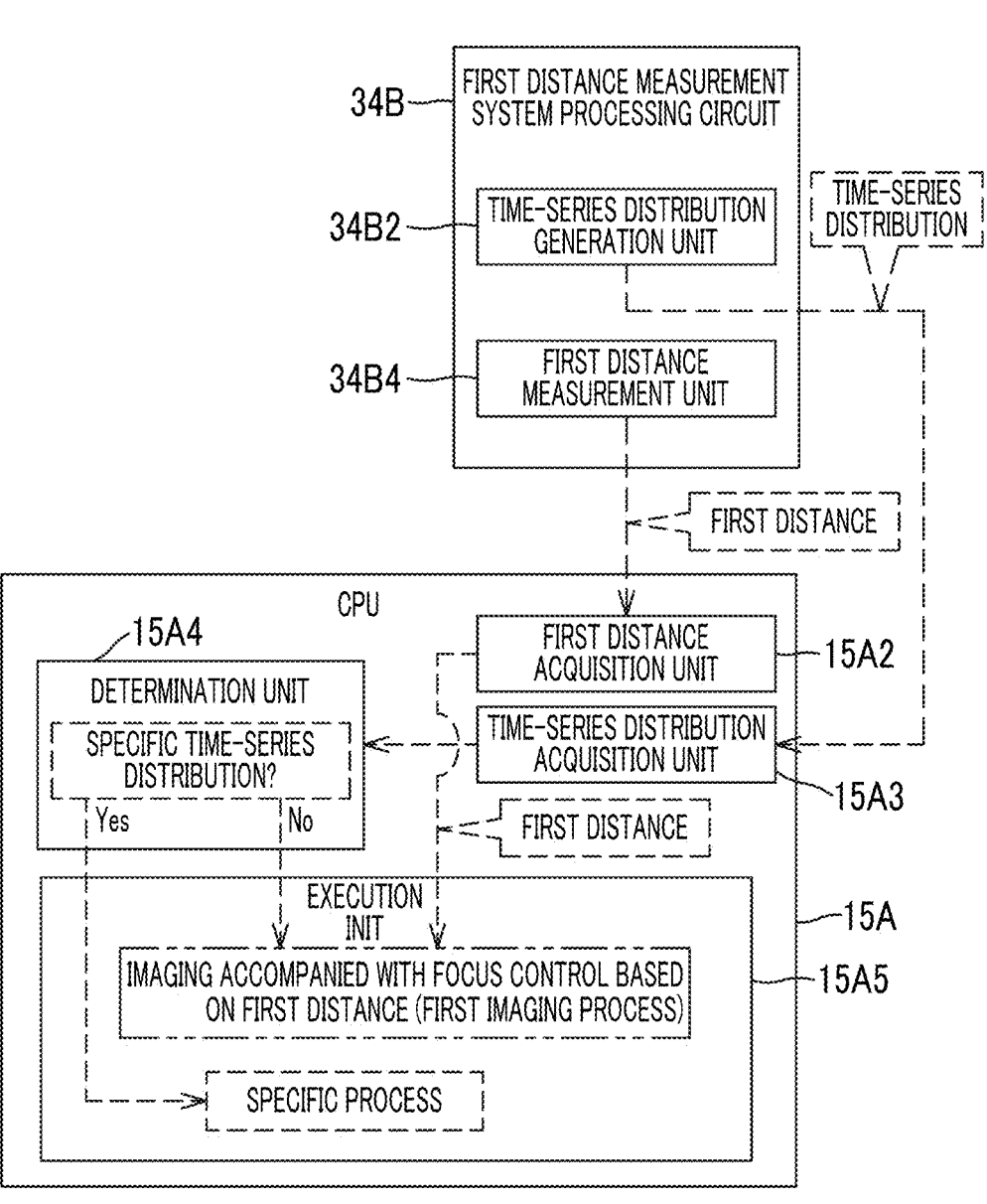
FIG. 15 is a block diagram illustrating an example of the processing content of a first distance acquisition unit, a time-series distribution acquisition unit, a determination unit, and an execution unit illustrated in FIG. 10.

For example, as illustrated in FIG. 15, the first distance acquisition unit 15A2 acquires the first distance measured by the first distance measurement unit 34B4. Further, the time-series distribution acquisition unit 15A3 acquires the time-series distribution from the time-series distribution generation unit 34B2. The time-series distribution acquired by the time-series distribution acquisition unit 15A3 is a time-series distribution used to determine the first distance measurement light receiving timing used for the measurement of the first distance acquired by the first distance acquisition unit 15A2.

The determination unit 15A4 determines whether or not the time-series distribution acquired by the time-series distribution acquisition unit 15A3 is a specific time-series distribution. A method for performing the determination will be described in detail below.

in a case in which the determination unit 15A4 determines that the time-series distribution acquired by the time-series distribution acquisition unit 15A3 is not a specific time-series distribution, the execution unit 15A5 executes imaging (hereinafter, also referred to as a "first imaging process") accompanied with focus control on the basis of the first distance acquired by the first distance acquisition unit 15A2. Further, the execution unit 15A5 executes a specific process in a case in which it is determined that the time-series distribution acquired by the time-series distribution acquisition unit 15A3 is a specific time-series distribution. In addition, the first imaging process and the specific process will be described in detail below.

Figure 16:
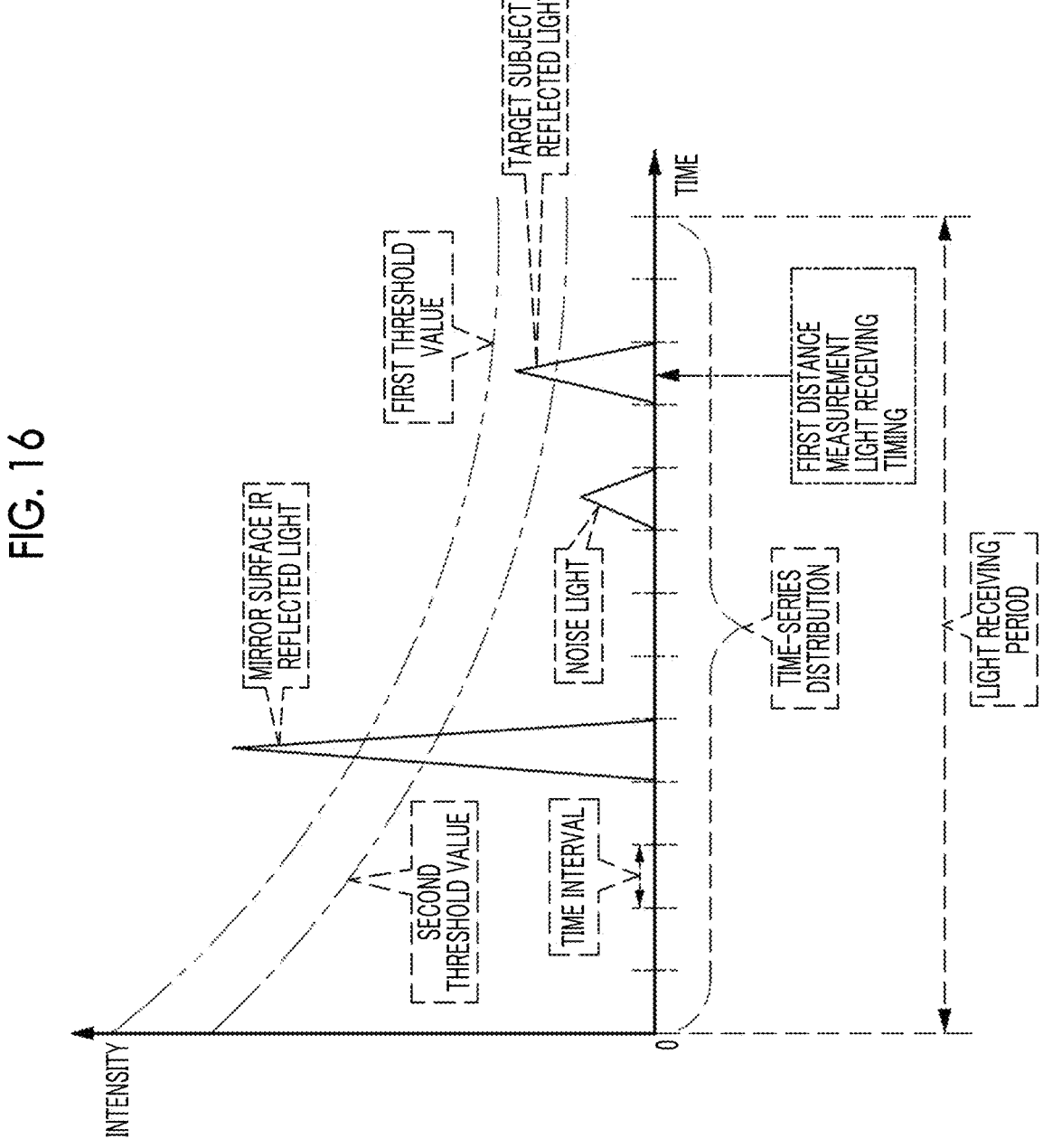
FIG. 16 is a diagram illustrating a determination method by the determination unit illustrated in FIG. 15.

Here, the determination method by the determination unit 15A4 will be described. For example, as illustrated in FIG. 16, the determination unit 15A4 applies the first threshold value and the second threshold value to the time-series distribution acquired by the time-series distribution acquisition unit 15A3. The first threshold value is the lower limit value of the intensity of the IR reflected light in a case in which the laser light emitted to a glossy surface (for example, a mirror surface predetermined as an average mirror surface) is totally reflected by the glossy surface and is a value derived in advance by, for example, an actual machine and/or a computer simulation. The first threshold value gradually decreases (for example, exponentially) with the passage of time, similarly to the above-mentioned reference threshold value. In addition, the first threshold value is a value that decreases as the light receiving timing is delayed, similarly to the above-mentioned reference threshold value. The second threshold value is the same as the above-mentioned reference threshold value (see FIGS. 13 and 14). Further, the second threshold value is less than the first threshold value at the same time on the time axis of the light receiving period.

The determination unit 15A4 determines whether or not the time-series distribution acquired by the time-series distribution acquisition unit 15A3 includes an intensity equal to or greater than the first threshold value and an intensity that is less than the first threshold value and is equal to or greater than the second threshold value to determine whether or not the time-series distribution acquired by the time-series distribution acquisition unit 15A3 is a specific time-series distribution. In the example illustrated in FIG. 16, the intensity of the mirror surface IR reflected light is equal to or greater than the first threshold value, and the intensity of the target subject IR reflected light is less than the first threshold value and is equal to or greater than the second threshold value. Therefore, the determination unit 15A4 determines that the time-series distribution acquired by the time-series distribution acquisition unit 15A3 is a specific time-series distribution. In addition, in the example illustrated in FIG. 16, the intensity of the mirror surface IR reflected light corresponds to the intensity of the IR pixel data (signal) generated by the reception of the mirror surface IR reflected light. The intensity of the IR pixel data (signal) generated by the reception of the mirror surface IR reflected light is an example of a "first intensity" according to the technology of the present disclosure. Similarly, the intensity of the target subject IR reflected light corresponds to the intensity of the IR pixel data (signal) generated by the reception of the target subject IR reflected light. The intensity of the IR pixel data (signal) generated by receiving the target subject IR reflected light is an example of a "second intensity" according to the technology of the present disclosure.

Figure 17:
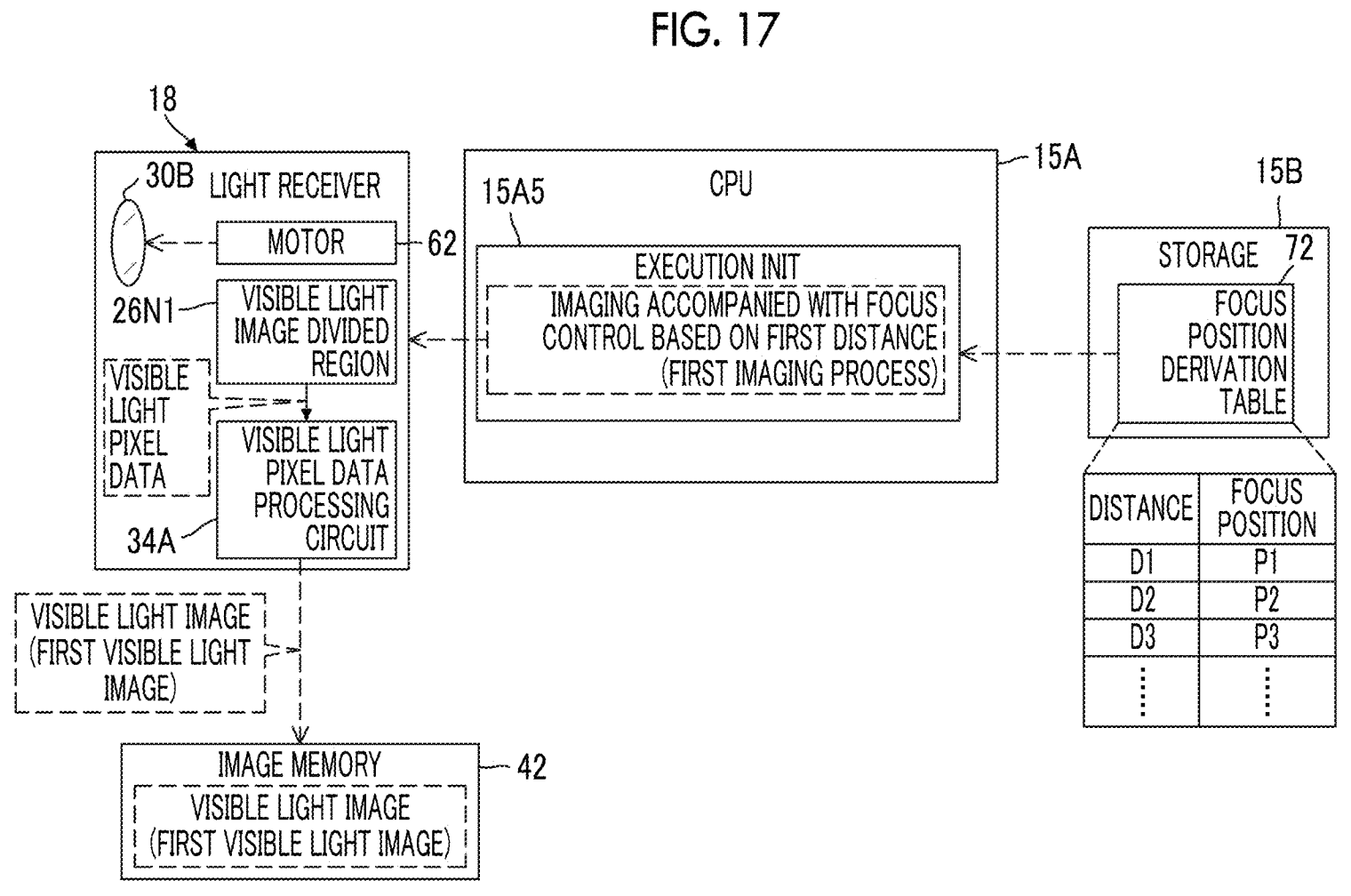

For example, as illustrated in FIG. 17, a focus position derivation table 72 is stored in the storage 15B. In the focus position derivation table 72, the distance from the smart device 10 to the imaging region and the focus position are associated with each other. In the first imaging process, first, the execution unit 15A5 executes focus control (active focus control) on the light receiver 18 using the first distance. That is, the execution unit 15A5 derives a focus position corresponding to the first distance from the focus position derivation table 72, and the motor 62 of the light receiver 18 is controlled such that the focus lens 30B is moved to the derived focus position. Then, the execution unit 15A5 controls the visible light image divided region 26N1 of the light receiver 18 such that the imaging region is imaged by the visible light image divided region 26N1, and visible light image data obtained by the imaging is output from the visible light image divided region 26N1 to the visible light pixel data processing circuit 34A. The visible light pixel data processing circuit 34A generates a first visible light image indicating the imaging region on the basis of the visible light image data input from the visible light image divided region 26N1, and the generated first visible light image is output to the image memory 42. The first visible light image is stored in the image memory 42.

Here, the specific process executed by the execution unit 15A5 will be described with reference to FIG. 18. For example, as illustrated in FIG. 18, the specific process is a process including, for example, a second distance measurement start process, a second distance acquisition process, a second imaging process, and an image selection screen display process. In addition, the specific process is not limited to these processes and may be a process that measures the first distance on the basis of the light receiving timing when the IR pixel receives the reflected light (target subject IR reflected light) having an intensity that is less than the first threshold value and is equal to or greater than the second threshold value.

Figure 19:
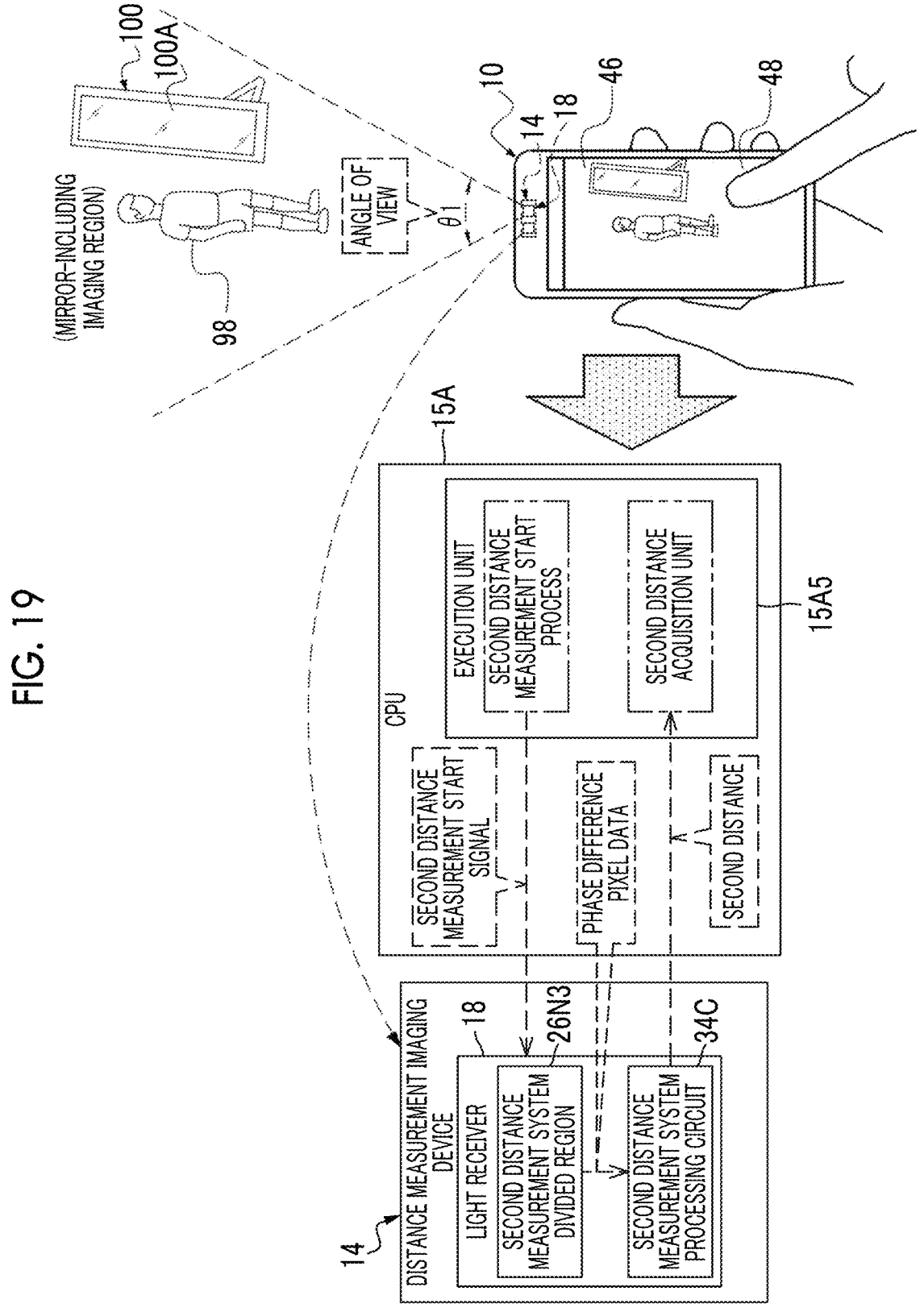
FIG. 19 is a block diagram illustrating an example of the content of a second distance measurement start process and a second distance acquisition process executed by the execution unit illustrated in FIG. 15.

For example, as illustrated in FIG. 19, in the second distance measurement start process, in a case in which the touch panel 48 receives the distance measurement imaging start instruction, the execution unit 15A5 outputs a second distance measurement start signal to the light receiver 18. In the example illustrated in FIG. 19, a state in which the mirror-including imaging region is included in the angle of view θ1 is illustrated. However, the technology of the present disclosure is not limited thereto. For example, an imaging region other than the mirror-including imaging region may be used.

In a case in which the second distance measurement start signal is input from the execution unit 15A5 to the light receiver 18, the second distance measurement system divided region 26N3 images the mirror-including imaging region and outputs phase difference pixel data corresponding to the mirror-including imaging region to the second distance measurement system processing circuit 34C. The second distance measurement system processing circuit 34C generates the first phase difference image and the second phase difference image (see FIG. 6) on the basis of the phase difference pixel data input from the second distance measurement system divided region 26N3 and calculates the amount of deviation α (see FIG. 6) on the basis of the first phase difference image and the second phase difference image. The second distance measurement system processing circuit 34C calculates the second distance from the calculated amount of deviation α. In the second distance acquisition process, the execution unit 15A5 acquires the second distance from the second distance measurement system processing circuit 34C.

Figure 20:
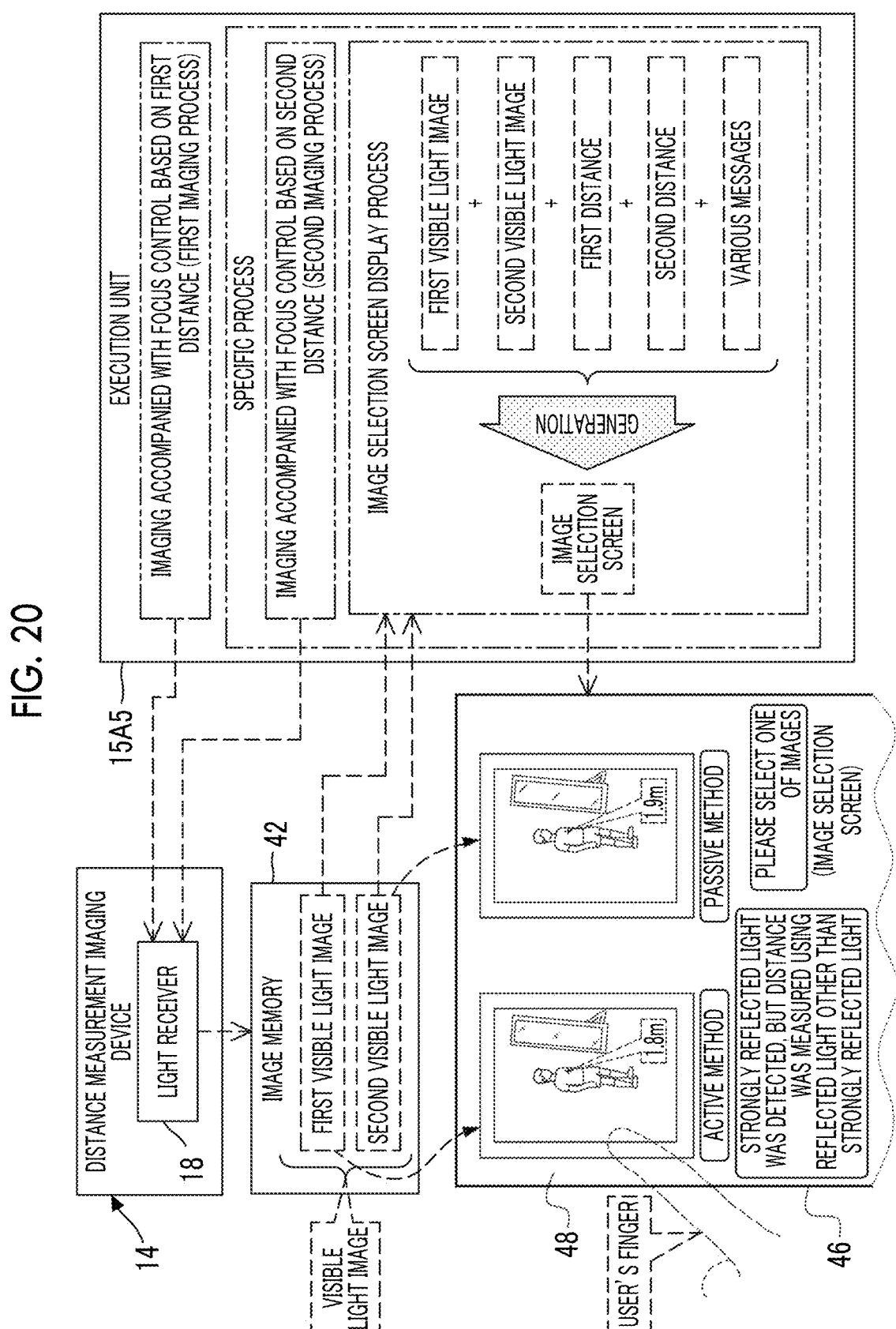
FIG. 20 is a conceptual diagram illustrating an example of details of the specific process executed by the execution unit illustrated in FIG. 15.

For example, as illustrated in FIG. 20, the second imaging process means an imaging process accompanied with focus control based on the second distance. In the second imaging process, the execution unit 15A5 derives a focus position corresponding to the second distance from the focus position derivation table 72, and the motor 62 of the light receiver 18 is controlled such that the focus lens 30B is moved to the derived focus position as in the first imaging process. Then, as in the first imaging process, the visible light image divided region 26N1 images the imaging region, and visible light pixel data obtained by the imaging is output from the visible light image divided region 26N1 to the visible light pixel data processing circuit 34A. The visible light pixel data processing circuit 34A generates the second visible light image indicating the imaging region on the basis of the visible light pixel data input from the visible light image divided region 26N1 and outputs the generated second visible light image to the image memory 42. The second visible light image is stored in the image memory 42.

In the image selection screen display process, the execution unit 15A5 acquires the first visible light image and the second visible light image from the image memory 42. Then, the execution unit 15A5 generates an image selection screen on the basis of the first visible light image, the second visible light image, the first distance (see FIG. 15) acquired by the first distance acquisition unit 15A2, the second distance (see FIG. 19) acquired by the execution unit 15A5 in the second distance acquisition process, and various messages and displays the generated image selection screen on the display 46. The first visible light image and the second visible light image are displayed side by side on the image selection screen. In addition, a message "active method" is displayed below the first visible light image. The message "active method" is a message indicating that the first visible light image is an image obtained by imaging accompanied with focus control based on the distance measurement result by the active distance measurement (first distance measurement). Further, a message "passive method" is displayed below the second visible light image. The message "passive method" is a message indicating that the second visible light image is an image obtained by imaging accompanied with focus control based on the result of the distance measurement by the passive distance measurement (second distance measurement).

In addition, in the first embodiment, examples of the specific process include the first imaging process, the second imaging process, and the image selection screen display process. However, the technology of the present disclosure is limited thereto. For example, the specific process may include one or two of the first imaging process, the second imaging process, and the image selection screen display process. Further, in the first embodiment, the display examples of the "active method" and the "passive method" are described. However, the display may not necessarily be the "active method" and the "passive method" and may be any display as long as the user can understand the difference between the distance measurement methods. For example, in a case in which laser distance measurement and phase difference distance measurement are performed, messages "laser" and "phase difference" may be displayed, or icons or the like indicating the distance measurement methods may be displayed. Further, the focus position may be displayed instead of the distance measurement methods. For example, "focus position: front" and "focus position: back" may be displayed, or "focus position: object" and "focus position: image reflected on object" may be displayed. Alternatively, two or more of the letters and icons indicating the distance measurement methods and the focus position may be displayed in combination.

Further, a numerical value of "1.8 m" which is the distance measurement result by the first distance measurement is displayed so as to be associated with the first visible light image, and a numerical value of "1.9 m" which is the distance measurement result by the second distance measurement is displayed so as to be associated with the second visible light image. In addition, a message "Please select one of the images" is displayed as a message prompting the user to select one of the first visible light image or the second visible light image on the image selection screen.

Further, a strongly reflected light notification message is displayed on the image selection screen. The strongly reflected light notification message is a message which notifies the user that the time-series distribution acquired by the time-series distribution acquisition unit 15A3 includes an intensity equal to or greater than the first threshold value in a case in which the determination unit 15A4 (see FIG. 15) determines that the time-series distribution acquired by the time-series distribution acquisition unit 15A3 (see FIG. 15) is the specific time-series distribution (for example, in a case in which the time-series distribution includes an intensity equal to or greater than the first threshold value as illustrated in FIG. 16). In the example illustrated in FIG. 20, a message "The strongly reflected light was detected, but the distance was measured using the reflected light other than the strongly reflected light" is illustrated as the strongly reflected light notification message. Here, the strongly reflected light means the IR reflected light having an intensity equal to or greater than the first threshold value. An example of the strongly reflected light is the mirror surface IR reflected light (see FIGS. 12, 14, and 16). In addition, even in a case in which the IR reflected light from a glossy surface other than the mirror surface 100A has an intensity equal to or greater than the first threshold value, the strongly reflected light notification message is displayed on the image selection screen. In addition, the image selection screen display process is an example of "a process of notifying that the intensities of a plurality of signals include the first intensity" according to the technology of the present disclosure.

Various messages displayed on the image selection screen are not limited to the above-mentioned messages. For example, in a case in which the distance measurement result (first distance) by the first distance measurement and the distance measurement result (second distance) by the second distance measurement are different from each other, a message notifying the user of the fact (for example, "the distance measurement results are different") may also be displayed.

Further, here, the aspect in which various messages are visually displayed has been described. However, the invention is not limited thereto, and various messages may be output by voice in parallel with the visible display. In a case in which the image selection screen is displayed on the display 46, the user selects the first visible light image or the second visible light image through the touch panel 48. In the example illustrated in FIG. 20, an aspect in which the first visible light image is selected by the user's finger through the touch panel 48 is illustrated.

Figure 21:
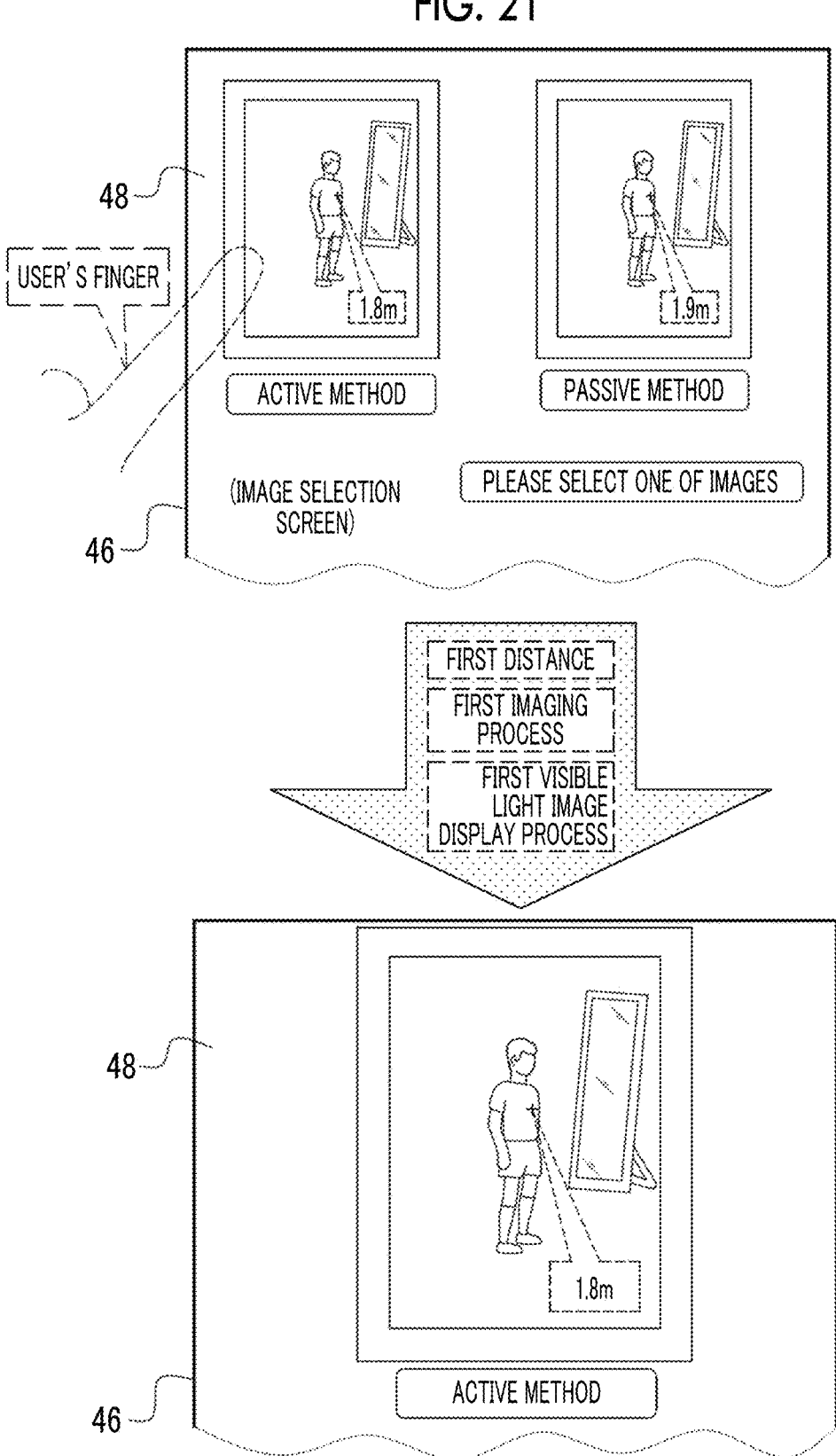
FIG. 21 is a conceptual diagram illustrating an example of processing content in a case in which a user selects a first visible light image in an image selection screen displayed on the display by the smart device according to the first embodiment through a touch panel.

For example, as illustrated in FIG. 21, in a case in which the first visible light image is selected by the user's finger through the touch panel 48 in a state in which the image selection screen is displayed on the display 46, the first distance measurement control unit 15A1 controls the distance measurement imaging device 14 such that the first distance measurement system processing circuit 34B performs the first distance measurement. In addition, the execution unit 15A5 executes the first imaging process and the first visible light image display process. Here, the execution unit 15A5 executes the first imaging process using a new first distance obtained by the first distance measurement. The first visible light image display process is a process of displaying the latest first visible light image obtained by the first imaging process on the display 46.

In addition, here, the aspect in which the first distance measurement and the first imaging process are performed again on condition that the first visible light image is selected and the latest first visible light image obtained by the first imaging process is displayed on the display 46 has been described. However, this is just an example. For example, on condition that the first visible light image is selected, the selected first visible light image may be stored in the storage 15B and/or a storage medium such as a memory card. Further, the imaging accompanied with focus control based on the distance measured by the selected distance measurement method and the storage of the selected image (for example, the first visible light image or the second visible light image) may be selected according to instructions (instructions from the user) received by the receiving device 47.

In a case in which the execution unit 15A5 executes the first visible light image display process, the second visible light image, a numerical value of "1.9 m", the message "passive method", a message "Please select one of the images", and the strongly reflected light notification message are not displayed in the image selection screen. Then, the first distance (a numerical value of "1.8 m" in the example illustrated in FIG. 21) which is the latest distance measurement result obtained by the latest first distance measurement is displayed on the display 46, and the first visible light image obtained by the first imaging process is displayed on the display 46. In addition, the message "active method" is displayed below the first visible light image. In addition, a display region of the first distance, the first visible light image, and the message "active method" is larger than a display region of the first distance, the first visible light image, and the message "active method" in the image selection screen. Further, in a case in which the first distance measurement is performed and the determination unit 15A4 (see FIG. 15) determines that the time-series distribution acquired by the time-series distribution acquisition unit 15A3 (see FIG. 15) is the specific time-series distribution, the strongly reflected light notification message may be displayed on the display 46.

Figure 22:
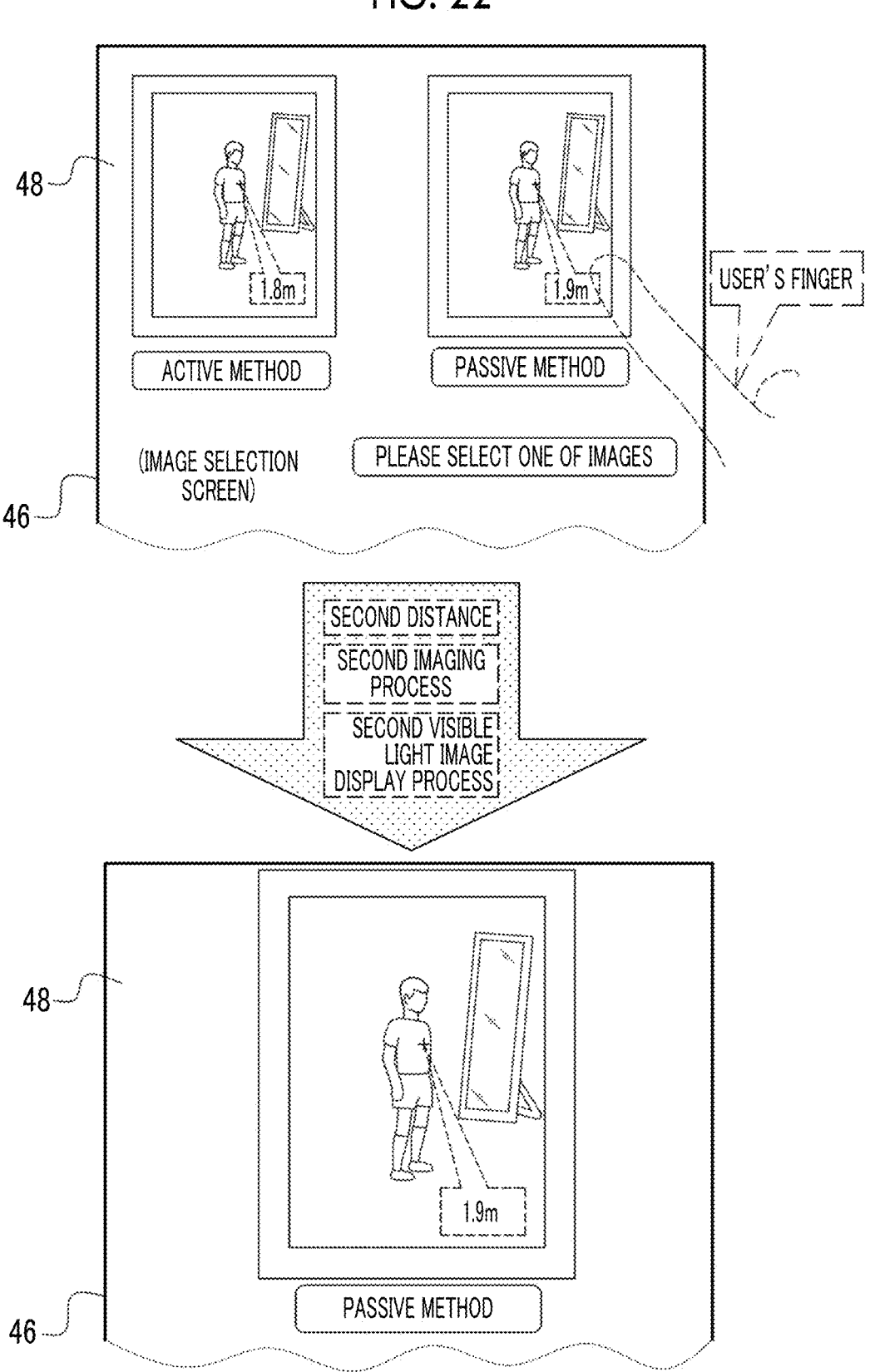
FIG. 22 is a conceptual diagram illustrating an example of processing content in a case in which the user selects a second visible light image in the image selection screen displayed on the display by the smart device according to the first embodiment through the touch panel.

For example, as illustrated in FIG. 22, in a case in which the second visible light image is selected by the user's finger through the touch panel 48 in a state in which the image selection screen is displayed on the display 46, the execution unit 15A5 executes the second distance measurement start process, the second distance acquisition process, and the second imaging process to direct the second distance measurement system processing circuit 34C to perform the second distance measurement. Further, the execution unit 15A5 executes the second imaging process and the second visible light image display process. Here, the execution unit 15A5 executes the second imaging process using a new second distance obtained by the second distance measurement. The second visible light image display process is a process of displaying the latest second visible light image obtained by the second imaging process on the display 46.

In a case in which the execution unit 15A5 executes the second visible light image display process, the first visible light image, a numerical value of "1.8 m", the message "active method", the message "The distance measurement results are different", and the message "Please select one of the images" are not displayed on the image selection screen. Then, the second distance (a numerical value of "1.9 m" in the example illustrated in FIG. 22) which is the latest distance measurement result obtained by the latest second distance measurement is displayed on the display 46, and the second visible light image obtained by the second imaging processes is displayed on the display 46. In addition, the message "passive method" is displayed below the second visible light image. Further, a display region of the second distance, the second visible light image, and the message "passive method" is larger than a display region of the second distance, the second visible light image, and the message "passive method" in the image selection screen.

Next, the operation of each unit of the smart device 10 according to the technology of the present disclosure will be described.

First, the first distance measurement system process performed by the first distance measurement system processing circuit 34B will be described with reference to FIG. 23. In addition, FIG. 23 is a flowchart illustrating an example of the flow of the first distance measurement system process performed by the first distance measurement system processing circuit 34B in a case in which the irradiation timing signal is input from the first distance measurement control unit 15A1 to the first distance measurement system processing circuit 34B.

Figure 23:
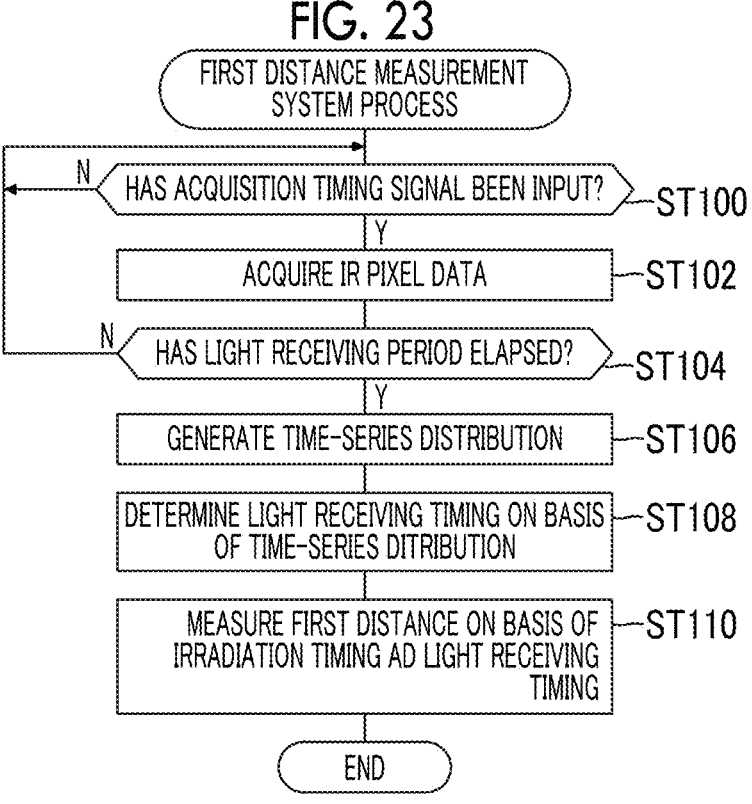
FIG. 23 is a flowchart illustrating an example of the flow of a first distance measurement system process according to the first embodiment.

In the first distance measurement system process illustrated in FIG. 23, first, in Step ST100, the IR pixel data acquisition unit 34B1 determines whether or not the acquisition timing signal has been input from the first distance measurement control unit 15A1. In Step ST100, in a case in which the acquisition timing signal has not been input from the first distance measurement control unit 15A1, the determination result is "No", and the determination in Step ST100 is performed again. In Step ST100, in a case in which the acquisition timing signal has been input from the first distance measurement control unit 15A1, the determination result is "Yes", and the first distance measurement system process proceeds to Step ST102.

In Step ST102, the IR pixel data acquisition unit 34B1 acquires IR pixel data from the photoelectric conversion element 26. Then, the first distance measurement system process proceeds to Step ST104.

However, in a case in which the distance is measured on the basis of the irradiation timing and the light receiving timing when the IR pixel receives the IR reflected light indicated by an IR pixel data item having the highest signal level among a plurality of IR pixel data items generated by the first distance measurement system divided region 26N2 at a plurality of light receiving timings (for example, the "time intervals" illustrated in FIG. 14) within the light receiving period corresponding the emission of the laser light by the light irradiator 16, there is a concern that the distance will be measured on the basis of the irradiation timing and the timing when the IR pixel receives the IR reflected light from a glossy object (the mirror surface 100A in the example illustrated in FIG. 12) which is not intended as the distance measurement target.

Then, in the first distance measurement system process, the processes in Steps ST104 to ST110 are performed. First, in Step ST104, the time-series distribution generation unit 34B2 determines whether or not the light receiving period has elapsed since the start of the first distance measurement system process. In Step ST104, in a case in which the light receiving period has not elapsed since the start of the first distance measurement system process, the determination result is "No", and the first distance measurement system process proceeds to Step ST100. In Step ST104, in a case in which the light receiving period has elapsed since the start of the first distance measurement system process, the determination result is "Yes", and the first distance measurement system process proceeds to Step ST106.

In Step ST106, the time-series distribution generation unit 34B2 performs the processes in Steps ST100 to ST104 to generate the time-series distribution (see FIG. 14) on the basis of the IR pixel data acquired by the IR pixel data acquisition unit. After Step ST106 is performed, the first distance measurement system process proceeds to Step ST108.

In Step ST108, the light receiving timing determination unit 34B3 determines the first distance measurement light receiving timing on the basis of the time-series distribution generated in Step ST106. In Step ST108, in a case in which there is only one IR reflected light component having an intensity greater than the reference threshold value in the time-series distribution, the light receiving timing determination unit 34B3 determines the light receiving timing of the IR reflected light having the intensity greater than the reference threshold value as the first distance measurement light receiving timing. Further, in a case in which there are a plurality of IR reflected light components having the intensity greater than the reference threshold value in the time-series distribution, the light receiving timing determination unit 34B3 determines the timing when the specific IR pixel receives the IR reflected light having the second highest intensity in the time-series distribution as the first distance measurement light receiving timing. After the process in Step ST108 is performed, the first distance measurement system process proceeds to Step ST110.

In Step ST110, the first distance measurement unit 34B4 measures the first distance on the basis of the irradiation timing indicated by the irradiation timing signal input from the first distance measurement control unit 15A1 and the first distance measurement light receiving timing determined in Step ST108. After the process in Step ST110 is performed, the first distance measurement system process ends.

Next, the distance measurement imaging process performed by the CPU 15A will be described with reference to FIGS. 24A to 24C. In addition, FIGS. 24A to 24C are flowcharts illustrating an example of the flow of the distance measurement imaging process executed by the CPU 15A according to the distance measurement imaging processing program 70.

Figure 24A:
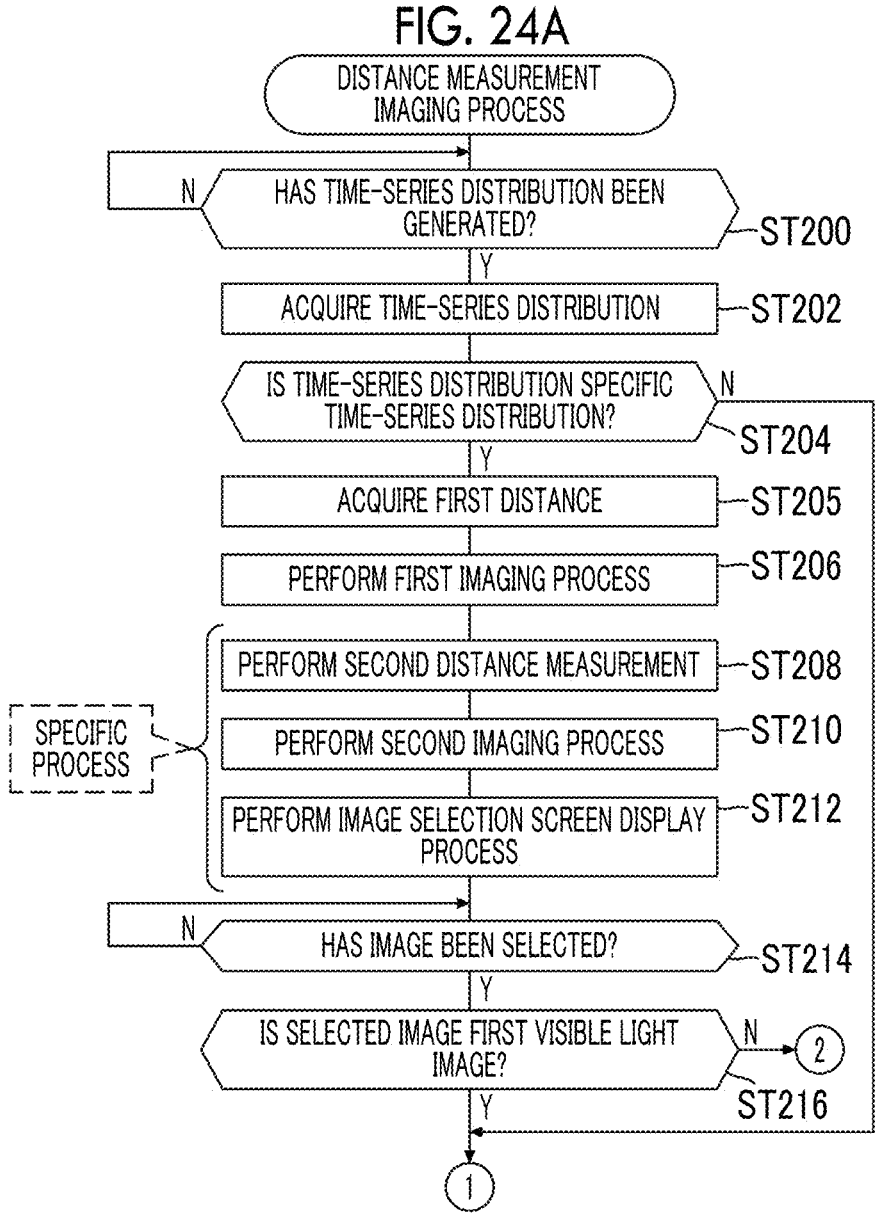
FIG. 24A is a flowchart illustrating an example of the flow of a distance measurement imaging process according to the first embodiment.
Figures 24B, 24C:
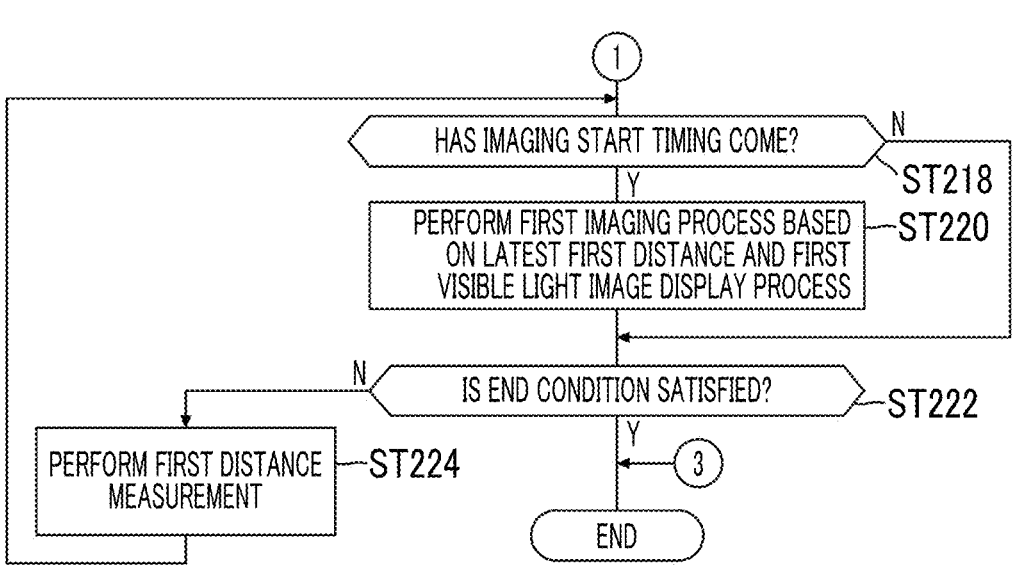
FIG. 24B is a flowchart following the flowchart illustrated in FIG. 24A.
FIG. 24C is a flowchart following the flowchart illustrated in FIG. 24A.

In the distance measurement imaging process illustrated in FIG. 24A, first, in Step ST200, the time-series distribution acquisition unit 15A3 determines whether or not the time-series distribution has been generated by the time-series distribution generation unit 34B2. In Step ST200, in a case in which the time-series distribution has not been generated by the time-series distribution generation unit 34B2, the determination result is "No", and the determination in Step ST200 is performed again. In a case in which the time-series distribution has been generated by the time-series distribution generation unit 34B2 in Step ST200, the determination result is "Yes", and the distance measurement imaging process proceeds to Step ST202.

In Step ST202, the time-series distribution acquisition unit 15A3 acquires the time-series distribution from the time-series distribution generation unit 34B2. Then, the distance measurement imaging process proceeds to Step ST204.

In Step ST204, the determination unit 15A4 determines whether or not the time-series distribution acquired in Step ST202 is the specific time-series distribution. In Step ST204, in a case in which the time-series distribution acquired in Step ST202 is not the specific time-series distribution, the determination result is "No", and the distance measurement imaging process proceeds to Step ST218 illustrated in FIG. 24B. In Step ST204, in a case in which the time-series distribution acquired in Step ST202 is the specific time-series distribution, the determination result is "Yes", and the distance measurement imaging process proceeds to Step ST205.

In Step ST205, the first distance acquisition unit 15A2 acquires the first distance measured in Step ST110 illustrated in FIG. 23. After the process in Step ST205 is performed, the distance measurement imaging process proceeds to Step ST206.

In Step ST206, the execution unit 15A5 executes imaging accompanied with focus control (active focus control) based on the first distance acquired in Step ST205, that is, the first imaging process. Then, the distance measurement imaging process proceeds to Step ST208.

The process in Steps ST208 to ST212 is the above-mentioned specific process. In Step ST208, the execution unit 15A5 executes the second distance measurement start process and the second distance acquisition process to direct the second distance measurement system processing circuit 34C to perform the second distance measurement and acquires the second distance which is the distance measurement result by the second distance measurement. After the process in Step ST208 is performed, the distance measurement imaging process proceeds to Step ST210.

In Step ST210, the execution unit 15A5 executes imaging accompanied with focus control (passive focus control) based on the second distance acquired in Step ST208, that is, the second imaging process. After the process in Step ST210 is performed, the distance measurement imaging process proceeds to Step ST212.

In Step ST212, the execution unit 15A5 executes the image selection screen display process. Then, the image selection screen (see FIG. 20) is generated on the basis of the first distance acquired in Step ST205, the first visible light image obtained by the first imaging process in Step ST206, the second distance acquired in Step ST208, and the second visible light image obtained by the second imaging process in Step ST210, and the above-mentioned various. Then, the image selection screen is displayed on the display 46. After the process in Step ST212 is performed, the distance measurement imaging process proceeds to Step T214.

The first visible light image obtained by the first imaging process in Step ST206 and the second visible light image obtained by the second imaging process in Step ST210 are displayed on the image selection screen. Therefore, in Step ST214, the execution unit 15A5 determines whether or not the user has selected any one of the first visible light image or the second visible light image displayed on the image selection screen through the touch panel 48. In Step ST214, in a case in which the user has not selected any one of the first visible light image or the second visible light image displayed on the image selection screen through the touch panel 48, the determination result is "No", and the determination in Step ST214 is performed again. In Step ST214, in a case in which the user has selected any one of the first visible light image or the second visible light image displayed on the image selection screen through the touch panel 48, the determination result is "Yes", and the distance measurement imaging process proceeds to Step ST216.

In Step ST216, the execution unit 15A5 determines whether or not the image selected from the image selection screen is the first visible light image. In Step ST216, in a case in which the image selected from the image selection screen is the second visible light image, the determination result is "No", and the distance measurement imaging process proceeds to Step ST226 illustrated in FIG. 24C. In Step ST216, in a case in which the image selected from the image selection screen is the first visible light image, the determination result is "Yes", and the distance measurement imaging process proceeds to Step ST218 illustrated in FIG. 24B.

In Step ST218 illustrated in FIG. 24B, the execution unit 15A5 determines whether or not the imaging start timing has come. The imaging start timing means, for example, the timing when the capture of one frame defined by a live view image frame rate starts. For example, in a case in which the live view image frame rate is 60 fps, the imaging start timing is every 1/60 seconds. In addition, here, the timing when the capture of one frame defined by the live view image frame rate is given as an example of the imaging start timing. However, the technology of the present disclosure is not limited thereto. For example, the imaging start timing may be the timing when the capture of one frame defined by a recording moving image frame rate starts or the timing when the receiving device 47 receives an instruction to start the capture of a still image.

In Step ST218, in a case in which the imaging start timing has not come, the determination result is "No", and the distance measurement imaging process proceeds to Step ST222. In Step ST218, in a case in which the imaging start timing has come, the determination result is "Yes", and the distance measurement imaging process proceeds to Step ST220.

In Step ST220, the execution unit 15A5 executes the first imaging process using the latest first distance. Further, the execution unit 15A5 executes the first visible light image display process using the latest first visible light image obtained by the first imaging process. In addition, here, the latest first distance means the latest of the first distance measured by the process in Step ST110 and the first distance measured by a process in Step ST224 which will be described below.

In Step ST222, the execution unit 15A5 determines whether or not a condition for ending the distance measurement imaging process (hereinafter, referred to as an "end condition") is satisfied. An example of the end condition is that the receiving device 47 receives an instruction to end the distance measurement imaging process. In Step ST222, in a case in which the end condition is not satisfied, the determination result is "No", and the distance measurement imaging process proceeds to Step ST224. In Step ST222, in a case in which the end condition is satisfied, the determination result is "Yes", and the distance measurement imaging process ends.

In Step ST224, the execution unit 15A5 directs the first distance measurement system processing circuit 34B to perform the first distance measurement. Here, the first distance measurement means, for example, the same process as that in Steps ST100 to ST110. After the process in Step ST224 is performed, the distance measurement imaging process proceeds to Step ST218.

In Step ST226 illustrated in FIG. 24C, the execution unit 15A5 determines whether or not the imaging start timing has come. In Step ST226, in a case in which the imaging start timing has not come, the determination result is "No", and the distance measurement imaging process proceeds to Step ST232. In Step ST226, in a case in which the imaging start timing has come, the determination result is "Yes", and the distance measurement imaging process proceeds to Step ST228.

In Step ST228, the execution unit 15A5 executes the second distance measurement start process and the second distance acquisition process to direct the second distance measurement system processing circuit 34C to perform the second distance measurement and acquires the second distance which is the distance measurement result by the second distance measurement. After the process of Step ST228 is performed, the distance measurement imaging process proceeds to Step ST230.

In Step ST230, the execution unit 15A5 executes the second imaging process using the second distance obtained by the second distance measurement in Step ST228. Further, the execution unit 15A5 executes the second visible light image display process using the latest second visible light image obtained by the second imaging process. After the process in Step ST230 is performed, the distance measurement imaging process proceeds to Step ST232.

In Step ST232, the execution unit 15A5 determines whether or not the end condition is satisfied. In Step ST232, in a case in which the end condition is not satisfied, the determination result is "No", and the distance measurement imaging process proceeds to Step ST226. In Step ST232, in a case in which the end condition is not satisfied, the determination result is "Yes", and the distance measurement imaging process ends.

As described above, the smart device 10 performs the first distance measurement system process (see FIG. 23) and the distance measurement imaging process (see FIGS. 24A to 24C). That is, the first distance is measured on the basis of the irradiation timing and the timing (first distance measurement light receiving timing) when the IR pixel receives the IR reflected light indicated by an IR pixel data item, which is selected on the basis of the relationship between a plurality of IR pixel data items generated by the first distance measurement system divided region 26N2 at a plurality of light receiving timings (for example, the "time intervals" illustrated in FIG. 14) within the light receiving period corresponding to the emission of the laser light by the light irradiator 16 and the intensities of a plurality of IR reflected light components indicated by the plurality of IR pixel data items, among the plurality of IR pixel data items. Therefore, this configuration makes it possible to avoid erroneous distance measurement caused by the reflected light from a glossy object (the mirror surface 100A in the example illustrated in FIG. 12) that is not intended as the distance measurement target.

Further, in the smart device 10, the light receiving timing of the IR reflected light related to an IR pixel data item having the second highest signal level among a plurality of IR pixel data items is adopted as the first distance measurement light receiving timing. Therefore, this configuration makes it is possible to accurately avoid erroneous distance measurement caused by the reflected light from a glossy object, which is not intended as the distance measurement target, as compared to a case in which the light receiving timing of the IR reflected light related to an IR pixel data item having the first highest signal level among a plurality of IR pixel data items is adopted as the first distance measurement light receiving timing.

Further, in the smart device 10, in a case in which the time-series distribution includes the intensity equal to or greater than the first threshold value and the intensity that is less than the first threshold value and is equal to or greater than the second threshold value, the execution unit 15A5 executes the specific process. Therefore, this configuration makes it possible to contribute to solving various problems (for example, the problem that the distance measurement result based on the IR reflected light from a glossy object that is not intended by the user as the distance measurement target is preferentially adopted) in a case in which the distance measurement result based on the IR reflected light from the glossy object that is not intended by the user as the distance measurement target and the distance measurement result based on the IR reflected light from the object that is intended by the user as the distance measurement target (the target subject 98 in the example illustrated in FIG. 12) are obtained.

Further, in the smart device 10, a value that decreases as the light receiving timing is delayed is adopted as the first threshold value. Therefore, this configuration makes it possible to accurately specify the distance measurement result based on the reflected light from the glossy object, as compared to a case in which the first threshold value is fixed regardless of the light receiving timing.

Furthermore, in the smart device 10, the strongly reflected light notification message is displayed on the image selection screen presented to the user. Therefore, this configuration makes it possible for the user to perceive that the IR reflected light is received from the glossy object intended as the distance measurement target by the user.

Moreover, in the smart device 10, the second distance measurement is performed as the specific process (see Step ST208 in FIG. 24A). Therefore, this configuration makes it possible to accurately measure the distance to the distance measurement target (the target subject 98 in the example illustrated in FIG. 12) intended by the user, as compared to a case in which the first distance measurement is performed even though the time-series distribution generated by the time-series distribution generation unit 34B2 is the specific time-series distribution.

In addition, in the smart device 10, the active focus control based on the first distance obtained by the first distance measurement is performed. Therefore, this configuration makes it possible to meet the needs of the user who prefers the active focus control to the passive focus control.

Further, in the smart device 10, the measurement of the first distance is performed for each of a plurality of IR pixels included in the first distance measurement system divided region 26N2 on the basis of the irradiation timing and the first distance measurement light receiving timing. Therefore, this configuration makes it possible to measure the first distance in a wide range, as compared to a case in which the measurement of the first distance is performed only for a single IR pixel on the basis of the irradiation timing and the first distance measurement light receiving timing. In addition, it is also possible to generate a distance image.

Furthermore, in the smart device 10, the image selection screen including the first visible light image obtained by performing imaging under the focus control based on the first distance and the second visible light image obtained by performing imaging under the focus control based on the second distance is displayed on the display 46. Then, a message that prompts the user to select the first visible light image or the second visible light image is displayed on the image selection screen. Therefore, this configuration makes it possible to contribute to improving usability, as compared to a case in which there is no room for selecting the first visible light image and the second visible light image.

In addition, in the first embodiment, the execution unit 15A5 prompts the user to select the first visible light image or the second visible light image through the image selection screen. However, the technology of the present disclosure is not limited thereto. Both the first visible light image and the second visible light image may be selected. In this case, for example, the first imaging process and the second imaging process may be alternately performed, and each of the first visible light image and the second visible light image obtained by each imaging process may be displayed as a live view image, a still image, or the like on the display 46.

Further, in the first embodiment, the aspect in which the first visible light image or the second visible light image is selected from the image selection screen by the user through the touch panel 48 has been described. However, the technology of the present disclosure is not limited thereto. For example, the following configuration may be used: in a case in which the first distance and the second distance are different from each other, the user is allowed to select in advance whether to prioritize the imaging accompanied with the focus control based on the distance measurement result by the active distance measurement, that is, the first distance measurement or the imaging accompanied with the focus control based on the distance measurement result by the passive distance measurement, that is, the second distance measurement.

Furthermore, in the first embodiment, the laser light is given as an example of the light for distance measurement emitted by the light irradiator 16. However, the technology of the present disclosure is not limited thereto. For example, the light for distance measurement may be light having directivity, such as superluminescent light, light emitted from a xenon flash light source, or light emitted from an LED.

Moreover, in the first embodiment, the visible light image divided region 26N1, the first distance measurement system divided region 26N2, and the second distance measurement system divided region 26N3 are integrated into one chip by the photoelectric conversion element 26. However, the technology of the present disclosure is not limited thereto. A plurality of visible light pixels may be integrated into one chip, a plurality of phase difference pixels may be integrated into one chip, and a plurality of IR pixels may be integrated into one chip. In addition, a plurality of visible light pixels and a plurality of phase difference pixels may be integrated into one chip, and a plurality of IR pixels may be integrated into one chip. In a case in which different types of photosensitive pixels are integrated into different types of chips and are mounted on the smart device 10 as described above, an objective lens, a focus lens, and an optical system, such as a stop, may be provided on the subject side (object side) of each chip.

Further, in the first embodiment, the aspect in which the distance measurement imaging device 14 is provided in the smart device 10 has been described. However, the technology of the present disclosure is not limited thereto. For example, the distance measurement imaging device 14 may be externally attached to a general smart device, that is, a smart device in which the distance measurement imaging device 14 is not provided.

Furthermore, in the first embodiment, the aspect in which the UI system device 44 is incorporated into the smart device 10 has been described. However, at least some of a plurality of components included in the UI system device 44 may be externally attached to the smart device 10. Moreover, at least some of the plurality of components included in the UI system device 44 may be separately connected to the external I/F 52 and then used.

In addition, in the example illustrated in FIG. 1, the smart device 10 is given as an example. However, the technology of the present disclosure is not limited thereto. That is, the technology of the present disclosure can also be applied to various electronic devices (for example, an interchangeable lens camera, a fixed lens camera, a personal computer, and/or a wearable terminal device) in which the distance measurement imaging device 14 is provided. Even in these electronic devices, the same operation and effect as those of the smart device 10 are obtained.

Further, in the first embodiment, the display 46 is given as an example. However, the technology of the present disclosure is not limited thereto. For example, a display that is externally attached to the smart device 10 may be used in combination with the display 46.

Furthermore, in the first embodiment, the photoelectric conversion element 26 and the signal processing circuit 34 are separated from each other. However, a stacked imaging element in which the photoelectric conversion element 26 and the signal processing circuit 34 are integrated into one chip may be used. Moreover, at least a portion of the signal processing circuit 34 may be removed such that the CPU 15A takes charge of the functions of the signal processing circuit 34.

In addition, in the first embodiment, the aspect in which the imaging timing signal is supplied from the photoelectric conversion element driver 32 to the photoelectric conversion element 26 has been described. However, the technology of the present disclosure is not limited thereto. For example, the photoelectric conversion element driver 32 may not be provided. In this case, the CPU 15A may take charge of the functions of the photoelectric conversion element driver 32.

Further, in the first embodiment, the second distance measurement, that is, the phase-difference-image-based distance measurement which measures the distance according to the phase difference image obtained from the phase difference pixel is given as an example of the "image-based distance measurement" according to the technology of the present disclosure. However, the technology of the present disclosure is not limited thereto. For example, instead of the distance measurement using a phase difference pixel, distance measurement using a stereo camera, that is, distance measurement using a stereo image which measures the distance according to a stereo image may be performed, or distance measurement using face detection, that is, distance measurement using an object image which measures the distance according to an object image showing an object whose size is known may be performed. In the distance measurement using a stereo camera, the distance to the subject is measured using parallax between a pair of images obtained from the stereo camera (stereo images captured by a stereo imaging method). Further, in the distance measurement using face detection, the distance to the subject is measured using, for example, the proportion of the size of a detected face image to the size of an image corresponding to one frame. Here, the size of the face image is given as an example. However, the technology of the present disclosure is not limited thereto, and any object image showing an object whose size is known (for example, a specific car) may be used. Even in a case in which the distance measurement using a stereo image and/or the distance measurement using an object image is used as described above, it is possible to obtain the same effect as that in a case in which the phase-difference-image-based distance measurement is used.

Furthermore, in the first embodiment, the aspect in which the G filter, the R filter, and the B filter also have the function of the infrared cut filter for cutting infrared light has been described. However, the technology of the present disclosure is not limited thereto. Each color filter corresponding to each of the R pixel, the G pixel, and the B pixel may be used as a color filter that transmits infrared light, and a pair of photodiodes including a photodiode for a visible light pixel and a photodiode for an IR pixel (for example, an InGaAs APD) may be disposed for one color filter.

Moreover, in the first embodiment, the aspect in which the visible light image divided region 26N1 and the second distance measurement system divided region 26N3 are used in combination has been described. However, the technology of the present disclosure is not limited thereto. For example, instead of the visible light image divided region 26N1 and the second distance measurement system divided region 26N3, an area sensor may be used in which visible light pixel data and phase difference pixel data are selectively generated and read out. In this case, a plurality of photosensitive pixels are two-dimensionally arranged in the area sensor. For example, a pair of independent photodiodes without having a light shielding member are used as the photosensitive pixels included in the area sensor. In a case in which visible light pixel data is generated and read out, photoelectric conversion is performed by the entire region of the photosensitive pixel (a pair of photodiodes). In a case in which phase difference pixel data is generated and read out (for example, passive distance measurement is performed), photoelectric conversion is performed by one of the pair of photodiodes. Here, one of the pair of photodiodes is a photodiode corresponding to the first phase difference pixel L described in the first embodiment, and the other of the pair of photodiodes is a photodiode corresponding to the second phase difference pixel R described in the first embodiment. In addition, the visible light pixel data and the phase difference pixel data may be selectively generated and read by all of the photosensitive pixels included in the area sensor. However, the technology of the present disclosure is not limited thereto. The visible light pixel data and the phase difference pixel data may be selectively generated and read out by some of the photosensitive pixels included in the area sensor.

Further, in the first embodiment, the aspect in which the timing when the IR reflected light having the second highest intensity in the time-series distribution is received by the specific IR pixel is adopted as the first distance measurement light receiving timing has been described. However, the technology of the present disclosure is not limited thereto. For example, the timing when the IR reflected light (the mirror surface IR reflected light in the example illustrated in FIG. 16) having an intensity greater than the first threshold value and the noise light having an intensity less than the second threshold value may not be adopted as the first distance measurement light receiving timing, but the IR reflected light (the target subject IR reflected light in the example illustrated in FIG. 16) having an intensity that is less than the first threshold value and is equal to or greater than the second threshold value may be adopted as the first distance measurement light receiving timing. In this case, it is avoided that the first distance measurement is performed on the basis of the timing when the mirror surface IR reflected light is received and that the first distance measurement is performed on the basis of the noise light, as in the first embodiment.

Furthermore, in the first embodiment, the aspect in which the second distance measurement in Step ST208 of FIG. 24A is performed after the first distance measurement is performed as illustrated in FIG. 23 has been described. However, the technology of the present disclosure is not limited thereto. For example, the CPU 15A may perform the first distance measurement and the second distance measurement in parallel and perform, as the specific process, a process including the process based on the distance measurement result of the second distance measurement. Here, examples of the process based on the distance measurement result of the second distance measurement include imaging accompanied with focus control based on the second distance obtained by the second distance measurement and/or a process of displaying the second distance on the display 46. The above-described configuration in which the first distance measurement and the second distance measurement are performed in parallel and a process including the process based on the distance measurement result of the second distance measurement is performed as the specific process makes it possible to quickly perform the process based on the distance measurement result of the second distance measurement, that is, the second distance, as compared to a case in which the second distance measurement is performed after the first distance measurement is performed.

Further, in the first embodiment, the first threshold value and the second threshold value are not determined in consideration of a noise component caused by ambient light. However, the technology of the present disclosure is not limited thereto. The first threshold value and the second threshold value may be determined on the basis of the noise component caused by the ambient light. In this case, for example, the first threshold value and the second threshold value may be determined so as to be greater than a value which has been derived in advance by an actual machine test and/or a computer simulation as the upper limit value of the intensity of IR light included in the ambient light. Therefore, this configuration makes it possible to prevent the noise component caused by the ambient light from being erroneously detected as the target subject IR reflected light, as compared to a case in which the first threshold value and the second threshold value are determined without considering the noise component caused by the ambient light.

Second Embodiment

In the first embodiment, the aspect in which the second imaging process based on the distance measurement result of the second distance measurement, that is, the image-based distance measurement is performed has been described. However, in a second embodiment, a case in which imaging accompanied with contrast AF is performed instead of the second imaging process will be described. In addition, in the second embodiment, the same components as those in the first embodiment are denoted by the same reference numerals, and the description thereof will not be repeated. Portions different from those in the first embodiment will be described.

Figure 25:
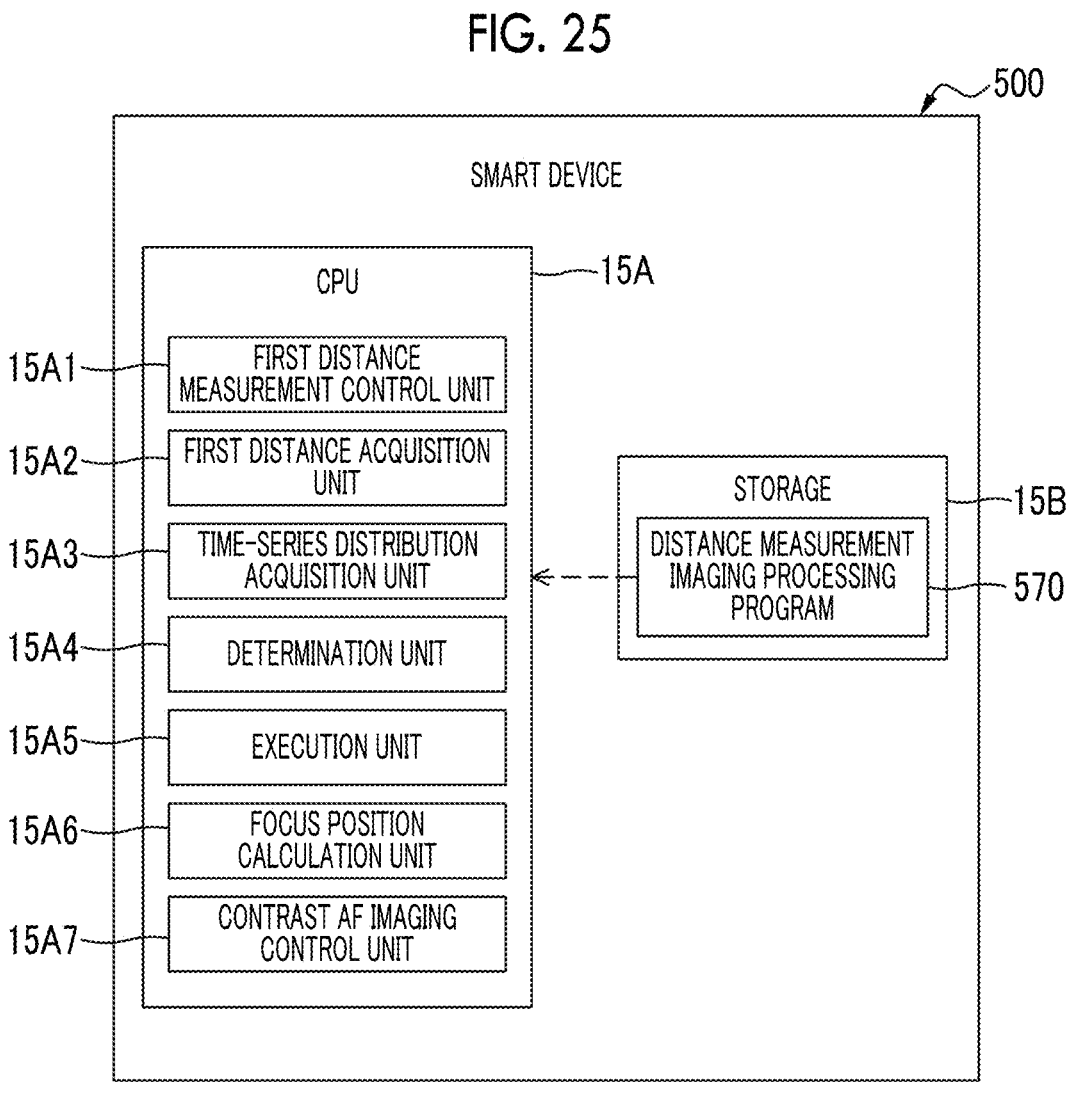
FIG. 25 is a block diagram illustrating an example of functions of a CPU included in a smart device according to a second embodiment.

For example, as illustrated in FIG. 25, in a smart device 500 according to the second embodiment, a distance measurement imaging processing program 570 is stored in the storage 15B. The CPU 15A reads out the distance measurement imaging processing program 570 from the storage 15B. Then, the CPU 15A executes the distance measurement imaging processing program 570 read out from the storage 15B to operate as a first distance measurement control unit 15A1, a first distance acquisition unit 15A2, a time-series distribution acquisition unit 15A3, a determination unit 15A4, an execution unit 15A5, a focus position calculation unit 15A6, and a contrast AF imaging control unit 15A7.

Figure 26:
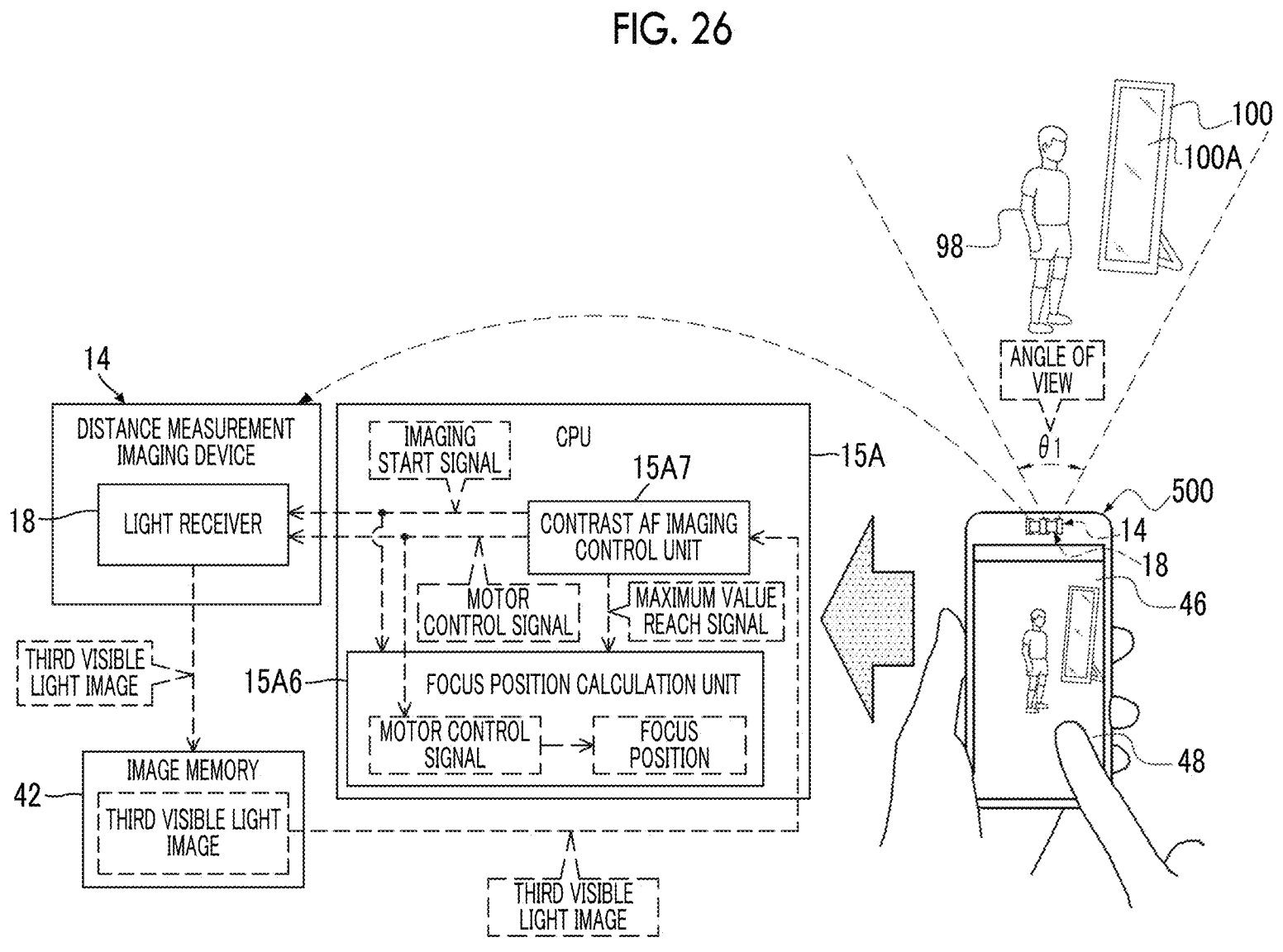

For example, as illustrated in FIG. 26, in a case in which the contrast AF imaging control unit 15A7 directs the light receiver 18 to perform imaging using a contrast AF method, it outputs an imaging start signal to the light receiver 18 and the focus position calculation unit 15A6. The contrast AF imaging control unit 15A7 outputs the imaging start signal to the light receiver 18 to direct the visible light image divided region 26N1 (see FIG. 5) to perform imaging at a predetermined frame rate (for example, 60 fps) and to direct the visible light pixel data processing circuit 34A to generate a third visible light image showing the imaging region. The visible light pixel data processing circuit 34A outputs the third visible light image to the image memory 42. The third visible light image is stored in the image memory 42. The third visible light image in the image memory 42 is updated whenever the third visible light image is input from the visible light pixel data processing circuit 34A. In addition, the third visible light image is an example of a "subject image" according to the technology of the present disclosure.

Further, the contrast AF imaging control unit 15A7 outputs a motor control signal to the light receiver 18 and the focus position calculation unit 15A6 in parallel to the output of the imaging start signal. The motor control signal is a signal for reciprocating (wobbling) the focus lens 30B along the optical axis L2 and is input to the motor driver 64 of the light receiver 18. The motor driver 64 drives the motor 62 in response to the input motor control signal to wobble the focus lens 30B (see FIG. 8). On the other hand, the focus position calculation unit 15A6 calculates the current position of the focus lens 30B on the optical axis L2, using the motor control signal input until the present time after the imaging start signal is input from the contrast AF imaging control unit 15A7.

The contrast AF imaging control unit 15A7 acquires the third visible light image from the image memory 42 whenever the third visible light image in the image memory 42 is updated and calculates the contrast value of the acquired third visible light image. Then, the contrast AF imaging control unit 15A7 searches for the maximum value of the contrast of the third visible light image and outputs a maximum value reach signal to the focus position calculation unit 15A6 at the time when the maximum value is searched. The maximum value reach signal is a signal indicating that the contrast of the third visible light image has reached the maximum value.

In a case in which the maximum value reach signal is input, the focus position calculation unit 15A6 calculates, as the focus position, the current position on the optical axis L2 of the focus lens 30B, using the motor control signal input until the present time after the imaging start signal is input. The focus position means a focus position where the subject (the target subject 98 in the example illustrated in FIG. 26) included in the imaging region is in focus. Here, the focus position calculation unit 15A6 calculates the focus position, using an arithmetic expression in which the motor control signal is an independent variable and the focus position is a dependent variable. In addition, the technology of the present disclosure is not limited thereto. For example, the focus position calculation unit 15A6 may derive the focus position, using a table in which the time-series data of the motor control signal and the position of the focus lens 30B on the optical axis L2 are associated with each other.

Figure 27:
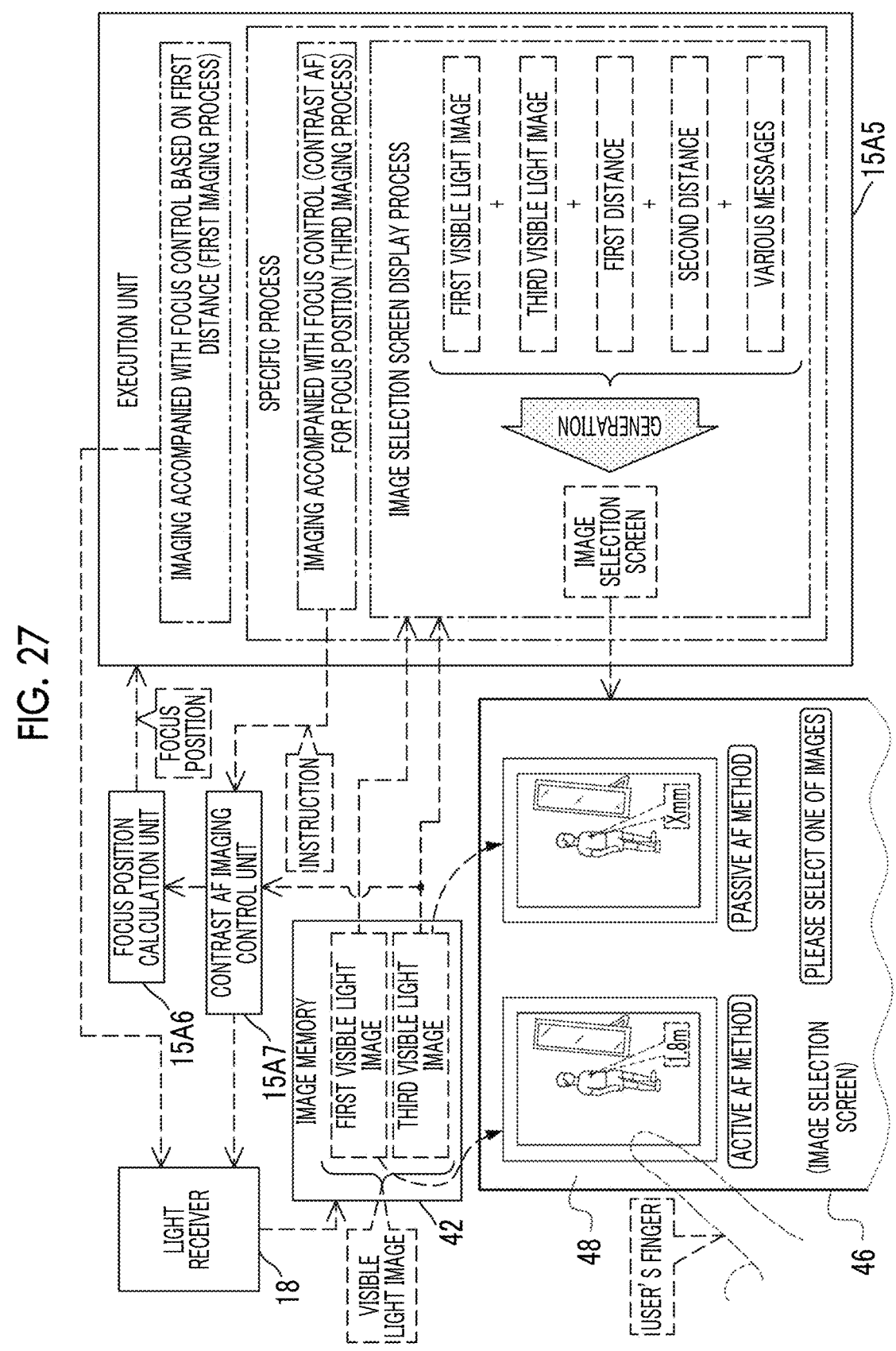
FIG. 27 is a conceptual diagram illustrating an example of details of a specific process executed by an execution unit according to the second embodiment.

For example, as illustrated in FIG. 27, a specific process is different from the specific process according to the first embodiment in that it includes a third imaging process instead of the second imaging process. The third imaging process means a process of performing imaging (imaging accompanied with contrast AF) accompanied with focus control for the focus position. Specifically, in the third imaging process, the execution unit 15A5 instructs the contrast AF imaging control unit 15A7 to perform the imaging accompanied with contrast AF, and the contrast AF imaging control unit 15A7 directs the light receiver 18 to perform the imaging accompanied with contrast AF in response to the instruction from the execution unit 15A5.

Further, an image selection screen, which is generated by the execution of the image selection screen display process included in the specific process by the execution unit 15A5 and is displayed on the display 46, is different from the image selection screen according to the first embodiment in some display content. That is, instead of the second distance, the focus position calculated by the focus position calculation unit 15A6 (in the example illustrated in FIG. 27, a numerical value of "X mm" indicating the distance from a reference position to the focus lens 30B) is displayed on the image selection screen. The reference position means, for example, the position of the imaging surface of the photoelectric conversion element 26 or the position of the focus lens 30B in a state in which the focus lens 30B is focused at infinity.

Furthermore, in the example illustrated in FIG. 27, the third visible light image is displayed on the image selection screen instead of the second visible light image. Moreover, instead of the message "active method", a message "active AF method" is displayed on the image selection screen. In addition, instead of the message "passive method", a message "contrast AF method" is displayed on the image selection screen. Further, in the example illustrated in FIG. 27, the first visible light image is displayed so as to be associated with a first distance of "1.8 m". However, the technology of the present disclosure is not limited thereto. Instead of the first distance or in addition to the first distance, the focus position derived on the basis of the first distance, that is, the distance from the reference position to the focus lens 30B may be displayed.

Furthermore, in the second embodiment, the display examples of the "active AF method" and the "contrast AF method" are illustrated. However, the display method may not necessarily be the "active AF method" and the "passive AF method", and any display method may be used as long as the user can understand the difference between the AF methods. For example, in a case in which AF using laser distance measurement and contrast AF are performed, a message "AF using laser distance measurement" and a message "AF using contrast" may be displayed, or an icon or the like indicating the AF method may be displayed. Moreover, the focus position may be displayed instead of the display of AF. For example, "focus position: front" and "focus position: back" may be displayed, or "focus position: object" and "focus position: image reflected on object" may be displayed. Alternatively, combinations of two or more of letters and icons indicating the AF method and the focus position may be displayed.

As described above, in the smart device 500, the execution unit 15A5 executes the imaging accompanied with contrast AF (third imaging process) as the specific process. Therefore, according to this configuration, in a case in which the time-series distribution generated by the time-series distribution generation unit 34B2 is a specific time-series distribution, the imaging accompanied with contrast AF is executed. Therefore, it is possible to meet the needs of the user who prefers the contrast AF method to the active AF method.

Further, in each of the above-described embodiments, the imaging region within the angle of view θ1 is the distance measurement target. However, the technology of the present disclosure is not limited thereto. For example, the imaging region as the distance measurement target may be a specific real space region that is limited in response to an instruction given by the user through the receiving device 47. This configuration makes it possible to perform distance measurement for the real space region intended by the user. In addition, here, the aspect in which the imaging region is limited in response to the instruction given by the user through the receiving device 47 has been described. However, the technology of the present disclosure is not limited thereto. For example, the imaging region may be limited in response to an instruction given from an external device (not illustrated) that can communicate with the smart device 10.

Further, the CPU 15A may selectively limit the distance measurement target region in which the first distance measurement is performed and the distance measurement target region in which the second distance measurement is performed in response to an instruction given by the user or an external device. A method for adjusting the irradiation angle θ2 and/or a method for limiting the range of the IR pixels used in the first distance measurement system divided region 26N2 is given as an example of a method for limiting the distance measurement target region in which the first distance measurement is performed. Furthermore, a method for adjusting the angle of view θ1 and/or a method for limiting the range of the phase difference pixels used in the second distance measurement system divided region 26N3 is given as an example of a method for limiting the distance measurement target region in which the second distance measurement is performed.

Moreover, the imaging region as the distance measurement target may be a specific real space region corresponding to the target subject image (for example, an image showing the target subject 98) detected from the visible light image by the CPU 15A. In this case, for example, the first distance measurement and/or the second distance measurement may be performed for the real space region corresponding to the target subject image detected by an image recognition process using machine learning (for example, deep learning). In addition, the target subject image may be an image showing the face of a specific person, an image showing a vehicle, such as a car or an aircraft, or an image showing an object.

The above-described configuration in which distance measurement is performed for the specific real space region corresponding to the target subject image detected by the CPU 15A from the visible light image makes it possible to easily perform distance measurement for the target subject, as compared to a case in which the user searches for the target subject with the naked eye and measures the distance to the target subject.

Figure 28:
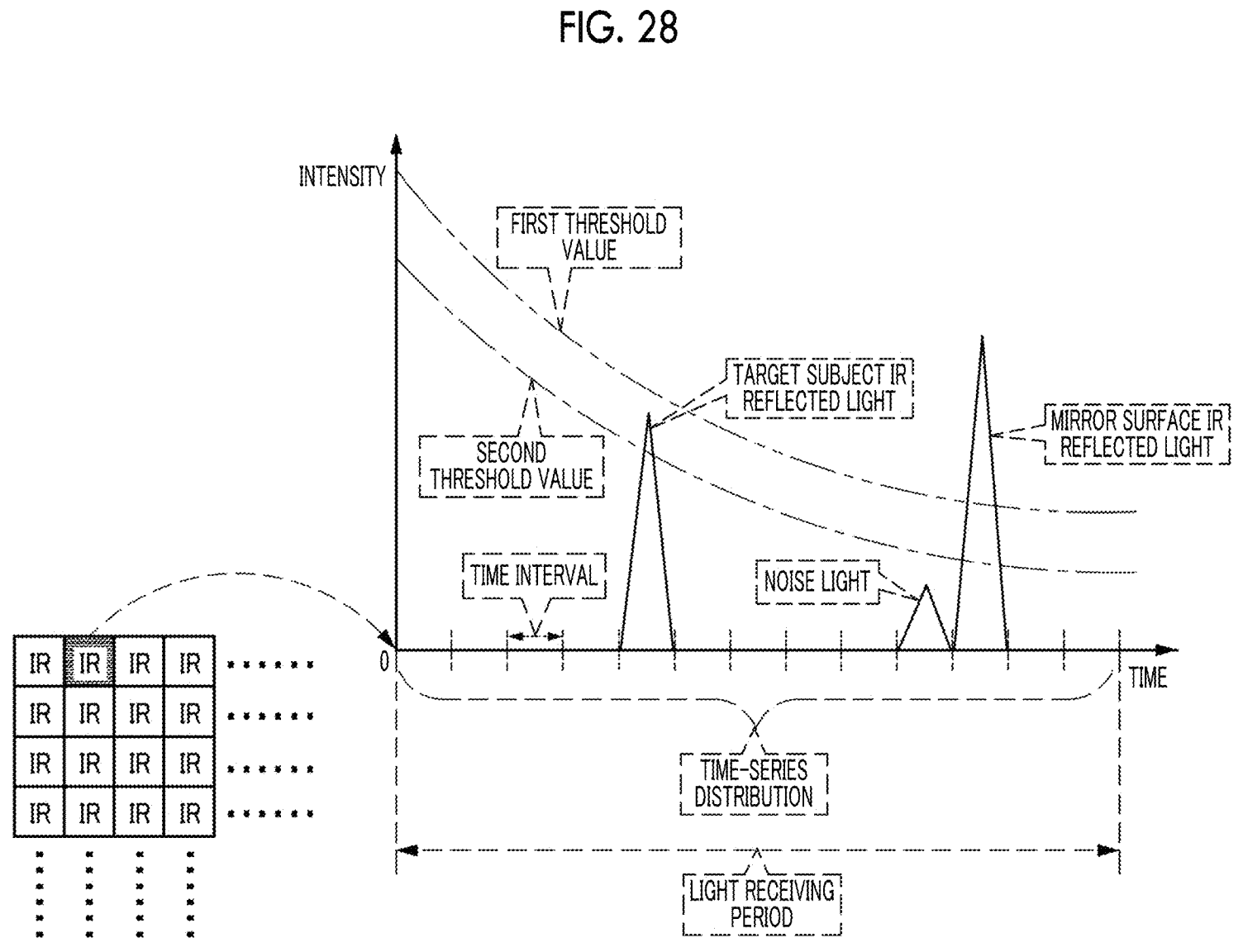

Further, in each of the above-described embodiments, for example, in the time-series distribution illustrated in FIG. 14, the timing when the mirror surface IR reflected light is received is earlier than the timing when the target subject IR reflected light is received. However, the technology of the present disclosure is not limited thereto and is also established even in a case in which the timing when the target subject IR reflected light is received is earlier than the timing when the mirror surface IR reflected light is received as illustrated in FIG. 28. Even in this case, the timing when the IR reflected light having the second highest intensity in the time-series distribution is received is adopted as the first distance measurement light receiving timing.

Figure 29:
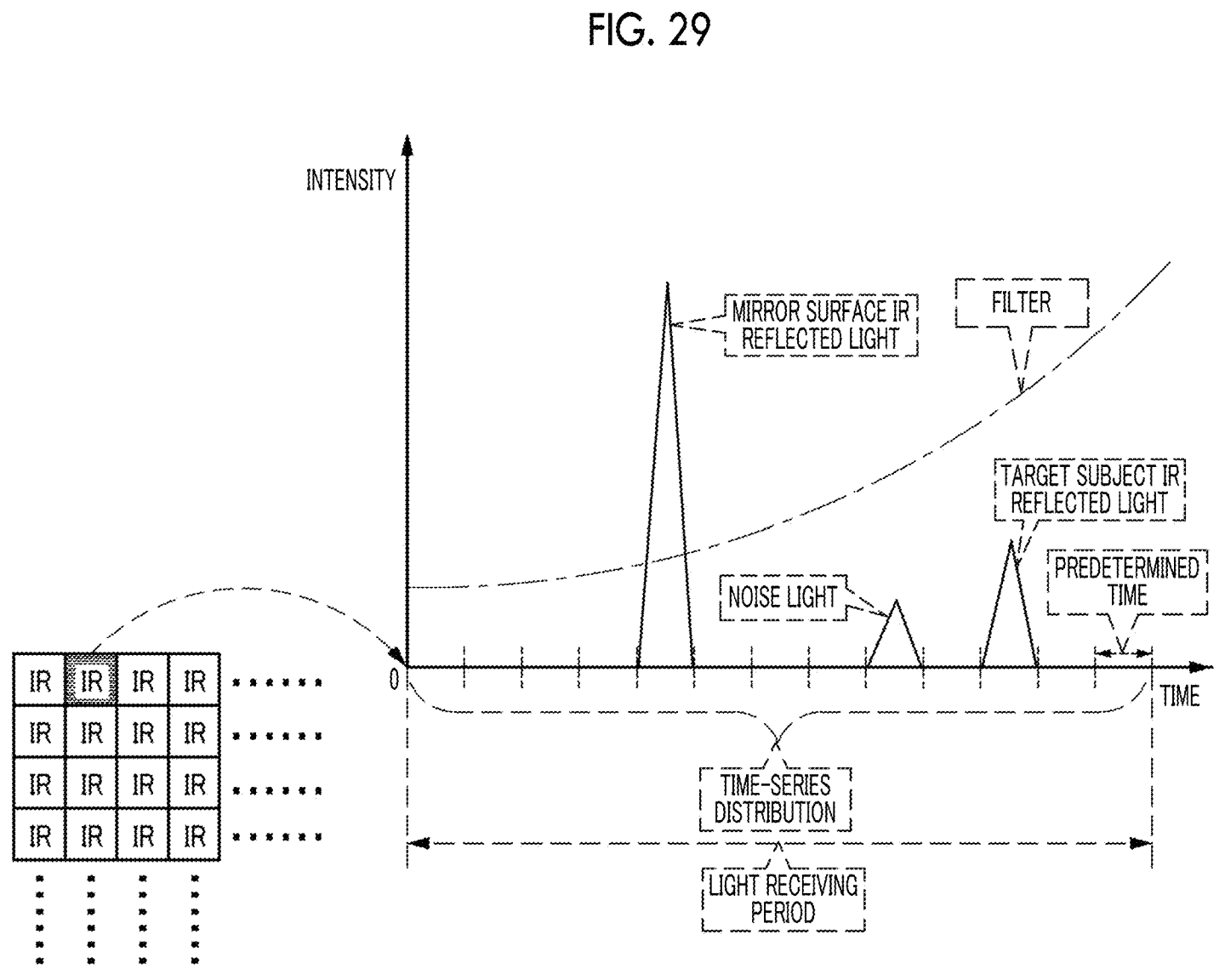
Figures 30, 31:
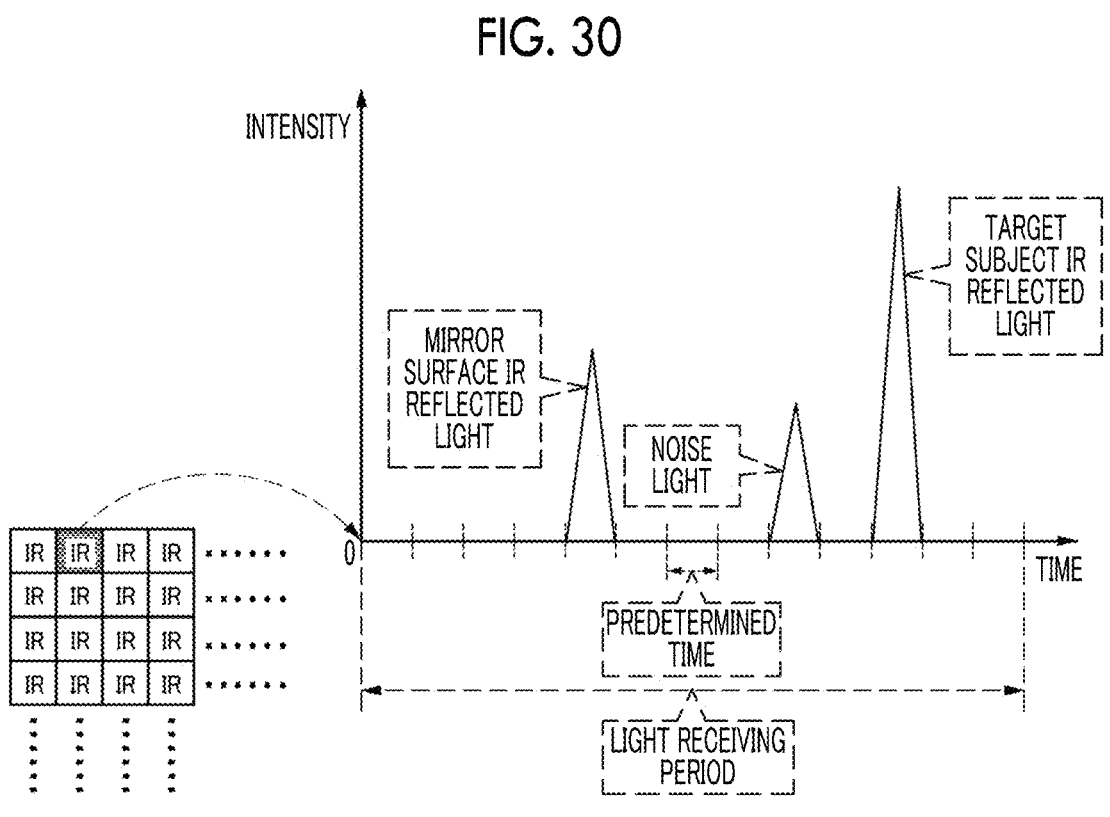
FIG. 30 is a conceptual diagram illustrating an example of a time-series distribution adjusted by applying the filter.
FIG. 31 is a conceptual diagram illustrating an example of an aspect in which a distance measurement imaging processing program according to the first or second embodiment is installed in the smart device.

Furthermore, in each of the above-described embodiments, it is determined whether or not the time-series distribution is the specific time-series distribution using the first threshold value and the second threshold value (see FIG. 16). However, the technology of the present disclosure is not limited thereto. For example, the intensity of the time-series distribution may be adjusted according to the light receiving timing. In this case, for example, as illustrated in FIG. 29, a filter (in the example illustrated in FIG. 29, a filter configured such that intensity increases gradually as the light receiving timing is delayed) is applied to the time-series distribution such that the time-series distribution is adjusted, for example, as illustrated in FIG. 30. This configuration makes it possible to accurately specify the distance measurement result caused by the material of the object as the distance measurement target from the time-series distribution, as compared to a case in which the time-series distribution is affected by the light receiving timing.

In addition, in a case in which the time-series distribution is filtered as described above, the first threshold value and the second threshold value applied to the time-series distribution after the filtering are changed depending on the filter. Along with this, the method for determining whether or not the time-series distribution corresponds to the above-mentioned specific time-series distribution is also changed. For example, the magnitude relationship between the first threshold value and the second threshold value described in the first embodiment is "the first threshold value<the second threshold value". In a case in which the first threshold value and the second threshold value are applied to the time-series distribution illustrated in FIG. 30 and the time-series distribution includes an intensity (in the example illustrated in FIG. 30, the target subject IR reflected light) greater than the second threshold value and an intensity (in the example illustrated in FIG. 30, the mirror surface IR reflected light) that is less than the second threshold value and is equal to or greater than the first threshold value, the determination unit 15A4 determines that the time-series distribution after the filtering is the specific time-series distribution.

Further, the degree of removing the influence of the light receiving timing may be dispersed by the filter (see FIG. 29) and the first threshold value. For example, the influence of the light receiving timing may be removed by half by the filter, and the influence of the light receiving timing may be removed by half by the first threshold value.

Furthermore, the aspect in which the distance measurement imaging processing program 70 is stored in the storage 15B in the first embodiment and the distance measurement imaging processing program 570 is stored in the storage 15B in the second embodiment has been described. However, the technology of the present disclosure is not limited thereto. For example, as illustrated in FIG. 31, the distance measurement imaging processing program 70 or 570 (hereinafter, referred to as a "distance measurement imaging processing program" without a reference numeral in a case in which it is not necessary to distinctively describe the distance measurement imaging processing programs 70 and 570) may be stored in a storage medium 900. An example of the storage medium 900 is any portable storage medium such as an SSD or a USB memory.

The distance measurement imaging processing program stored in the storage medium 900 is installed in the controller 15. The CPU 15A executes the distance measurement imaging process according to the distance measurement imaging processing program.

In addition, the distance measurement imaging processing program may be stored in a storage unit of, for example, another computer or a server device connected to the controller 15 through a communication network (not illustrated). The distance measurement imaging processing program may be downloaded and installed in the controller 15 in response to a request from the smart device 10.

Further, the entire distance measurement imaging processing program is not necessarily stored in the storage unit of another computer or the server device connected to the controller 15 or the storage 15B, and a portion of the distance measurement imaging processing program may be stored therein.

In the example illustrated in FIG. 31, the aspect in which the controller 15 is provided in the smart device 10 is illustrated. However, the technology of the present disclosure is not limited thereto. For example, the controller 15 may be provided outside the smart device 10.

In the example illustrated in FIG. 31, the CPU 15A is a single CPU. However, a plurality of CPUs may be provided. Furthermore, a GPU may be applied instead of the CPU 15A.

In the example illustrated in FIG. 31, the controller 15 is given as an example. However, the technology of the present disclosure is not limited thereto. A device including an ASIC, an FPGA, and/or a PLD may be applied instead of the controller 15. In addition, a combination of a hardware configuration and a software configuration may be used instead of the controller 15.

The following various processors can be used as a hardware resource for performing the distance measurement imaging process described in each of the above-described embodiments. An example of the processor is a CPU which is a general-purpose processor that executes software, that is, a program to function as the hardware resource for performing the distance measurement imaging processing. In addition, an example of the processor is a dedicated electric circuit which is a processor having a dedicated circuit configuration designed to perform a specific process, such as an FPGA, a PLD, or an ASIC. A memory is provided in or connected to any processor, and each processor performs the distance measurement imaging process using the memory.

The hardware resource for performing the distance measurement imaging process may be configured by one of the various processors or a combination of two or more processors of the same type or different types (for example, a combination of a plurality of FPGAs and/or a combination of a CPU and an FPGA). Further, the hardware resource for performing the distance measurement imaging process may be one processor.

A first example of the configuration in which the hardware resource is configured by one processor is an aspect in which one processor is configured by a combination of one or more CPUs and software and functions as the hardware resource for performing the distance measurement imaging process. A second example of the configuration is an aspect in which a processor that implements the functions of the entire system including a plurality of hardware resources for performing the distance measurement imaging process using one integrated circuit (IC) chip is used. A representative example of this aspect is an SoC. As described above, the distance measurement imaging process is achieved using one or more of the various processors as the hardware resource.

In addition, specifically, an electric circuit obtained by combining circuit elements, such as semiconductor elements, can be used as the hardware structure of the various processors. Further, the above-mentioned distance measurement imaging process is just an example. Therefore, it goes without saying that unnecessary steps may be deleted, new steps may be added, or the processing order may be changed without departing from the gist.

The content described and illustrated above is a detailed description of portions related to the technology of the present disclosure and is just an example of the technology of the present disclosure. For example, the description of the configurations, functions, operations, and effects is the description of examples of the configurations, functions, operations, and effects of the portions related to the technology of the present disclosure. Therefore, unnecessary portions may be deleted or new elements may be added or replaced in the content described and illustrated above, without departing from the gist of the technology of the present disclosure. In addition, the description of, for example, common technical knowledge that does not need to be particularly described to enable the implementation of the technology of the present disclosure is omitted in the content described and illustrated above in order to avoid confusion and to facilitate the understanding of the portions related to the technology of the present disclosure.

In the specification, "A and/or B" is synonymous with "at least one of A or B.". That is, "A and/or B" means only A, only B, or a combination of A and B. Further, in the specification, the same concept as "A and/or B" is applied to a case in which the connection of three or more matters is expressed by "and/or".

All of the documents, the patent applications, and the technical standards described in the specification are incorporated by reference herein to the same extent as each individual document, each patent application, and each technical standard are specifically and individually stated to be incorporated by reference.

Further, the following additional notes will be disclosed with respect to the above-described embodiments.

(Additional Note 1)

An information processing device includes a processor and a memory that is connected to or provided in the processor. In a case in which the number of times a light receiver receives reflected light is one in a time-series distribution in which the intensity of the reflected light received by the light receiver at a predetermined time interval within a light receiving period corresponding to surface irradiation with light by a light irradiator is defined in time series, the processor performs focus control for an imaging device, using a first distance measured on the basis of an irradiation timing and a light receiving timing. In a case in which the number of times the light receiver receives the reflected light is two or more in the time series distribution, the processor performs the focus control for the imaging device, using a second distance measured on the basis of an image obtained by imaging a distance measurement target region.

(Additional Note 2)

A distance measurement device includes: a processor; a light irradiator that performs surface irradiation on a distance measurement target region with light; and a light receiver that receives reflected light of the light from the distance measurement target region. The processor measures a first distance to an object in the distance measurement target region on the basis of an irradiation timing when the light irradiator performs the surface irradiation on the distance measurement target region with the light and a light receiving timing when the light receiver receives the reflected light of the light from the distance measurement target region. The processor measures the first distance on the basis of an irradiation timing and a light receiving timing corresponding to a signal selected on the basis of a relationship between a plurality of signals, which are generated by the light receiver at a plurality of light receiving timings within a light receiving period corresponding to the surface irradiation by the light irradiator, and intensities of the plurality of signals among the plurality of signals.

(Additional Note 3)

An information processing device includes a processor and a memory that is connected to or provided in the processor. The processor measures a first distance to an object in a distance measurement target region on the basis of an irradiation timing when a light irradiator performs surface irradiation on the distance measurement target region with light and a light receiving timing when a light receiver receives reflected light of the light from the distance measurement target region. The processor measures the first distance on the basis of an irradiation timing and a light receiving timing corresponding to a signal selected on the basis of a relationship between a plurality of signals, which are generated by the light receiver at a plurality of light receiving timings within a light receiving period corresponding to the surface irradiation by the light irradiator, and intensities of the plurality of signals among the plurality of signals.

EXPLANATION OF REFERENCES 10, 500: smart device
12: housing

12A: rear surface
12B: front surface
13: instruction key
14: distance measurement imaging device
15: controller
15A: CPU
15A1: first distance measurement control unit
15A2: first distance acquisition unit
15A3: time-series distribution acquisition unit
15A4: determination unit
15A5: execution unit
15A6: focus position calculation unit
15A7: contrast AF imaging control unit
15A8: focus position calculation unit
15B: storage
15C: memory
16: light irradiator
17A, 17B: light shielding member
18: light receiver
19: microlens
20, 22, 352: translucent window
21: beam expander
23: collimating lens
24: LD
25: LD driver
26, 354: photoelectric conversion element
26N1: visible light image divided region
26N2: first distance measurement system divided region
26N3: second distance measurement system divided region
27: TOF camera
30A: objective lens
30B: focus lens
30C: stop
31: focus control mechanism
32: photoelectric conversion element driver
34: signal processing circuit
34A: visible light pixel data processing circuit
34B: first distance measurement system processing circuit
34B1: IR pixel data acquisition unit
34B2: time-series distribution generation unit
34B3: light receiving timing determination unit
34B4: first distance measurement unit
34C: second distance measurement system processing circuit
40: input/output interface
41: imaging lens
42: image memory
44: UI system device
46: display
47: receiving device
48: touch panel
50: bus
52: external I/F
53: hard key unit
54: communication I/F
56: network
59: touch panel display
60: moving mechanism
62: motor
64: motor driver
70, 570: distance measurement imaging processing program
72: focus position derivation table
100: mirror
100A: mirror surface
300L: left region passing light 300R: right region passing light
900: storage medium
L: first phase difference pixel
L1, L2: optical axis
N: non-phase difference pixel
PD: photodiode
R: second phase difference pixel
α: amount of deviation
θ1: angle of view
θ2: irradiation angle
What is claimed is:

1. An information processing device comprising:
a processor; and
a memory that is connected to or provided in the processor,
wherein the processor is configured to:
  measure a first distance to an object in a distance measurement target region on the basis of an irradiation timing when a light irradiator performs surface irradiation on the distance measurement target region with light and a light receiving timing when a light receiver receives reflected light of the light from the distance measurement target region; and
  in a case in which a specific pixel included in the light receiver generates a plurality of signals at different timings within a light receiving period corresponding to the surface irradiation, measure the first distance on the basis of a relationship between the plurality of signals generated by the specific pixel, the plurality of signals including a first signal and a second signal, the first signal having a first intensity that is equal to or greater than a first threshold value, and the second signal having a second intensity that is less than the first threshold value and is equal to or greater than a second threshold value that is less than the first threshold value,
wherein the first threshold value is a value that is determined as a lower limit value of an intensity of the reflected light from a glossy object, and
wherein the second threshold value is a value that is determined as a lower limit value of an intensity of the reflected light from a standard subject assumed to be the object.

2. The information processing device according to claim 1,
wherein the relationship between the plurality of signals is a time-series distribution of intensities of the plurality of signals.

3. The information processing device according to claim 1,
wherein, in a case in which the plurality of signals include a plurality of signals having an intensity greater than a reference threshold value, the processor is configured to measure the first distance on the basis of the light receiving timing when the light receiver receives the reflected light corresponding to a signal having a second highest intensity among the plurality of signals.

4. The information processing device according to claim 1,
wherein the processor is configured to perform a specific process in a case in which the plurality of signals include the first signal and the second signal.

5. The information processing device according to claim 4,
wherein the first threshold value and the second threshold value are determined on the basis of a noise component caused by ambient light.

6. The information processing device according to claim 4,
wherein the first threshold value is a value that decreases as the light receiving timing is delayed.

7. The information processing device according to claim 4,
wherein the specific process is a process that measures the first distance on the basis of the light receiving timing when the specific pixel receives the reflected light corresponding to the second signal.

8. The information processing device according to claim 4,
wherein the specific process includes a process of notifying that a first intensity is included in the intensities of the plurality of signals.

9. The information processing device according to claim 4,
wherein the specific process includes image-based distance measurement that measures a second distance to the object on the basis of an image obtained by imaging the distance measurement target region with a first imager.

10. The information processing device according to claim 4,
wherein the processor is configured to perform the image-based distance measurement that measures a second distance to the object on the basis of an image obtained by imaging the distance measurement target region with a second imager, in parallel to an operation of measuring the first distance on the basis of the irradiation timing and the light receiving timing, and
the specific process includes a process based on a distance measurement result of the image-based distance measurement.

11. The information processing device according to claim 9,
wherein the image-based distance measurement is at least one of phase-difference-image-based distance measurement that measures the second distance according to a phase difference image obtained as the image from a phase difference pixel, stereo-image-based distance measurement that measures the second distance according to a stereo image obtained as the image by a stereo imaging method, or object-image-based distance measurement that measures the second distance according to an object image which is detected from the image and indicates an object whose size is known.

12. The information processing device according to claim 4,
wherein the specific process includes focus control for a third imager based on a contrast of a subject image obtained by imaging a subject included in the distance measurement target region with the third imager.

13. The information processing device according to claim 1,
wherein the distance measurement target region is a specific real space region that is limited in response to a given instruction.

14. The information processing device according to claim 1,
wherein the distance measurement target region is a specific real space region corresponding to a target subject image detected by the processor from a captured image obtained by imaging with a fourth imager.

15. The information processing device according to claim 1, wherein the processor is configured to perform the focus control for a fifth imager, using the first distance measured on the basis of the irradiation timing and the light receiving timing.

16. The information processing device according to claim 1, wherein the intensities of the plurality of signals are adjusted according to the light receiving timing.

17. The information processing device according to claim 1, wherein the specific pixel is one of a plurality of specific pixels disposed two-dimensionally in the light receiver, and the processor is configured to measure the first distance for the plurality of specific pixels on the basis of the irradiation timing and the light receiving timing.

18. The information processing device according to claim 1, wherein the distance measurement target region has the object and the glossy object.

19. An imaging device comprising:

the information processing device according to claim 1; and a focus lens, wherein the processor is configured to perform focus control to move the focus lens to a focus position determined according to the first distance.

20. An information processing method comprising:

causing a light irradiator to perform surface irradiation on a distance measurement target region with light;

causing a light receiver to receive reflected light of the light from the distance measurement target region; and measuring a first distance to an object in the distance measurement target region on the basis of an irradiation timing when the light irradiator performs the surface irradiation on the distance measurement target region with the light and a light receiving timing when the light receiver receives the reflected light, wherein, in a case in which a specific pixel included in the light receiver generates a plurality of signals at different timings within a light receiving period corresponding to the surface irradiation, the first distance is measured on the basis of a relationship between the plurality of signals generated by the specific pixel, the plurality of signals including a first signal and a second signal, the first signal having a first intensity that is equal to or greater than a first threshold value, and the second signal having a second intensity that is less than the first threshold value and is equal to or greater than a second threshold value that is less than the first threshold value, wherein the first threshold value is a value that is determined as a lower limit value of an intensity of the reflected light from a glossy object, and wherein the second threshold value is a value that is determined as a lower limit value of an intensity of the reflected light from a standard subject assumed to be the object.

21. A non-transitory computer readable recording medium storing a program that causes a computer to execute a process comprising:

causing a light irradiator to perform surface irradiation on a distance measurement target region with light;

causing a light receiver to receive reflected light of the light from the distance measurement target region; and measuring a first distance to an object in the distance measurement target region on the basis of an irradiation timing when the light irradiator performs the surface irradiation on the distance measurement target region with the light and a light receiving timing when the light receiver receives the reflected light, wherein, in a case in which a specific pixel included in the light receiver generates a plurality of signals at different timings within a light receiving period corresponding to the surface irradiation, the first distance is measured on the basis of a relationship between the plurality of signals generated by the specific pixel, the plurality of signals including a first signal and a second signal, the first signal having a first intensity that is equal to or greater than a first threshold value, and the second signal having a second intensity that is less than the first threshold value and is equal to or greater than a second threshold value that is less than the first threshold value, wherein the first threshold value is a value that is determined as a lower limit value of an intensity of the reflected light from a glossy object, and wherein the second threshold value is a value that is determined as a lower limit value of an intensity of the reflected light from a standard subject assumed to be the object.

* * * * *